United States Patent
Muraoka

(10) Patent No.: US 8,363,527 B2
(45) Date of Patent: Jan. 29, 2013

(54) DISC APPARATUS

(75) Inventor: Yasuhiro Muraoka, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/158,032

(22) Filed: Jun. 10, 2011

(65) Prior Publication Data

US 2011/0235483 A1    Sep. 29, 2011

Related U.S. Application Data

(62) Division of application No. 12/014,477, filed on Jan. 15, 2008, now Pat. No. 7,969,847.

(30) Foreign Application Priority Data

Jan. 16, 2007 (JP) ................................. 2007-007021
Sep. 27, 2007 (JP) ................................. 2007-250379
Nov. 9, 2007 (JP) ................................. 2007-292035

(51) Int. Cl.
G11B 7/00       (2006.01)

(52) U.S. Cl. .................................................. 369/53.34

(58) Field of Classification Search .................. None
See application file for complete search history.

(56) References Cited

U.S. PATENT DOCUMENTS

| | | | |
|---|---|---|---|
| 5,627,807 A | 5/1997 | Abe | |
| 7,061,835 B2 | 6/2006 | Kobayashi | |
| 7,460,451 B2 | 12/2008 | Baba | |
| 7,791,998 B2 | 9/2010 | Uchino et al. | |
| 7,983,121 B2 * | 7/2011 | Sasaki et al. | 369/44.32 |
| 2002/0044506 A1 * | 4/2002 | Shihara et al. | 369/44.32 |
| 2002/0054549 A1 | 5/2002 | Ohtsu | |
| 2004/0008594 A1 | 1/2004 | Tokita et al. | |
| 2004/0017747 A1 | 1/2004 | Ogawa | |
| 2004/0017752 A1 * | 1/2004 | Furumiya et al. | 369/47.53 |
| 2004/0022151 A1 | 2/2004 | Furumiya et al. | |
| 2004/0081051 A1 | 4/2004 | Kimura et al. | |
| 2004/0095862 A1 * | 5/2004 | Nakajima et al. | 369/47.28 |
| 2007/0008854 A1 * | 1/2007 | Sekiguchi et al. | 369/59.2 |

FOREIGN PATENT DOCUMENTS

| | | |
|---|---|---|
| JP | 64-057427 | 3/1989 |
| JP | 07-262584 | 10/1995 |
| JP | 7262587 A | 10/1995 |
| JP | 10228652 A | 8/1998 |
| JP | 2002197698 A | 7/2002 |
| JP | 2002342948 A | 11/2002 |
| JP | 2003263760 A | 9/2003 |
| JP | 2005-216461 | 8/2005 |

OTHER PUBLICATIONS

Chinese Office Action dated Jun. 26, 2012, for Application No. 200810002072.4, 4 pages.

* cited by examiner

*Primary Examiner* — Hoa T Nguyen
*Assistant Examiner* — Emily Frank
(74) *Attorney, Agent, or Firm* — Fish & Richardson P.C.

(57) ABSTRACT

A disc apparatus is disclosed that includes a jitter-value detection unit configured to detect a jitter value based on a signal to be read from a medium. A detrack-value setting unit is configured to set a detrack value for focusing an objective lens in the medium based on the jitter value. A detrack-value adjusting unit is configured to detect the jitter value every time the detrack value is changed stepwise within a predetermined range of the detrack value including a reference value of the detrack value, to obtain an optimum detrack value to be set in the detrack-value setting unit, based on a maximum jitter value and a minimum jitter value of the detected jitter values.

18 Claims, 23 Drawing Sheets

DISC APPARATUS

CROSS-REFERENCE TO RELATED APPLICATIONS

This is a divisional application of application Ser. No. 12/014,477 filed on Jan. 15, 2008, now U.S. Pat. No. 7,969,847, which claims priority upon Japanese Patent Application Nos. 2007-7021, 2007-250379, and 2007-292035, filed Jan. 16, 2007, Sep. 27, 2007, and Nov. 9, 2007, respectively, of which full contents are incorporated herein by reference.

BACKGROUND OF THE INVENTION

1. Field of the Invention

The present invention relates to a disc apparatus capable of recording a signal in a medium such as an optical disc with a laser beam applied from an optical pickup device or capable of reproducing a signal recorded in a medium such as an optical disc with a laser beam.

2. Description of the Related Art

A laser beam applied from an optical pickup device (OPU) of an optical disc apparatus is focused on a signal surface of an optical disc. Laser (LASER) is an abbreviation for "light amplification by stimulated emission of radiation". A technology of focusing the laser beam on the signal surface of the optical disc, so-called focusing control technology includes various types. In general, the focusing control is performed by utilizing a signal obtained through a photodetector included in the optical pickup device.

A focus means a focal point or focal spot, for example. Focusing means bringing into focus or coming into focus. Defocus adjustment in this description means an adjustment operation of focusing for an object out of focus, for example.

According to specifications in which the focusing control is described, for example, there are described a focusing controlling apparatus and a focus pull-in method, where a focus pull-in operation is certainly performed in a short period of time for an optical disc with reflectance varying depending on sates or a phase change optical disc with reflectance varying due to heat of applied light (see, e.g., Japanese Patent Application Laid-Open Publication No. 2002-342948 (pages 1, 3 to 5, FIGS. 1 to 5)).

The focusing control is generally performed by a circuit called a focusing servo circuit and the displacement operation of an objective lens is performed based on a position that is the center of the operation of the objective lens, for example. A servo means, for example, those including a mechanism performing automatic correction control with measuring a state of a control target to be compared with a predetermined reference value.

For example, some optical pickup devices include a system where an arbitrary offset (OFFSET) can be applied by a focus mechanism, and jitter (jitter) is adjusted at the time of reading data from a disc (DISC) based on focus offset (FOCUS_OFFSET) that is the so-called defocus (DEFOCUS). The jitter means slight fluctuation and distortion of a signal, for example.

For example, in some optical pickup devices, a jitter value included in a signal such as a reproduction signal is detected to adjust the operational center position of the objective lens (see, e.g., Japanese Patent Application Laid-Open Publication No. Hei7-262584 (pages 1 and 2, FIGS. 1 to 6)).

In optical pickup devices, an F-bias (F BIAS) value, which is a bias (BIAS) value of the focus (FOCUS), so-called defocus value, is rendered variable so that the defocus value is set at the optimum jitter value.

For example, in some optical disc reading apparatuses, there can be obtained a focus bias amount corresponding to an optical disc by detecting a correlation between a focus bias value displacing a reference position of the focus of a pickup and a jitter value of data read by the pickup (see, e.g., Japanese Patent Application Laid-Open Publication No. 10-228652 (pages 1 and 2, FIGS. 1 to 8)).

The focusing control in the optical disc apparatus is performed with the use of a focusing error signal obtained by the photodetector. If the objective lens is displaced substantially in a direction orthogonal to a surface of the optical disc by the focusing control, a focusing error signal called S-shaped curve can be obtained as described in patent document 1, for example. If the level of the focusing error signal falls within a focusing controllable range in which a point called zero-cross of the S-shaped curve is the center, the focusing servo operation is performed to execute the focusing control. By performing the focusing servo operation, a laser beam applied from a laser diode is focused on the signal surface of the optical disc.

A technology of setting a focal point of a laser beam on a substantially spiral track provided on a signal surface of an optical disc, so-called tracking control technology includes various types. In general, the tracking control is performed by utilizing a signal obtained through the photodetector included in the optical pickup device.

In this description, a track means a track of signal in an optical disc, for example. Tracking means tracking a micro signal portion provided on the signal surface of the optical disc with the use of light to set a position on a substantially spiral-shaped track.

According to specifications in which the tracking control is described, for example, there are described a rotation correction circuit, a semiconductor integrated circuit, an optical disc device, and a rotation correction method, which: achieve a good information data reading performance even at the time of high-speed rotation of an optical disc with eccentricity or wobbling; and are able to stably execute track jumps and layer jumps (see, e.g., Japanese Patent Application Laid-Open Publication No. 2003-263760 (pages 1 and 5, FIGS. 1 to 29)).

The tracking control is generally performed by a circuit called a tracking servo circuit and the displacement operation of the objective lens is performed based on a position that is the center of the operation of the objective lens, for example.

For example, some optical pickup devices include a system where an arbitrary offset (OFFSET) can be applied by a track mechanism, and jitter (jitter) is adjusted at the time of reading data from a disc (DISC) based on track offset (TRACK_OFFSET) that is the so-called detrack (DETRACK).

In optical pickup devices, a T-bias (T BIAS) value, which is a bias (BIAS) value of the track (TRACK), so-called detrack value, is normally rendered variable so that the detrack value is set at the optimum jitter value.

For example, there has been devised an optical disc apparatus that invariably sets a track bias amount with calculation processes. For example, there has been also devised an optical disc apparatus that sets a track bias amount based on the minimum jitter value.

In conventional optical disc apparatuses including a tilt mechanism or tilt function, correction of skew in a radial direction of a disc (disc) and correction of recording quality are facilitated. The tilt (tilt) in optical disc apparatuses or optical pickup devices means angle deviation between a disc surface and a light axis of the objective lens. The skew (skew) means "deformation" and "bending".

For example, some optical pickup devices include a system where an arbitrary offset (OFFSET) can be applied by a tilt mechanism, and to adjust jitter (jitter) is adjusted at the time of reading data from a disc (DISC) based on tilt offset (TILT_OFFSET) that is the so-called tilt (TILT).

The above apparatuses provided with the tilt function include an optical head device not requiring addition of power feeding wires to a lens holder and not causing increase in size and weight of the lens holder (see, e.g., Japanese Patent Application Laid-Open Publication No. 2002-197698 (pages 1 and 2, FIGS. 1 to 3)).

In optical pickup devices, a tilt value is normally rendered variable so that the tilt value is set at the optimum jitter value. For example, there has been devised an optical disc apparatus that invariably sets a tilt bias amount with calculation processes. For example, there has been also devised an optical disc apparatus that sets a tilt bias amount based on the minimum jitter value.

In the above optical pickup device, there is a problem that a focus position obtained by control of the focusing servo operation is not always the best focal point due to an individual difference of an optical pickup device itself or an optical disc, so that the focusing servo operation is not performed in the optimum state.

To solve the above problem, for example, there has been proposed an optical disc reading apparatus described in the patent document 3. However, in an optical disc reading apparatus described in Japanese Patent Application Laid-Open Publication No. 10-228652, for example, since the focus bias amount is set through a calculation process, the time required for the setting process is prolonged, which may be a problem.

For example, when performing a method of setting the focus bias amount based on the minimum jitter value, the following problems may occur. For example, among optical discs to be used, there are optical discs for which jitter value changes very slightly. A bias amount set in the case of such an optical disc may be a focus bias amount at the edge of detection range. When the focus bias amount is set in this way, the focusing servo operation becomes unsteady, which is a problem.

Specifically, in some optical discs, a jitter value corresponding to a defocus value may not substantially be changed when the defocus value is adjusted by the optical pickup device, or a jitter value enabling steady reading operation is obtained even if a defocus value is set to zero. If a biased defocus value is set in accordance with the optimum jitter for such optical discs, the servo becomes unsteady due to this defocus value, resulting in focus drop, so-called F-drop, etc.

The focus drop means, for example, that a focus of a laser beam emitted from an optical pickup device deviates from a pit portion of a disc in a state of being tracked, so that data recorded in the disc becomes unable to be read. A pit means a hole or a dent portion.

For example, when the defocus adjustment is performed based on the detected jitter, the F-drop may occur in an optical pickup device having slight changes in jitter. When the defocus adjustment is performed in an optical pickup device having slight changes in jitter, a defocus value may be set at a value apart from the center value corresponding to the center of the operation of the objective lens. If such a setting is performed, the F-drop may occur in the optical pickup device.

When the defocus adjustment is performed in an optical pickup device, if a value other than zero is set as the defocus value, a problem occurs that a track may not be caught when the optical pickup device performs a track jump on an optical disc.

In the conventional optical pickup device, there is a problem that a focus position obtained by control of the tracking servo operation is not always the best focal point due to an individual difference of an optical pickup device itself or an optical disc and, so that the tracking servo operation is not performed in the optimum state.

For example, in the optical disc apparatuses setting the track bias amount through a calculation process, since the track bias amount is set through a calculation process, the time required for the setting process is prolonged, which may be a problem.

For example, when performing a method of setting the track bias amount based on the minimum jitter value, the following problems may occur. For example, among optical discs to be used, there are optical discs for which jitter value changes very slightly. A bias amount set in the case of such an optical disc may be a track bias amount at the edge of detection range. When the track bias amount is set in this way, the tracking servo operation becomes unsteady, which is a problem.

In some optical discs, a jitter value corresponding to a detrack value may not substantially be changed when the detrack value is adjusted by the optical pickup device, or a jitter value enabling steady reading operation is obtained even if a detrack value is set to zero. If a biased detrack value is set in accordance with the optimum jitter for such optical discs, the servo becomes unsteady due to this detrack value, which may result in track skip, etc.

The track skip means, for example, that a focus of a laser beam emitted from an optical pickup device deviates from a track portion of a disc in a state of being tracked, so that data recorded in the disc becomes unable to be read.

For example, when the detrack adjustment is performed based on the detected jitter, the track skip may occur in an optical pickup device having slight changes in jitter. When the detrack adjustment is performed in an optical pickup device having slight changes in jitter, a detrack value may be set at a value apart from the center value corresponding to the center of the operation of the objective lens. If such a setting is performed, the track skip may occur in the optical pickup device.

When the detrack adjustment is performed in an optical pickup device, if a value other than zero is set as the detrack value, a problem occurs that a track may not be caught when the optical pickup device performs a track jump on an optical disc.

In the conventional optical pickup device, there is a problem that a focus position obtained by control of the focusing servo operation is not always the best focal point due to an individual difference of an optical pickup device itself or an optical disc, so and that the tilt operation is not performed in the optimum state.

For example, in the optical disc apparatuses setting the tilt bias amount through a calculation process, since the tilt bias amount is set through a calculation process, the time required for the setting process is prolonged, which may be a problem.

For example, when performing a method of setting the tilt bias amount based on the minimum jitter value, the following problems may occur. For example, among optical discs to be used, there are optical discs for which jitter value changes very slightly. A bias amount set in the case of such an optical disc may be a tilt bias amount at the edge of detection range. When the tilt bias amount is set in this way, the tilt operation becomes unsteady, which is a problem.

In some optical discs, a jitter value corresponding to a tilt value may not substantially be changed when the tilt value is adjusted by the optical pickup device, or a jitter value enabling steady reading operation is obtained even if a tilt value is set to zero. If a biased tilt value is set in accordance with the optimum jitter for such optical discs, the servo becomes unsteady due to this tilt value, resulting in servo failure, etc.

For example, when the tilt adjustment is performed based on the detected jitter, the servo failure may occur in an optical pickup device having slight changes in jitter. When the tilt adjustment is performed in an optical pickup device having slight changes in jitter, a tilt value may be set at a value apart from the center value corresponding to the center of the operation of the objective lens. If such a setting is performed, the servo failure may occur in the optical pickup device.

When the tilt adjustment is performed in an optical pickup device, if a value other than zero is set as the tilt value, the servo failure tends to occur when the optical pickup device performs a track jump on an optical disc, which is a problem.

SUMMARY OF THE INVENTION

A disc apparatus according to an aspect of the present invention, comprises a jitter-value detection unit configured to detect a jitter value based on a signal to be read from a medium; a defocus-value setting unit configured to set a defocus value for focusing an objective lens in the medium based on the jitter value; and a defocus-value adjusting unit configured to detect the jitter value every time the defocus value is changed stepwise within a predetermined range of the defocus value including a reference value of the defocus value, to obtain an optimum defocus value to be set for the defocus-value setting unit within a predetermined time period, based on a maximum jitter value and a minimum jitter value of the detected jitter values.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
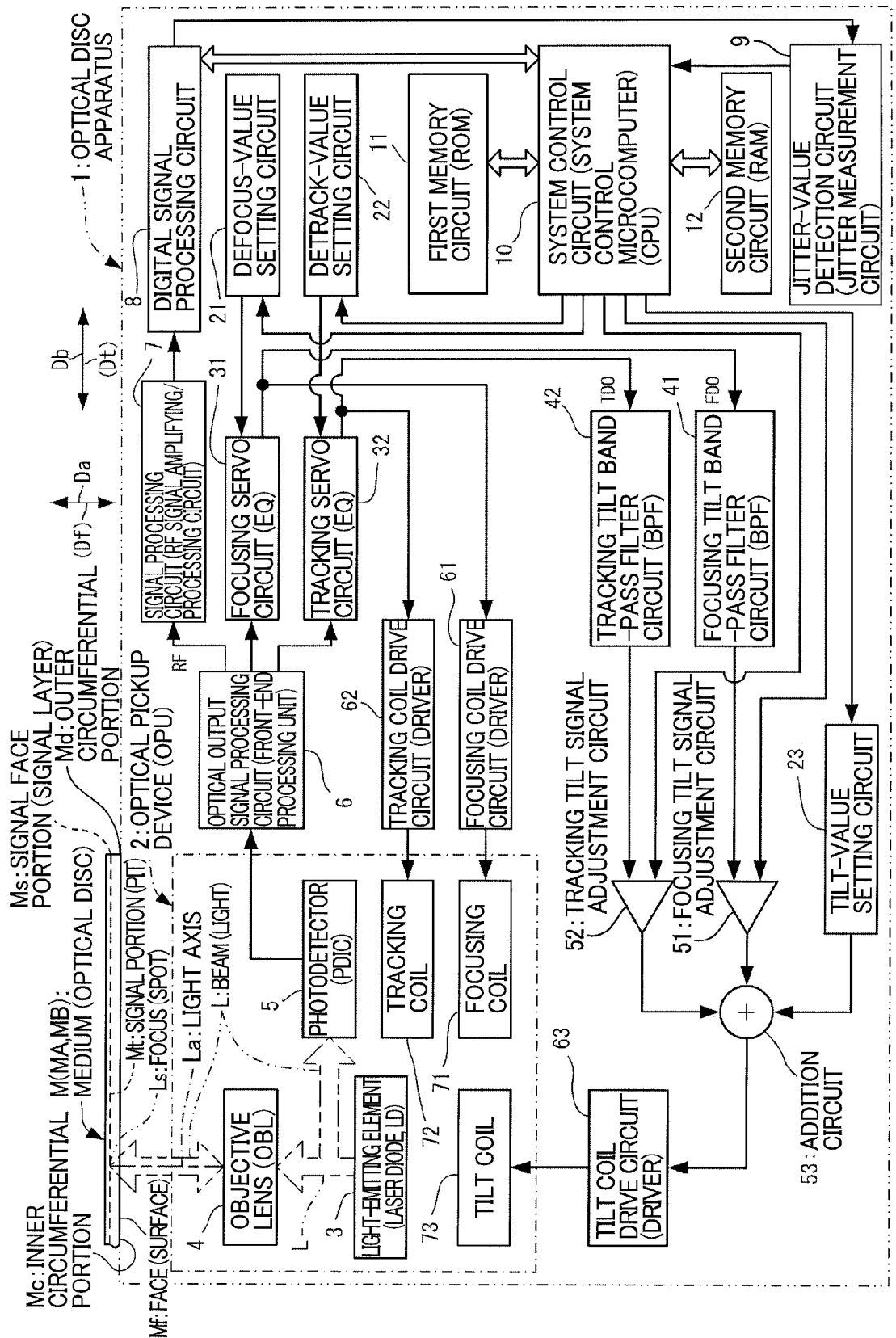
FIG. 1 is a configuration view of a disc apparatus according to an embodiment of the present invention.

At least the following details will become apparent from descriptions of this specification and of the accompanying drawings.

In a disc apparatus detecting a jitter value of a signal read from a medium and adjusting the position of an objective lens for the medium based on the jitter value with the use of an optical pickup device including an objective lens according to one embodiment of the present invention, when focusing the objective lens in the medium based on the jitter value, there is adjusted a defocus value used for moving the objective lens in the light axis direction of the objective lens, to perform the focusing adjustment of the objective lens for the medium, and on this occasion, the jitter value is detected as needed every time the defocus value is changed stepwise within a predetermined range of numeric values including the reference value of the defocus value, to set an optimum defocus value within substantially 20 seconds based on a difference value between the maximum jitter value and the minimum jitter value of the detected jitter values.

The optimum defocus value is set in a disc apparatus with the above configuration. Since the jitter value is detected as needed every time the defocus value is changed stepwise within the predetermined range of numeric values including a reference value of the defocus value, to set the optimum defocus value based on the difference value between the maximum jitter value and the minimum jitter value of the detected jitter values, the optimum defocus value is set in the disc apparatus. The defocus adjustment is performed in the disc apparatus without waiting for a long time due to the defocus adjustment. Since the defocus adjustment is performed within substantially 20 seconds when performing the defocus adjustment of the objective lens for the medium, a situation is avoided where one must wait for a long time due to the defocus adjustment performed by the disc apparatus.

In the disc apparatus according to one embodiment of the present invention, when performing the defocus adjustment of the objective lens for the medium, if it is determined that the difference value between the maximum jitter value and the minimum jitter value is a value greater than a predetermined value, the defocus value corresponding to the minimum jitter value is set as the optimum defocus value.

With the above configuration, the optical pickup device making up the disc apparatus performs the stable focusing servo operation for the medium. The medium, when it is determined that the difference value between the maximum jitter value therefor and the minimum jitter value therefor is a value greater than the predetermined value, is considered as the medium with poor jitter characteristics. Since the defocus value corresponding to the minimum jitter value is set as the optimum defocus value when reading a signal from the medium with poor jitter characteristics, the stable focusing servo operation is performed in the optical pickup device.

In the disc apparatus according to one embodiment of the present invention, when performing the defocus adjustment of the objective lens for the medium, if it is determined that the difference value between the maximum jitter value and the minimum jitter value is a small value that is equal to or smaller than a predetermined value, the reference value of the defocus value is set as the optimum defocus value.

With the above configuration, the optical pickup device making up the disc apparatus performs the stable focusing servo operation for the medium. The medium, when it is determined that the difference value between the maximum jitter value therefor and the minimum jitter value therefor is a small value that is equal to or smaller than the predetermined value, is considered as the medium with good jitter characteristics. Since the reference value of the defocus value is set as the optimum defocus value in the disc apparatus when reading a signal from the medium with good jitter characteristics, the stable focusing servo operation is performed in the optical pickup device without failure occurring in the focusing servo operation of the optical pickup device.

In the disc apparatus according to one embodiment of the present invention, when performing the defocus adjustment of the objective lens for the medium, the jitter value is first detected based on the reference value of the defocus value, and if it is determined that the detected jitter value is a value greater than a predetermined jitter value, the jitter value is detected every time the defocus value is changed stepwise within the predetermined range of numeric values including the reference value of the defocus value.

The optimum defocus value corresponding to the medium is set in the disc apparatus with the above configuration. When performing the defocus adjustment of the objective lens for the medium, the jitter value is first detected based on the reference value of the defocus value. The medium, when it is determined that the jitter value therefor based on the reference value of the defocus value is a value greater than the predetermined jitter value, is considered as the medium having a need for checking each of the jitter values corresponding to each of the defocus values. If it is determined that the detected jitter value based on the reference value of the defocus value is a value greater than the predetermined jitter value, the jitter value is detected every time the defocus value is changed stepwise within the predetermined range of numeric values including the reference value of the defocus value, and the optimum defocus value corresponding to the medium is set based on the difference value between the maximum jitter value and the minimum jitter value of the detected jitter values.

In the disc apparatus according to one embodiment of the present invention, when performing the defocus adjustment of the objective lens for the medium, the jitter value is first detected based on the reference value of the defocus value, and if it is determined that the detected jitter value is a small value equal to or smaller than a predetermined jitter value, the reference value of the defocus value is set as the optimum defocus value without detecting each of the jitter values every time the defocus value is changed stepwise within a predetermined range of numeric values including the reference value of the defocus value.

With the above configuration, the defocus value is swiftly set when the medium with good jitter characteristics is used, and the optical pickup device making up the disc apparatus performs the stable focusing servo operation for the medium. When performing the defocus adjustment of the objective lens for the medium, the jitter value is first detected based on the reference value of the defocus value. The medium, when it is determined that the jitter value therefor based on the reference value of the defocus value is a small value that is equal to or smaller than the predetermined jitter value, is considered as the medium with good jitter characteristics. Since the reference value of the defocus value is set as the optimum defocus value without detecting each of the jitter values every time the defocus value is changed stepwise within the predetermined range of numeric values including the reference value of the defocus value when reading a signal from the medium with good jitter characteristics, the setting time of the defocus value is reduced. Since the reference value of the defocus value is set as the optimum defocus value in the disc apparatus when reading a signal from the medium with good jitter characteristics, the stable focusing servo operation is performed in the optical pickup device without failure occurring in the focusing servo operation of the optical pickup device.

In the disc apparatus according to one embodiment of the present invention, in the case where the optimum defocus value is set to the numeric value other than the reference value, when a track jump is performed by the optical pickup device on the medium, the defocus value is set to the reference value.

With the above configuration, even if the numeric value other than the reference value is set as the optimum defocus value in the disc apparatus, the track jump of the optical pickup device on the medium is favorably performed. If the defocus adjustment of the optical pickup device is performed for the medium and the defocus value is set to the numeric value other than the reference value, a track may not be caught when the track jump is performed by the optical pickup device on the medium. However, even if the defocus value is set to the numeric value other than the reference value, since the defocus value is set to the reference value when the track jump is performed by the optical pickup device, the track jump becomes easily performed by the optical pickup device on the medium in a more normal manner.

In the disc apparatus according to one embodiment of the present invention, the defocus value is returned to the numeric value other than the reference value after the track jump of the optical pickup device on the medium is completed.

With the above configuration, the optimum defocus value is again set in the disc apparatus. When the track jump of the optical pickup device on the medium is not performed, the numeric value other than the reference value of the defocus value is again set as the optimum defocus value in the disc apparatus and, therefore, the focusing adjustment of the objective lens for the medium is favorably performed.

In a disc apparatus detecting a jitter value of a signal read from a medium and adjusting the position of an objective lens for the medium based on the jitter value with the use of an optical pickup device having the objective lens according to one embodiment of the present invention, when focusing the objective lens in the medium based on the jitter value, there is adjusted a detrack value used for moving the objective lens in the radial direction of the medium, to perform the tracking adjustment of the objective lens for the medium, and on this occasion, the jitter value is detected as needed every time the detrack value is changed stepwise within a predetermined range of numeric values including a reference value of the detrack value, to set an optimum detrack value within substantially 20 seconds based on a difference value between the maximum jitter value and the minimum jitter value of the detected jitter values.

The optimum detrack value is set in a disc apparatus with the above configuration. Since the jitter value is detected as needed every time the detrack value is changed stepwise within the predetermined range of numeric values including the reference value of the detrack value, to set the optimum detrack value based on the difference value between the maximum jitter value and the minimum jitter value of the detected jitter values, the optimum detrack value is set in the disc apparatus. The detrack adjustment is performed in the disc apparatus without waiting for a long time due to the detrack adjustment. Since the detrack adjustment is performed within substantially 20 seconds when performing the detrack adjustment of the objective lens for the medium, a situation is avoided where one must wait for a long time due to the detrack adjustment performed by the disc apparatus.

In the disc apparatus according to one embodiment of the present invention, when performing the detrack adjustment of the objective lens for the medium, if it is determined that the difference value between the maximum jitter value and the minimum jitter value is a value greater than a predetermined value, the detrack value corresponding to the minimum jitter value is set as the optimum detrack value.

With the above configuration, the optical pickup device making up the disc apparatus performs the stable tracking servo operation for the medium. The medium, when it is determined that the difference value between the maximum jitter value therefor and the minimum jitter value therefor is a value greater than the predetermined value, is considered as the medium with poor jitter characteristics. Since the detrack value corresponding to the minimum jitter value is set as the optimum detrack value when reading a signal from the medium with poor jitter characteristics, the stable tracking servo operation is performed in the optical pickup device.

In the disc apparatus according to one embodiment of the present invention, when performing the detrack adjustment of the objective lens for the medium, if it is determined that the difference value between the maximum jitter value and the minimum jitter value is a small value that is equal to or smaller than a predetermined value, the reference value of the detrack value is set as the optimum detrack value.

With the above configuration, the optical pickup device making up the disc apparatus performs the stable tracking servo operation for the medium. The medium, when it is determined that the difference value between the maximum jitter value therefor and the minimum jitter value therefor is a small value equal to or smaller than the predetermined value, is considered as the medium with good jitter characteristics. Since the reference value of the detrack value is set as the optimum detrack value in the disc apparatus when reading a signal from the medium with good jitter characteristics, the stable tracking servo operation is performed in the optical pickup device without failure occurring in the tracking servo operation of the optical pickup device.

In the disc apparatus according to one embodiment of the present invention, when performing the detrack adjustment of the objective lens for the medium, the jitter value is first detected based on the reference value of the detrack value, and if it is determined that the detected jitter value is a value greater than a predetermined jitter value, the jitter value is detected every time the detrack value is changed stepwise within the predetermined range of numeric values including the reference value of the detrack value.

The optimum detrack value corresponding to the medium is set in the disc apparatus with the above configuration. When performing the detrack adjustment of the objective lens for the medium, the jitter value is first detected based on the reference value of the detrack value. The medium, when it is determined that the jitter value therefor based on the reference value of the detrack value is a value greater than the predetermined jitter value, the medium is considered as the medium having a need for checking each of the jitter values corresponding to each of the detrack values. If it is determined that the detected jitter value based on the reference value of the detrack value is a value greater than the predetermined jitter value, the jitter value is detected every time the detrack value is changed stepwise within the predetermined range of numeric values including the reference value of the detrack value, and the optimum detrack value corresponding to the medium is set based on the difference value between the maximum jitter value and the minimum jitter value of the detected jitter values.

In the disc apparatus according to one embodiment of the present invention, when performing the detrack adjustment of the objective lens for the medium, the jitter value is first detected based on the reference value of the detrack value, and if it is determined that the detected jitter value is a small value equal to or smaller than a predetermined jitter value, the reference value of the detrack value is set as the optimum detrack value without detecting each of the jitter values every time the detrack value is changed stepwise within the predetermined range of numeric values including the reference value of the detrack value.

With the above configuration, the detrack value is swiftly set when the medium with good jitter characteristics is used, and the optical pickup device making up the disc apparatus performs the stable tracking servo operation for the medium. When performing the detrack adjustment of the objective lens for the medium, the jitter value is first detected based on the reference value of the detrack value. The medium, when it is determined that the jitter value therefor based on the reference value of the detrack value is a small value equal to or smaller than the predetermined jitter value, is considered as the medium with good jitter characteristics. Since the reference value of the detrack value is set as the optimum detrack value without detecting each of the jitter values every time the detrack value is changed stepwise within a predetermined range of numeric values including the reference value of the detrack value when reading a signal from the medium with good jitter characteristics, the setting time of the defocus value is reduced. Since the reference value of the detrack value is set as the optimum detrack value in the disc apparatus when reading a signal from the medium with good jitter characteristics, the stable tracking servo operation is performed in the optical pickup device without failure occurring in the tracking servo operation of the optical pickup device.

In the disc apparatus according to one embodiment of the present invention, in the case where the optimum detrack value is set to the numeric value other than the reference value, when a track jump is performed by the optical pickup device on the medium, the detrack value is set to the reference value.

With the above configuration, even if the numeric value other than the reference value is set as the optimum detrack value in the disc apparatus, the track jump of the optical pickup device is suitably performed on the medium. If the detrack adjustment of the optical pickup device for the medium is performed and the detrack value is set to the numeric value other than the reference value, a track may not be caught when the track jump is performed by the optical pickup device on the medium. However, even if the detrack value is set to the numeric value other than the reference value, since the detrack value is set to the reference value when the track jump is performed by the optical pickup device the track jump becomes easily performed by the optical pickup device on the medium in a more normal manner.

In the disc apparatus according to one embodiment of the present invention, the detrack value is returned to the numeric value other than the reference value after the track jump of the optical pickup device on the medium is completed.

With the above configuration, the optimum detrack value is again set in the disc apparatus. When the track jump of the optical pickup device on the medium is not performed, the numeric value other than the reference value of the detrack value is again set as the optimum detrack value in the disc apparatus and, therefore, the tracking adjustment of the objective lens for the medium is favorably performed.

In a disc apparatus detecting a jitter value of a signal read from a medium and adjusting the position of an objective lens for the medium based on the jitter value with the use of an optical pickup device having an objective lens according to one embodiment of the present invention, when focusing the objective lens in the medium based on the jitter value, there is adjusted a tilt value used for correcting the angle deviation of the objective lens for the signal layer of the medium, to perform the tilt adjustment of the objective lens for the medium, and on this occasion, the jitter value is detected as needed every time the tilt value is changed stepwise within a predetermined range of numeric values including a reference value of the tilt value, to set the optimum tilt value within substantially 20 seconds based on a difference value between the maximum jitter value and the minimum jitter value of the detected jitter values.

The optimum tilt value is set in a disc apparatus with the above configuration. Since the jitter value is detected as needed every time the tilt value is changed stepwise within the predetermined range of numeric values including the reference value of the tilt value, to set the optimum tilt value based on the difference value between the maximum jitter value and the minimum jitter value of the detected jitter values, the optimum tilt value is set in the disc apparatus. The tilt adjustment is performed in the disc apparatus without waiting for a long waiting time due to the tilt adjustment. Since the tilt adjustment is performed within substantially 20 seconds when performing the tilt adjustment of the objective lens for the medium, a situation is avoided where one must wait for a long time due to the tilt adjustment performed by the disc apparatus.

In the disc apparatus according to one embodiment of the present invention, when performing the tilt adjustment of the objective lens for the medium, if it is determined that the difference value between the maximum jitter value and the minimum jitter value is a value greater than a predetermined value, the tilt value corresponding to the minimum jitter value is set as the optimum tilt value.

With the above configuration, the optical pickup device making up the disc apparatus performs the stable tilt operation for the medium. The medium, when it is determined that the difference value between the maximum jitter value therefor and the minimum jitter value therefor is a value greater than the predetermined value, is considered as the medium with poor jitter characteristics. Since the tilt value corresponding to the minimum jitter value is set as the optimum tilt value when reading a signal from the medium with poor jitter characteristics, the stable tilt operation is performed in the optical pickup device.

In the disc apparatus according to one embodiment of the present invention, when performing the tilt adjustment of the objective lens for the medium, if it is determined that the difference value between the maximum jitter value and the minimum jitter value is a small value equal to or smaller than a predetermined value, the reference value of the tilt value is set as the optimum tilt value.

With the above configuration, the optical pickup device making up the disc apparatus performs the stable tilt operation for the medium. The medium, when it is determined that the difference value between the maximum jitter value therefor and the minimum jitter value therefor is a small value equal to or smaller than the predetermined value, is considered as the medium with good jitter characteristics. Since the reference value of the tilt value is set as the optimum tilt value in the disc apparatus when reading a signal from the medium with good jitter characteristics, the stable tilt operation is performed in the optical pickup device without failure occurring in the tilt operation of the optical pickup device.

In the disc apparatus according to one embodiment of the present invention, when performing the tilt adjustment of the objective lens for the medium, the jitter value is first detected based on the reference value of the tilt value, and if it is determined that the detected jitter value is a value greater than a predetermined jitter value, the jitter value is detected every time the tilt value is changed stepwise within the predetermined range of numeric values including the reference value of the tilt value.

The optimum tilt value corresponding to the medium is set in the disc apparatus with the above configuration. When performing the tilt adjustment of the objective lens for the medium, the jitter value is first detected based on the reference value of the tilt value. The medium, when it is determined that the jitter value therefor based on the reference value of the tilt value is a value greater than the predetermined jitter value, is considered as the medium having a need for checking each of the jitter values corresponding to each of the tilt values. If it is determined that the detected jitter value based on the reference value of the tilt value is a value greater than the predetermined jitter value, the jitter value is detected every time the tilt value is changed stepwise within the predetermined range of numeric values including the reference value of the tilt value, and the optimum tilt value corresponding to the medium is set based on the difference value between the maximum jitter value and the minimum jitter value of the detected jitter values.

In the disc apparatus according to one embodiment of the present invention, when performing the tilt adjustment of the objective lens for the medium, the jitter value is first detected based on the reference value of the tilt value, and if it is determined that the detected jitter value is a small value equal to or smaller than a predetermined jitter value, the reference value of the tilt value is set as the optimum tilt value without detecting the jitter value every time the tilt value is changed stepwise within a predetermined range of numeric values including the reference value of the tilt value.

With the above configuration, the tilt value is swiftly set when the medium with good jitter characteristics is used, and the optical pickup device making up the disc apparatus performs the stable tilt operation for the medium. When performing the tilt adjustment of the objective lens for the medium, the jitter value is first detected based on the reference value of the tilt value. The medium, when it is determined that the jitter value therefor based on the reference value of the tilt value is a small value equal to or smaller than the predetermined jitter value, is considered as the medium with good jitter characteristics. Since the reference value of the tilt value is set as the optimum tilt value without detecting each of the jitter values every time the tilt value is changed stepwise of numeric values within the predetermined range including the reference value of the tilt value when reading a signal from the medium with good jitter characteristics, the setting time of the tilt value is reduced. Since the reference value of the tilt value is set as the optimum tilt value in the disc apparatus when reading a signal from the medium with good jitter characteristics, the stable tilt operation is performed in the optical pickup device without failure occurring in the tilt operation of the optical pickup device.

In the disc apparatus according to one embodiment of the present invention, in the case where the optimum tilt value is set to the numeric value other than the reference value, when a track jump is performed by the optical pickup device on the medium, the tilt value is set to the reference value.

With the above configuration, even if the numeric value other than the reference value is set as the optimum tilt value in the disc apparatus, the track jump of the optical pickup device on the medium is favorably performed. If the tilt adjustment of the optical pickup device is performed for the medium and the tilt value is set to the numeric value other than the reference value, the servo failure tends to occur. However, even if the tilt value is set to the numeric value other than the reference value, since the tilt value is set to the reference value when the track jump is performed by the optical pickup device, the track jump becomes easily performed by the optical pickup device on the medium in a more normal manner.

In the disc apparatus according to one embodiment of the present invention, the tilt value is returned to the numeric value other than the reference value after the track jump of the optical pickup device on the medium is completed.

With the above configuration, the optimum tilt value is again set in the disc apparatus. When the track jump of the optical pickup device on the medium is not performed, the numeric value other than the reference value of the tilt value is again set as the optimum tilt value in the disc apparatus and, therefore, the tilt adjustment of the objective lens for the medium is favorably performed.

In the disc apparatus according to one embodiment of the present invention, the above respective disc apparatuses adjusting the detrack value and the tilt value are combined.

With the above configuration, a disc apparatus can be provided that can set the optimum detrack value and/or the optimum tilt value in addition to the optimum defocus value in a relatively short time.

An optical disc apparatus 1 of FIG. 1 is configured to be able to set a defocus value suitable for performing the focusing servo operation with the use of a jitter value of a signal obtained from a medium M such as an optical disc M. The optical disc apparatus 1 of FIG. 1 is also configured to be able to set a detrack value suitable for performing the tracking servo operation with the use of the jitter value of the signal obtained from the medium M such as the optical disc M. The optical disc apparatus 1 of FIG. 1 is also configured to be able to set a tilt value suitable for performing the tilt operation with the use of the jitter value of the signal obtained from the medium M such as the optical disc M.

As described above, the jitter (jitter) means slight fluctuation and distortion of a signal, for example. The focus (focus) means a focal point or focal spot, for example. The focusing means bringing into focus or coming into focus, for example. The tracking means tracking minute pits (holes, dents), grooves (grooves), wobbles (meanders), etc., provided on a signal face portion Ms of the optical disc with the use of light to set a position on a spirally shaped track, for example. The pit means a hole or a dent portions, for example. The groove (groove) means an elongated dent portion, for example. The wobble (wobble) means meandering of track on which a data signal such as information is recorded, for example. The servo (servo) means a mechanism that measures a state of a control target to be compared with a predetermined reference value so as to automatically perform correction control, for example.

In this description, the defocus adjustment means an adjustment operation of focusing for an object out of focus, for example. In this description, the detrack adjustment means an adjustment operation of performing the positioning on track for the focus that is not positioned on the track of the optical disc, for example. The tilt in the optical disc apparatus 1 or an optical pickup device 2 means angle deviation between a signal layer Ms of the optical disc M and a light axis La (FIGS. 1, 2, 4A, and 4B) of a laser beam L emitted from a light-emitting element 3 of the optical pickup device 2 and transmitted through an objective lens 4, for example.

The medium (media) means a disc, etc., having stored thereon data, information, and signals, for example. The optical pickup device 2 included in the optical disc apparatus 1 (FIG. 1) is used to reproduce or record data such as information in the optical disc M. The optical disc M may be an optical disc of the "CD" series, an optical disc of the "DVD" (registered trademark) series, an optical disc of the "HD DVD" (registered trademark) series, and an optical disc of the "Blu-ray Disc" (registered trademark) series. "CD" stands for "Compact disc" (trademark). "DVD" stands for "Digital Versatile disc" (registered trademark). "HD DVD" stands for "High Definition DVD" (registered trademark).

The signal face portion Ms of the optical disc M is provided with a signal portion Mt for storing data in the optical disc M. The signal face portion Ms of the optical disc M is handled as a surface of a substantially planar signal layer or surface of a substantially planar recording layer. The signal portion Mt of the optical disc M is formed as a multiplicity of minute pits Mt. When the circular-plate-shaped optical disc M is viewed from the top, a multiplicity of the minute pits Mt is arranged to form a spiral shape. When the optical disc M is viewed from the side of the signal face portion Ms of the optical disc M, the pit Mt line is considered to be in a spiral shape. Since each of the pits Mt is very small, each of the pits Mt is not visible. In FIGS. 1, 2, 4A, and 4B, the signal layer Ms and the pits Mt of the optical disc M are shown with broken lines for convenience. There can be available the optical disc M provided with, for example, a groove (not shown) capable of having a signal recorded thereon as the signal portion Mt of the optical disc M instead of the pits Mt.

The disc may be, for example, an optical disc (not shown) provided with a signal surface on both sides of the disc to enable data write/erase or data rewrite. The disc may be, for example, an optical disc (not shown) provided with a two-layered signal surface to enable data write/erase or data rewrite. The disc may be, for example, an "HD DVD" optical disc (not shown) provided with a three-layered signal surface to enable data write/erase or data rewrite. The disc may be, for example, a "Blu-ray Disc" optical disc (not shown) provided with a four-layered signal surface to enable data write/erase or data rewrite. The disc may be, for example, an optical disc (not shown) having a disc label surface where various writing operations can be performed for a label, etc., by applying the laser beam L. The signal layer Ms of the optical disc M is formed out of, for example, a metal layer such as a thin metal layer. Information and data are recorded on the signal layer Ms formed out of a thin metal layer, etc.

The optical disc M is disposed on a turn table (not shown) driven to be rotated by a spindle motor (not shown).

The optical pickup device 2 is provided with the light-emitting element 3, so-called laser diode 3 emitting a light beam L, which is the laser beam L, to the optical disc M. For example, the laser diode 3 is configured as, for example, a two-wavelength light-emitting element 3 capable of emitting the laser beams L with two types of wavelength which are a first wavelength and a second wavelength different from the first wavelength. As above, the laser diode 3 is the light-emitting element 3 capable of emitting the laser beams L with a plurality of types of wavelength, for example. In accordance with the design/specification, etc., of the optical disc apparatus 1 and the optical pickup device 2, the laser diode 3 may be, for example, a single-wavelength light-emitting element 3 capable of emitting the laser beam L with one type of wavelength. The laser diode 3 emits the infrared laser beam L for CD with a wavelength of substantially 765 to 830 nm (nanometer) and a reference wavelength of substantially 780 nm, for example. Alternatively, the laser diode 3 emits the red laser beam L for DVD with a wavelength of substantially 630 to 685 nm and a reference wavelength of substantially 635 nm or substantially 650 nm, for example. Alternatively, the laser diode 3 emits the blue-violet laser beam L for "HD DVD" or "Blu-ray Disc" with a wavelength of substantially 350 to 450 nm and a reference wavelength of about 405 nm, for example.

The laser diode 3 emits, for example, the laser beam L with an output value of 0.2 to 500 mW (milliwatt), specifically, 2 to 400 mW. For example, if an output value of the laser beam L is less than 0.2 mW, there becomes insufficient a light amount of the laser beam L upon arrival at a photodetector 5 after being applied to and reflected by the optical disc M. When reproducing the data, etc. of the optical disc M, the laser beam L with an output value of several to several tens mW is sufficient, for example, about 2 to 20 mW. When writing the data, etc. onto the optical disc M, the laser beam L with an output value of several tens to several hundreds mW is needed. For example, when writing the data, etc. onto the optical disc M at high speed, the pulse laser beam L with a high output value such as 400 mW or 500 mW may be needed.

For example, the infrared laser beam for CD is defined as a first-wavelength laser beam. For example, the red laser beam for DVD is defined as a second-wavelength laser beam. For example, the blue-violet laser beam for "HD DVD" or "Blu-ray Disc" is defined as a third-wavelength laser beam. The definitions of the laser beams with various wavelengths such as the first-wavelength laser beam, the second-wavelength laser beam, and the third-wavelength laser beam in this description are definitions for convenience for explaining the optical disc apparatus 1 and the optical pickup device 2.

The optical pickup device 2 is provided with a diffraction grating (not shown) substantially rectangular in top view to branch the one laser beam L emitted from the laser diode 3 into at least three light fluxes (not shown). The laser beam branched by diffraction on the diffraction grating (not shown) is divided into at least three beams, which are a main beam (zero-order light) and a pair of sub-beams (±first-order diffracted light fluxes) branched around the main beam serving as a center axis, for example. The diffraction grating not shown is positioned directly behind the laser beam emitting side of the laser diode 3, for example. For example, the optical pickup device 2 is provided with, for example, a four-split type diffraction grating including four substantially rectangular diffraction areas formed as periodic structure units with four different phases (all not shown). In accordance with the design/specification, etc. of the optical disc apparatus 1 and the optical pickup device 2, for example, there may be used a three-split type diffraction grating that includes three substantially rectangular diffraction areas formed as periodic structure units having with different phases (all not shown). Alternatively, for example, there may be used a two-split type diffraction grating that includes two substantially rectangular diffraction areas formed as periodic structure units having two different phases (all not shown). As above, the optical pickup device 2 is provided with a so-called inline grating that is a two or more-split type diffraction grating including a plurality of substantially rectangular diffraction areas. In accordance with the design/specification, etc. of the optical disc apparatus 1 and the optical pickup device 2, the optical pickup device 2 may be provided with, for example, a diffraction grating including one substantially rectangular diffraction area formed as one periodic structure unit (all not shown).

The optical pickup device 2 is provided with the objective lens 4 condensing the light beam L emitted from the laser diode 3 to be applied to the signal face portion Ms of the optical disc M. Since the objective lens 4 condenses the light beam L, a condensed light spot Ls is applied to be formed on the signal face portion Ms of the optical disc M. Although the optical disc apparatus 1 is provided with the optical pickup device 2 with the one objective lens 4 here for convenience, the optical disc apparatus 1 may be provided with the optical pickup device 2 with, for example, the two or more objective lenses 4 in accordance with the design/specification, etc. of the optical disc apparatus 1 and the optical pickup device 2. As above, the optical disc apparatus 1 may be provided with the optical pickup device 2 with a plurality of the objective lenses 4.

The optical pickup device 2 is provided with the photodetector 5 receiving the light beam L reflected from the signal face portion Ms of the optical disc M. The photodetector 5 includes at least three light-receiving units, which are a main light-receiving unit (not shown) substantially rectangular in top view corresponding to the main beam (zeroth-order light) having passed through the diffraction grating not shown and a pair of sub-light-receiving units (not shown) substantially rectangular in top view corresponding to a pair of the sub-beams (±first-order diffracted light fluxes) branched by diffraction on passage through the diffraction grating not shown. The main light-receiving unit not shown substantially rectangular in top view is substantially evenly divided into four parts to include four segments substantially rectangular in top view. The sub-light-receiving unit not shown substantially rectangular in top view is substantially evenly divided into four parts to include four segments substantially rectangular in top view. In accordance with the design/specification, etc. of the optical disc apparatus 1 and the optical pickup device 2, for example, the photodetector 5 may include a light-receiving unit (not shown) substantially rectangular in top view, which is substantially evenly divided into two parts to include two segments substantially rectangular in top view. As above, the optical pickup device 2 is provided with the photodetector 5 with the two or more-split type light-receiving units including a plurality of the segments substantially rectangular in top view. The photodetector 5 is used for receiving the laser beam. L reflected from the signal face portion Ms of the optical disc M to be changed into an electric signal so that the information recorded on the signal face portion Ms of the optical disc M is detected. The photodetector 5 is also used for receiving the laser beam L reflected from the signal face portion Ms of the optical disc M to be changed into an electric signal so that a servo mechanism (not shown) of a lens holder (not shown) with the objective lens 4 making up the optical pickup device 2 is operated. When the optical pickup device 2 reads the data/information/signals recorded in the optical disc M or writes the data/information/signals onto the optical disc M, the laser beams L are applied to the light-receiving units of the photodetector 5 to detect the main information signal of the optical disc M and the focusing error signal and the racking error signal for the optical disc M.

The optical pickup device 2 includes a focusing coil 71 that displacing the objective lens 4 substantially in the direction Df orthogonal to a surface Mf of the optical disc M, a tracking coil 72 displacing the objective lens 4 substantially in the radial direction Dt of the optical disc M, and a tilt coil 73 (FIG. 1) that tilts the objective lens 4 in accordance with the tilting wobbling of the optical disc M occurring when the optical disc M (FIG. 2) is rotating and that tilts the objective lens 4 in accordance with the lateral wobbling of the optical disc M substantially in the radial direction Dt of the optical disc M generated when the optical disc M (FIGS. 4A and 4B) is rotating. For example, the optical pickup device 2 is provided with one or a plurality of, or a plurality of pairs of, i.e. a pair or two or more pairs of, the focusing coils 71. The focusing coil 71 is defined as a first coil 71, for example. For example, the optical pickup device 2 is provided with one or a plurality of, or a plurality of pairs of, i.e. a pair of or two or more pairs of, the tracking coils 72. The tracking coil 72 is defined as a second coil 72, for example. For example, the optical pickup device 2 is provided with one or a plurality of, or a plurality of pairs of, i.e. a pair of or two or more pairs of, the tilt coils 73. The tilt coil 73 is defined as third coil 73, for example. The definitions of the directions Df, Dt, etc. such as the focusing direction Df or the tracking direction Dt in this description are definitions for convenience for explaining the optical disc apparatus 1 and the optical pickup device 2.

The optical pickup device 2 includes a driving device, so-called actuator, capable of driving the lens holder not shown provided with the objective lens 4. The "actuator" means a driving device that converts energy into a translation motion or rotary motion, etc., for example. The actuator making up the optical pickup device 2 includes: the coils 71, 72, 73; the lens holder not shown provided with the coils 71, 72, 73, and the objective lens 4; magnetic members (not shown) such as magnets corresponding and adjacent to the coils 71, 72, 73; a frame yoke (not shown) provided with the magnets not shown and having a yoke (not shown); a suspension wire (not shown) elastically supporting the lens holder not shown; and a circuit substrate (not shown) connected and attached with the suspension wire not shown in a conductive manner.

The "yoke" means an object that structurally supports a magnetic coupling, for example. The "yoke" is considered to reduce leakage of magnetic force generated by magnetic members such as magnets and magnet steels. The "frame" means a frame, a frame work, or a skeletal frame, for example. The frame yoke is formed as a frame including a function of the yoke. A circuit board is referred to as PWB (printed wired board/printed wiring board), etc., for example. The magnetic fields generated by the magnets are efficiently utilized by making up the actuator and, for example, the driving forces of the coils 71, 72, 73 for the magnets are improved in the actuator.

Figure 2:
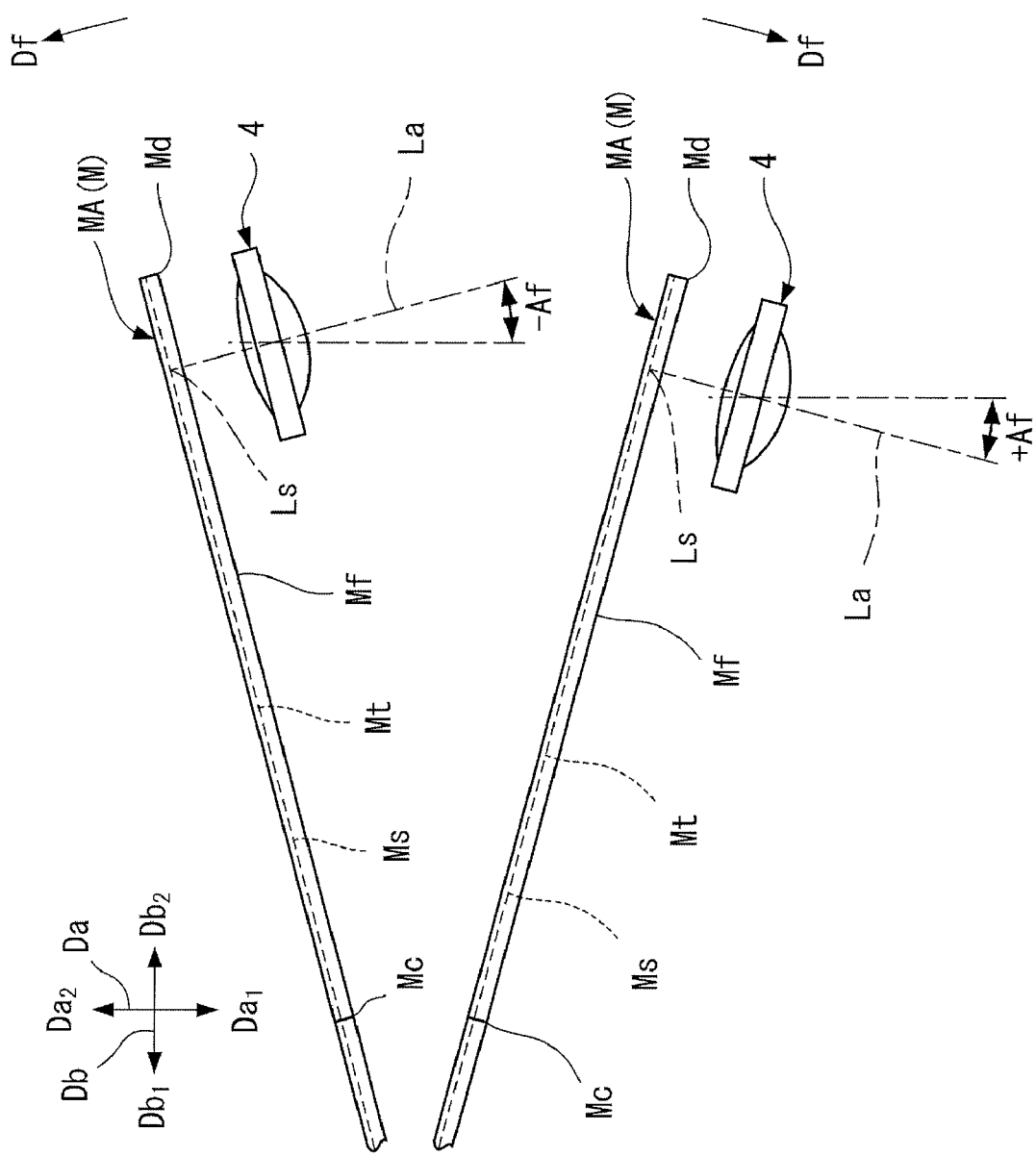
FIG. 2 is an explanatory view of an operating state of a wobbling disc considered as a medium disposed in a disc apparatus.
Figure 4A:
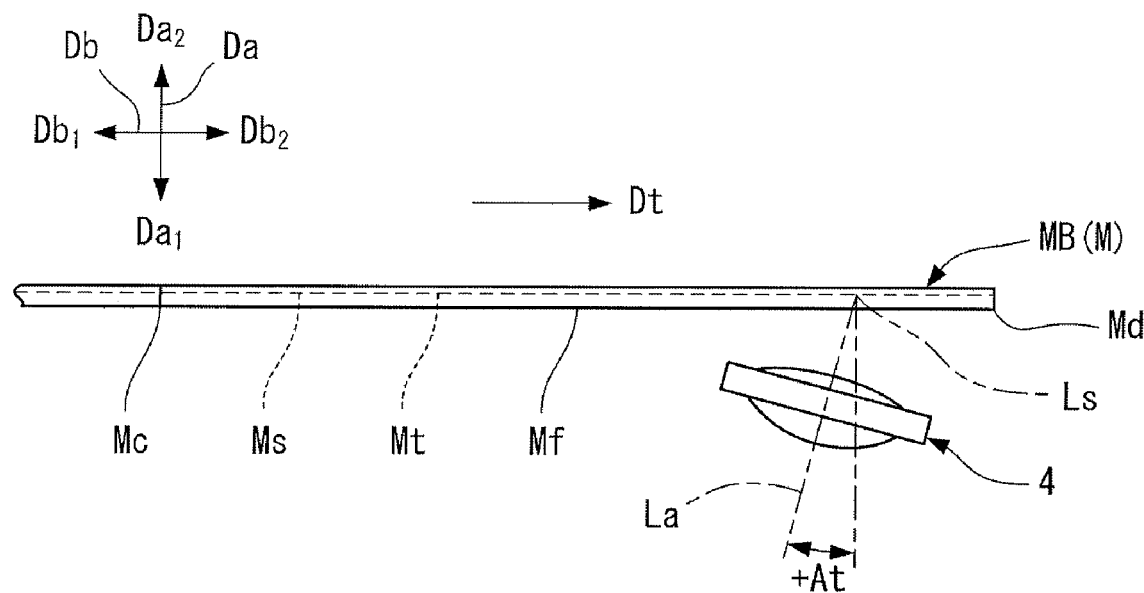
FIG. 4A is an explanatory view of an operating state of an eccentric disc considered as a medium disposed in a disc apparatus when an objective lens is tilted toward disc outer circumference of an eccentric disc.
Figure 4B:
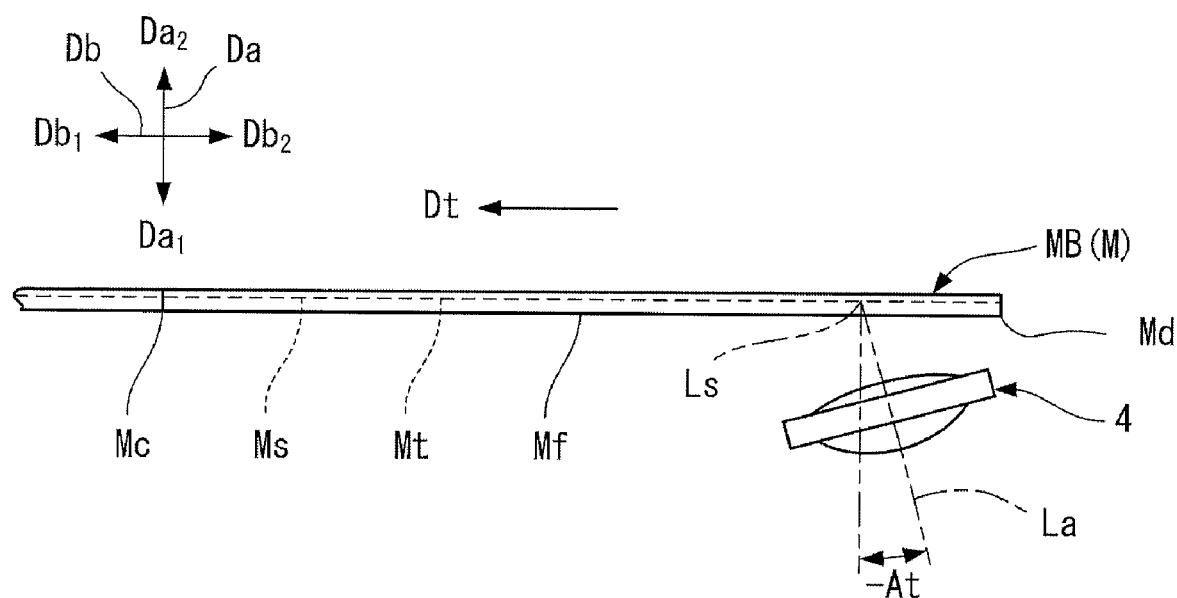
FIG. 4B is an explanatory view of an operating state of an eccentric disc considered as a medium disposed on a disc apparatus when an objective lens is tilted toward disc inner circumference of an eccentric disc.

By supplying electricity to the first coil 71 (FIG. 1) adjacent to the magnet, the lens holder including at least the objective lens 4 and the first coil 71 is efficiently driven substantially in the focusing direction PDF (FIG. 2). By supplying electricity to the second coil 72 (FIG. 1) adjacent to the magnet, the lens holder including at least the objective lens 4 and the second coil 72 is efficiently driven substantially in the tracking direction Dt (FIGS. 4A and 4B). By supplying electricity to the third coil 73 (FIG. 1) adjacent to the magnet, the lens holder including at least the objective lens 4 and the third coil 73 is efficiently driven to be tilted (FIGS. 2, 4A, and 4B).

When reading/writing data/information/signals from/onto the optical disc M (FIG. 1), the optical pickup device 2 of the optical disc apparatus 1 is moved substantially in an inward/outward direction Db of the rotating optical disc M. When the focusing adjustment of the objective lens 4 of the optical pickup device 2 is performed for the rotating optical disc M, normally, the objective lens 4 is slightly moved substantially in a disc vertical direction Da to adjust the position of the objective lens 4. The disc vertical direction Da means, for example, a direction perpendicular to the disc surface Mf formed from an inner circumference portion Mc to an outer circumference portion Md of the optical disc M when the optical disc M is held in a substantially horizontal state. The disc surface Mf of the optical disc M is formed substantially parallel to the signal face portion Ms of the optical disc M.

Specifically describing the state of performing the focusing adjustment of the objective lens 4 for the optical disc M, the objective lens 4 is slightly moved substantially in an upward direction $Da_2$ or downward direction $Da_1$ of the optical disc M (FIG. 2) to focus the spot Ls of the laser beam having passed through the objective lens 4 on the signal portion Mt of the optical disc M.

When the tracking adjustment of the objective lens 4 of the optical pickup device 2 is performed for the rotating optical disc M (FIG. 1), normally, the objective lens 4 is slightly moved substantially in the disc inward/outward direction Db to adjust the position of the objective lens 4. The disc inward/outward direction Db means, for example, a direction along the disc surface Mf between the inner circumference portion Mc and the outer circumference portion Md of the optical disc M when the optical disc M is held in a substantially horizontal state.

Specifically describing the state of performing the tracking adjustment of the objective lens 4 for the optical disc M, the objective lens 4 is slightly moved substantially in an outward direction $Db_2$ or inward direction $Db_1$ of the optical disc M (FIGS. 4A and 4B) to position the spot Ls of the laser beam having passed through the objective lens 4 on the signal portion Mt of the optical disc M.

The definitions of directions such as "up", "down", "in", and "out" in this description are definitions for convenience for explaining the optical disc apparatus 1, the optical pickup device 2, and the optical disc M.

An optical pickup (optical pickup) is generally abbreviated as "OPU". Alternatively, a term "optical pickup unit" may be used and abbreviated as "OPU". The optical pickup device is abbreviated and used here as "OPU" for convenience. The laser diode (laser diode) is abbreviated as LD. The diffraction grating (grating) is abbreviated as "GRT". The objective lens (objective lens) is abbreviated as "OBL". The photodetector (photo detector/photo diode IC) is abbreviated as "PD" or "PDIC".

The OPU 2 includes the LD 3, the GRT, the OBL 4, the lens holder, the PDIC 5, the focusing coil 71, the tracking coil 72, the tilt coil 73, the magnetic members, the frame yoke, the suspension wire, and the circuit board. The OPU 2 is moved substantially in the radial direction Dt of the optical disc M by a feed motor (not shown) capable of driving the main body of the pickup device. In accordance with the design/specification, etc., of the OPU 2, the OPU 2 making up the optical disc apparatus 1 further includes the feed motor.

The optical disc apparatus 1 includes an optical output signal processing circuit 6 that: a signal detected by the PDIC provided in the OPU 2 is input to; and outputs the signal detected by the PDIC 5 as, for example, an RF signal which is considered to be a high frequency signal. The RF signal means, for example, a signal obtained by converting a frequency thereof into a frequency that is substantially as high as that of a radio wave. "RF" stands for "radio frequency".

The signal converted from an optical signal to an electric signal by the PDIC 5 provided in the OPU 2 is input to the optical output signal processing circuit 6, so-called front-end processing unit 6. The front-end processing unit 6 is configured to generate and output a high frequency signal such as an RF signal that is a reproduction signal of the signal recorded in the optical disc M, the focusing error signal, and the tracking error signal.

The focusing error (focusing error) means that the focus Ls of the light L condensed by the OBL 4 is displaced in the direction Df substantially orthogonal to the signal layer Ms, such as the light axis direction Df relative to the pits Mt or groove (not shown) of the optical disc M. The tracking error (tracking error) means that the focus Ls of the light L condensed by the OBL 4 is displaced in the direction Dt substantially along the signal layer Ms, such as the radial direction Dt relative to the pits Mt or groove (not shown) of the optical disc M.

The optical disc apparatus 1 includes a signal processing circuit 7: that amplifies the high frequency signal obtained by the conversion of the signal detected by the photodetector 5 in the optical output signal processing circuit 6; and that converts the high frequency analog signal into a digital signal. Specifically, the optical disc apparatus 1 includes an RF signal amplifying/processing circuit 7 that amplifies the RF signal obtained by the conversion of the signal detected by the PDIC 5 the front-end processing unit 6 and that converts the RF signal, which is an analog signal, into a digital signal. Analog (analog) means that a state of matter or system is represented with a continuously variable physical amount, etc. Digital (digital) means that a state of matter or system is represented with a discrete signal such as a digit and a character.

The high frequency signal such as the RF signal, which is the reproduction signal generated by the front-end processing unit 6 is input to the signal processing circuit 7 such as the RF signal amplifying/processing circuit 7. The signal processing circuit 7 such as the RF signal amplifying/processing circuit 7 amplifies the high frequency signal such as the RF signal. The signal processing circuit 7 such as the RF signal amplifying/processing circuit 7 is configured to output the input analog signal as a binarized signal, so-called digital signal. The jitter value is preferably detected based on the signal output from the signal processing circuit 7 such as the RF signal amplifying/processing circuit 7.

The optical disc apparatus 1 includes a digital signal processing circuit 8 that demodulates the digital signal output from the signal processing circuit 7 such as the RF signal amplifying/processing circuit 7. The digital signal output from the signal processing circuit 7 such as the RF signal amplifying/processing circuit 7 is input to the digital signal processing circuit 8. The digital signal processing circuit 8 is configured to perform the demodulation operation of various signals.

The optical disc apparatus 1 includes a jitter-value detection circuit 9 that detects the jitter value, which is a fluctuation value of a signal, based on the signal read from the optical disc M by the PDIC 5 of the OPU 2 having the OBL 4. Specifically, the optical disc apparatus 1 includes the jitter-value detection circuit 9, so-called jitter measurement circuit 9 that detects the jitter value, which is a fluctuation value of a signal, based on the signal obtained from the digital signal processing circuit 8 through the signal processing circuit 7 such as the RF signal amplifying/processing circuit 7.

The signal generated in the digital signal processing circuit 8 is input to the jitter measurement circuit 9. For example, if the optical disc M is an optical disc of the CD standard, the jitter measurement circuit 9 detects a signal with a length of 3 T to 11 T to detect the jitter value, i.e., a time dependent variation of the frequency of the reproduction signal based on a reference clock signal. The smaller the jitter value detected in the jitter measurement circuit 9 is, the smaller the time dependent variation is so that the reproduction characteristics are considered to be good.

When a synchronous signal is detected from the high frequency signal such as the RF signal, a time variation of a frequency F is detected with the reference clock. The smaller the time variation is in value, the smaller it is the time variation is so that the performance is considered to be good. The reference clock is abbreviated and used as a reference CLK. When describing the length of the synchronizing system, for example, the length thereof is 3 T to 11 T in the CD series, the length thereof is 3 T to 11 T in some cases and mainly 3 T to 14 T in the DVD series, the length thereof is 2 T to 11 T in the "HD DVD" series, and the length thereof is 2 T to 8 T in the "Blu-ray Disc" series.

The optical disc apparatus 1 includes a system control circuit 10 that: the signal output from the jitter measurement circuit 9 is input to; and that controls the optical disc apparatus 1 as a whole. Various control/operations of the optical disc apparatus 1 and the OPU 2 are executed by the system control circuit 10. The system control circuit 10 is made up of a microcomputer. A microcomputer (micro computer) means a very small computer.

The system control microcomputer is a CPU, a system controller, a microprocessor, a microcomputer, etc., and is a controlling unit responsible for system control of the optical disc apparatus 1 as a whole. "CPU" stands for "Central Processing Unit" and means a central computing device. The functions included in the CPU 10 are implemented via software, so-called program.

The optical disc apparatus 1 includes a first memory circuit 11 having stored therein a program for causing the CPU 10 to perform various controls. The functions implemented by software are stored in the first memory circuit 11 accessible from the CPU 10. The system control circuit 10 is configured to perform various controls/operations based on the program stored in the first memory circuit 11 such as a flash ROM. "ROM" stands for "read-only memory". For example, a flash memory is used as the first memory circuit 11.

Specifically describing the first memory circuit 11, for example, the first memory circuit 11 may be ROM such as EEPROM. ROM means a memory for read-only. EEPROM means ROM whose contents can electrically be rewritten. EEPROM is a so-called nonvolatile memory. When a change is made in EEPROM, a voltage higher than a normal voltage is used. In EEPROM, stored information can electrically be erased. "EEPROM" stands for "Electronically Erasable and Programmable Read Only Memory".

Alternatively, the first memory circuit 11 may be ROM such as EPROM. EPROM means ROM whose memory contents can be erased/written any number of times. In EPROM, when memory contents are erased, a particular method is used that is different from a method used at the time of reading. "EPROM" stands for "Erasable Programmable Read Only Memory".

The optical disc apparatus 1 includes a second memory circuit 12 where various values input to the CPU 10 can be stored/erased. For example, RAM can be used as the second memory circuit 12. RAM means a storage device storing data accessible in substantially the same time regardless of storage location and order. "RAM" stands for "random access memory". The system control circuit 10 controls the second memory circuit 12 such as RAM as to an operation thereof. The second memory circuit 12 is configured to be capable of having stored therein a defocus value and a jitter value corresponding to the defocus value. The second memory circuit 12 is configured to be capable of having stored therein a detrack value and a jitter value corresponding to the detrack value. The second memory circuit 12 is configured to be capable of having stored therein a tilt value and a jitter value corresponding to the tilt value. The second memory circuit 12 is configured to be capable of having stored therein at least one or more values selected from a group consisting of a defocus value and a jitter value corresponding to the defocus value, a detrack value and a jitter value corresponding to the detrack value, and a tilt value and a jitter value corresponding to the tilt value.

Although the second memory circuit 12 is configured to be capable of having stored therein the three forms of (a total of six kinds) values which are a defocus value and a jitter value corresponding to the defocus value, a detrack value and a jitter value corresponding to the detrack value, and a tilt value and a jitter value corresponding to the tilt value, in accordance with the design/specification, etc. of the optical disc apparatus 1, for example, the second memory circuit 12 may be configured to be capable of having stored therein the two forms of (a total of four kinds) values which are a defocus value and a jitter value corresponding to the defocus value, and a detrack value and a jitter value corresponding to the detrack value. Alternatively, in accordance with the design/specification, etc. of the optical disc apparatus 1, for example, the second memory circuit 12 may be configured to be capable of having stored therein the two forms of (a total of four kinds) values which are a detrack value and a jitter value corresponding to the detrack value, and a tilt value and a jitter value corresponding to the tilt value. Alternatively, in accordance with the design/specification, etc. of the optical disc apparatus 1, for example, the second memory circuit 12 may be configured to be capable of having stored therein the two forms of (a total of four kinds) values which are a tilt value and a jitter value corresponding to the tilt value, and a defocus value and a jitter value corresponding to the defocus value.

In accordance with the design/specification, etc. of the optical disc apparatus 1, for example, the second memory circuit 12 is configured to be capable of having stored therein a plurality of forms of values to be required, which are selected from a group consisting of a defocus value and a jitter value corresponding to the defocus value, a detrack value and a jitter value corresponding to the detrack value, and a tilt value and a jitter value corresponding to the tilt value.

The optical disc apparatus 1 includes a defocus-value setting circuit 21: that adjusts the defocus value used for moving the OBL 4 in the light axis direction Df of the OBL 4 when the OBL 4 of the OPU 2 is focused on the signal face portion Ms of the optical disc M based on the signal having passed through the jitter measurement circuit 9 and the CPU 10; and that causes a focusing servo circuit 31 to perform the defocus adjustment based on the defocus value having been adjusted and set.

The optical disc apparatus 1 includes the focusing servo circuit 31 that enables the focusing servo operation of the lens holder (not shown) including the OBL 4 based on the focusing error signal generated in the front-end processing unit 6. Specifically, the optical disc apparatus 1 includes the focusing servo circuit 31: that the focusing error signal generated in the front-end processing unit 6 based on the signal detected by the PDIC 5 is input to; and that generates a control signal causing the OBL 4 included in the OPU 2 to be displaced substantially in the light axis direction Df of the OBL 4, which is a direction orthogonal to the surface Mf of the optical disc M. The focusing error signal is generated in the front-end processing unit 6 and then output from the front-end processing unit 6, to be input to the focusing servo circuit 31. The focusing servo circuit 31 is configured with the use of an equalizer. The focusing servo circuit 31 is configured as a digital equalizer capable of supporting a digital signal. An equalizer (equalizer) is an electric circuit for processing and adjusting overall frequency characteristics of a signal such as an audio signal. An equalizer is abbreviated as "EQ".

The defocus value for the focusing servo circuit 31 is set by the defocus-value setting circuit 21. The defocus-value setting circuit 21 is configured to be controlled by the system control circuit 10. If the operation for setting the defocus value suitable for the optical disc (M) is performed in the optical disc apparatus 1 after the optical disc (M) is disposed in the optical disc apparatus 1, the defocus value set for the focusing servo circuit 31 is changed, for example, in a stepwise of 2%, from −10% to +10%, or specifically, −8% to +8%, relative to the defocus value 0 that is a reference value, for example.

In accordance with the design/specification, etc. of the optical disc apparatus 1, if the operation for setting the defocus value suitable for the optical disc (M) is performed in the optical disc apparatus 1 after the optical disc (M) is disposed in the optical disc apparatus 1, the defocus value set for the focusing servo circuit 31 may be changed, for example, in a stepwise of 1%, from −10% to +10%, or specifically, −8% to +8%, relative to the defocus value 0 that is a reference value, for example.

The optical disc apparatus 1 includes a detrack-value setting circuit 22: that adjusts the detrack value used for moving the OBL 4 in the radial direction Dt of the optical disc M when the OBL 4 of the OPU 2 is focused on the signal face portion Ms of the optical disc M based on the signal having passed through the jitter measurement circuit 9 and the CPU 10; and that causes a tracking servo circuit 32 to perform the detrack adjustment based on the detrack value having been adjusted and set.

The optical disc apparatus 1 includes the tracking servo circuit 32 that enables the tracking servo operation of the lens holder (not shown) including the OBL 4 based on the tracking error signal generated in the front-end processing unit 6. Specifically, the optical disc apparatus 1 includes the tracking servo circuit 32: that the tracking error signal generated in the front-end processing unit 6 based on the signal detected by the PDIC 5 is input to; and that generates a control signal causing the OBL 4 including in the OPU 2 to be displaced substantially in the radial direction Dt of the optical disc M. The tracking error signal is generated in the front-end processing unit 6 and then output from the front-end processing unit 6, to be input to the tracking servo circuit 32. The tracking servo circuit 32 is configured with the use of an equalizer. The tracking servo circuit 32 is configured as a digital equalizer capable of supporting a digital signal.

The detrack value for the tracking servo circuit 32 is set by the detrack-value setting circuit 22. The detrack-value setting circuit 22 is configured to be controlled by the system control circuit 10. If the operation for setting the detrack value suitable for the optical disc (M) is performed in the optical disc apparatus 1 after the optical disc (M) is disposed in the optical disc apparatus 1, the detrack value set for the tracking servo circuit 32 is changed, for example, in a stepwise of 2%, from −10% to +10%, or specifically, −8% to +8%, relative to the detrack value 0 that is a reference value, for example.

In accordance with the design/specification, etc. of the optical disc apparatus 1, if the operation for setting the detrack value suitable for the optical disc (M) is performed in the optical disc apparatus 1 after the optical disc (M) is disposed in the optical disc apparatus 1, the detrack value set for the tracking servo circuit 32 may be changed, for example, in a stepwise of 1%, from −10% to +10%, or specifically, −8% to +8%, relative to the defocus value 0 that is a reference value, for example.

The optical disc apparatus 1 includes a tilt-value setting circuit 23: that adjusts the tilt value used for correcting the angular displacement of the OBL 4 relative to the signal face portion Ms of the optical disc M when the OBL 4 of the OPU 2 is focused on the signal face portion Ms of the optical disc M based on the signal having passed through the jitter measurement circuit 9 and the CPU 10; and that causes the tilt adjustment to be performed based on the tilt value having adjusted and set.

The suitable tilt value is set by the tilt-value setting circuit 23. The tilt-value setting circuit 23 is configured to be controlled by the system control circuit 10. If the operation for setting the tilt value suitable for the optical disc (M) is performed in the optical disc apparatus 1 after the optical disc (M) is disposed in the optical disc apparatus 1, the tilt value to be set is changed, for example, in a stepwise of 2%, from −10% to +10%, or specifically, −8% to +8%, relative to the tilt value 0 that is a reference value, for example.

In accordance with the design/specification, etc. of the optical disc apparatus 1, if the operation for setting the tilt value suitable for the optical disc (M) is performed in the optical disc apparatus 1 after the optical disc (M) is disposed in the optical disc apparatus 1, the tilt value to be set may be changed, for example, in a stepwise of 1%, from −10% to +10%, or specifically, −8% to +8%, relative to the tilt value 0 that is a reference value, for example.

Figure 3:
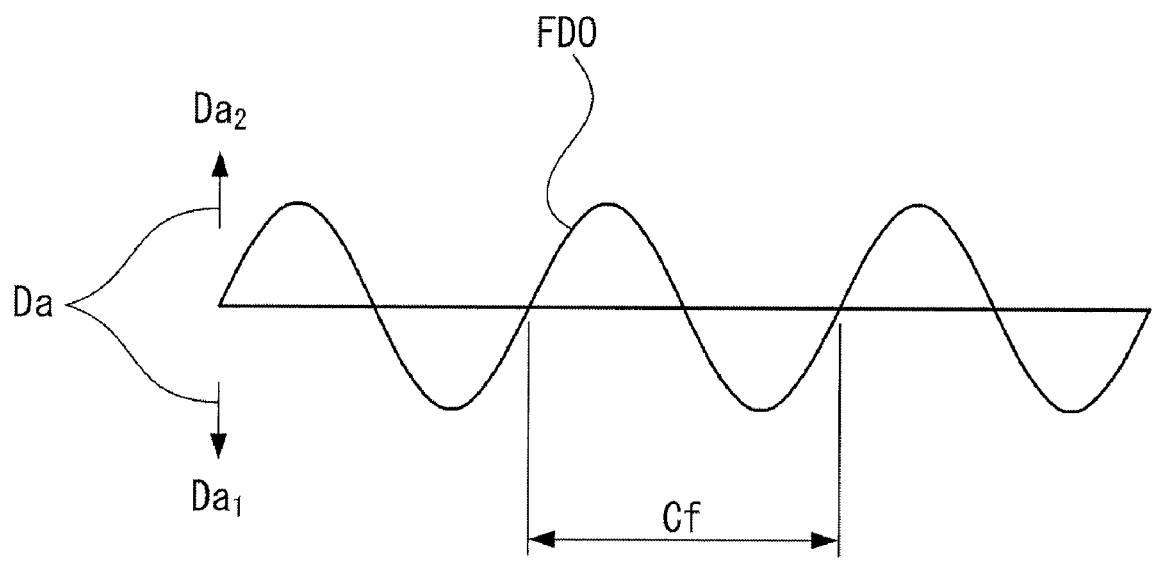
FIG. 3 is a waveform chart of an oscillation period when rotating a wobbling disc considered as a medium.

The optical disc apparatus 1 includes a focusing tilt band-pass filter circuit 41 (FIG. 1) that a focusing control signal FDO output from, for example, the focusing servo circuit 31 is input to; and that extracts a signal corresponding to a rotation period Cf (FIG. 3) of the optical disc M based on the focusing control signal FDO. The FDO stands for "focus drive out" in this description. The band-pass filter (band pass filter) is abbreviated as "BPF". The BPF means a filter that only allows a frequency signal within a predetermined range to be passed therethrough and that attenuates a signal other than the frequency signal within the predetermined range. If wobbling occurs in the optical disc M (FIG. 2) at the time of reproducing from the disc or recording into the disc, the wobbling component becomes the FDO signal (FIG. 3). The focusing servo operation is executed by the application of the FDO signal.

Figure 5:
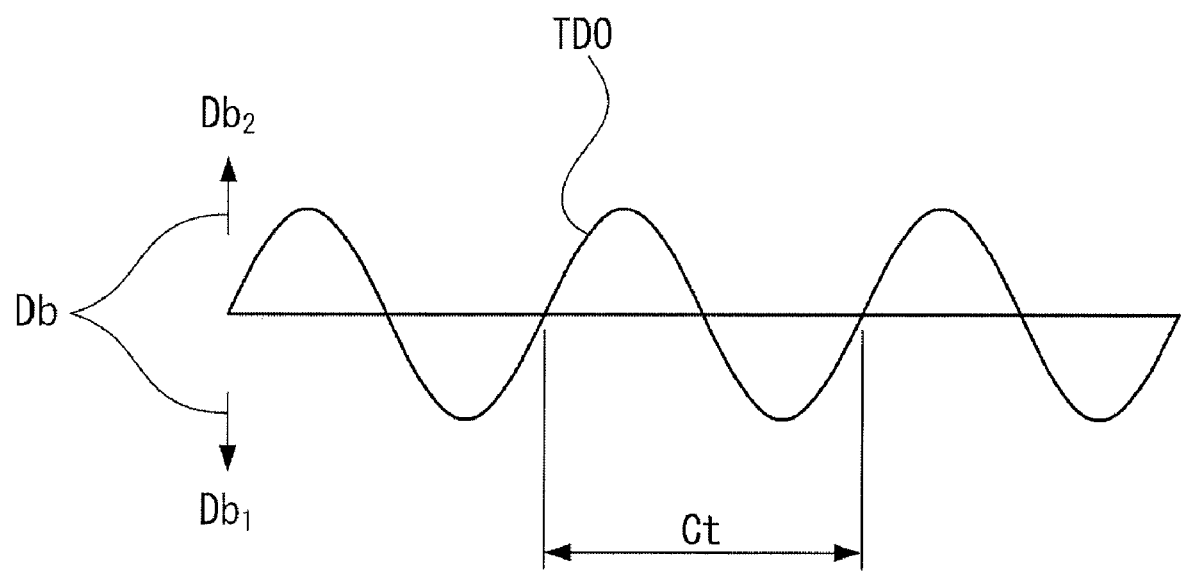
FIG. 5 is a waveform chart of an oscillation period when rotating an eccentric disc considered as a medium.

The optical disc apparatus 1 (FIG. 1) includes a tracking tilt band-pass filter circuit 42 (FIG. 1) that a tracking control signal TDO output from, for example, the tracking servo circuit 32 is input to; and that extracts a signal corresponding to a rotation period Ct (FIG. 5) of the optical disc M based on the tracking control signal TDO. The TDO stands for "tracking drive out" in this description. If eccentricity occurs in the optical disc M (FIGS. 4A and 4B) at the time of reproducing from the disc or recording into the disc, the eccentricity component becomes the TDO signal (FIG. 5). The tracking servo operation is executed by the application of the TDO signal.

In accordance with the design/specification, etc. of the optical disc apparatus 1 and the optical pickup device 2, for example, the optical disc apparatus 1 is also usable if the focusing tilt band-pass filter circuit 41, the tracking tilt band-pass filter circuit 42, etc. are omitted without being provided.

The optical disc apparatus 1 includes a focusing tilt signal adjustment circuit 51 that causes the tilt adjustment to be performed for the OBL 4 as to the angular displacement based on the jitter detected by the jitter measurement circuit 9 when the angular displacement relative to the signal face portion Ms of the optical disc M is caused to occur in the OBL 4 of the OPU 2. The focusing tilt signal adjustment circuit 51 is capable of adjusting the level of the signal extracted in the focusing tilt band-pass filter circuit 41. For example, an amp is used for the focusing tilt signal adjustment circuit 51. The amp stands for an amplifier (amplifier) and means amplification equipment.

The optical disc apparatus 1 includes a tracking tilt signal adjustment circuit 52 that causes the tilt adjustment to be performed for the OBL 4 as to the angular displacement based on the jitter detected by the jitter measurement circuit 9 when the angular displacement relative to the signal face portion Ms of the optical disc M is caused to occur in the OBL 4 of the OPU 2. The tracking tilt signal adjustment circuit 52 is capable of adjusting the level of the signal extracted by the tracking tilt band-pass filter circuit 42. For example, an amp is used for the tracking tilt signal adjustment circuit 52.

The optical disc apparatus 1 includes an addition circuit 53 that adds a tilt-value setting adjustment signal output from the tilt-value adjustment circuit 23 to the tilt adjustment signal output from the tilt signal adjustment circuits 51, 52. Specifically, the optical disc apparatus 1 includes the addition circuit 53 that adds the focusing tilt adjustment signal output from the focusing tilt signal adjustment circuit 51, the tracking tilt adjustment signal output from the tracking tilt signal adjustment circuit 52, and the tilt-value setting adjustment signal output from the tilt-value adjustment circuit 23. The focusing tilt adjustment signal is output from the focusing tilt signal adjustment circuit 51. The tracking tilt adjustment signal is output from the tracking tilt signal adjustment circuit 52. The tilt-value setting adjustment signal set to the suitable tilt value is output from the tilt-value adjustment circuit 23. The signal is added by the addition circuit 53.

The optical disc apparatus 1 includes a focusing coil drive circuit 61: that the focusing control signal output from the focusing servo circuit 31 is input to; and that supplies a drive signal to the focusing coil 71 included in the OPU 2. The focusing servo circuit 31 outputs to the focusing coil drive circuit 61 the focusing control signal for reducing the level of the focusing error signal based on the input focusing error signal. The focusing control signal output from the focusing servo circuit 31 is input to the focusing coil drive circuit 61. The focusing coil drive circuit 61 supplies the focusing coil drive signal to the focusing coil 71. When the focus of the laser beam L condensed by the OBL 4 is caused to be displaced in the focusing direction Df of the OBL 4 relative to the pits Mt of the optical disc M, the focusing drive signal is sent from the focusing coil drive circuit 61 to the focusing coil 71 of the OPU 2 to perform the focusing adjustment of the OBL 4 of the OPU 2. The drive circuit is referred to as a driver, etc.

The optical disc apparatus 1 includes a tracking coil drive circuit 62 that the tracking control signal output from the tracking servo circuit 32 is input to, and that supplies a drive signal to the tracking coil 72 included in the OPU 2. The tracking servo circuit 32 outputs to the tracking coil drive circuit 62 the tracking control signal for reducing the level of the tracking error signal based on the input tracking error signal. The tracking control signal output from the tracking servo circuit 32 is input to the tracking coil drive circuit 62. The tracking coil drive circuit 62 supplies the tracking coil drive signal to the tracking coil 72. When the focus of the laser beam L condensed by the OBL 4 is caused to be displaced in the tracking direction Df of the OBL 4 relative to the pits Mt of the optical disc M, the tracking drive signal is sent from the tracking coil drive circuit 62 to the tracking coil 72 of the OPU 2 to perform the tracking adjustment of the OBL 4 of the OPU 2.

The optical disc apparatus 1 includes a tilt coil drive circuit 63 that the addition signal output from the addition circuit 53 is input to. Specifically, the optical disc apparatus 1 includes the tilt coil drive circuit 63 that the tilt control signal output from the addition circuit 53 is input to, and that supplies a drive signal to the tilt coil 73 included in the OPU 2. There is generated in the tilt coil drive circuit 63 the drive signal to be sent to the tilt coil 73 of the OPU 2 based on the addition signal generated in the addition circuit 53 to perform the tilt adjustment of the angle of the OBL 4 of the OPU 2. The tilt coil drive circuit 63 supplies the tilt coil drive signal to the tilt coil 73. When the focus of the laser beam L condensed by the OBL 4 is caused to be displaced relative to the pits Mt of the optical disc M, the tilt drive signal is sent from the tilt coil drive circuit 63 to the tilt coil 73 of the OPU 2 to perform the tilt adjustment of the OBL 4 of the OPU 2.

As shown in FIG. 1, the optical disc apparatus 1 includes at least one or more setting circuits 21, 22, 23 among the setting circuits 21, 22, 23 to be selected from a group consisting of the defocus-value setting circuit 21, the detrack-value setting circuit 22, and the tilt-value setting circuit 23. Therefore, the optical disc apparatus 1 is configured to be capable of setting at least one or more optimum values among the optimum defocus value, the optimum detrack value, and the optimum tilt value.

Specifically, the optical disc apparatus 1 of FIG. 1 includes the OPU 2, the optical output signal processing circuit 6, the signal processing circuit 7, the digital signal processing circuit 8, the jitter-value detection circuit 9, the system control circuit 10, the first memory circuit 11, the second memory circuit 12, the defocus-value setting circuit 21, the detrack-value setting circuit 22, the tilt-value setting circuit 23, the focusing servo circuit 31, the tracking servo circuit 32, the focusing tilt band-pass filter circuit 41, the tracking tilt band-pass filter circuit 42, the focusing tilt signal adjustment circuit 51, the tracking tilt signal adjustment circuit 52, the addition circuit 53, the focusing coil drive circuit 61, the tracking coil drive circuit 62, and the tilt coil drive circuit 63. A lens adjustment circuit of the optical disc apparatus 1 is configured as above.

In accordance with the design/specification, etc. of the optical disc apparatus 1, for example, the OPU 2 and the optical disc apparatus 1 are also usable in which the focusing coil 71 and/or the tracking coil 72 of the OPU 2 also serves as the tilt coil 73 of the OPU 2. Specifically, the OPU 2 and the optical disc apparatus 1 are also usable in which the focusing coil 71 and/or the tracking coil 72 of the OPU 2 are configured as the coil 71/72 also capable of performing the tilt adjustment, by connecting a conductor extended from the tilt coil drive circuit 63 of the optical disc apparatus 1 to, for example, the focusing coil 71 and/or the tracking coil 72 of the OPU 2 in a conductive manner without providing the tilt coil 73 exclusively for the tilt adjustment on the OPU 2. More specifically, the focusing coil 71 of the OPU 2 may be configured to also serve as the tilt coil 73 of the OPU 2 by connecting a conductor extended from the tilt coil drive circuit 63 of the optical disc apparatus 1 to, for example, the focusing coil 71 of the OPU 2 in a conductive manner without providing the tilt coil 73 exclusively for the tilt adjustment in the OPU 2, so that the focusing coil 71 is configured as, for example, the focus/tilt coil 71 that functions at the time of the focusing adjustment and/or the tilt adjustment.

The optical disc apparatus 1 includes a digital signal processing device including, for example, the digital signal processing circuit 8, which is so-called digital signal processor. The digital signal processor means a microprocessor specialized mainly in digital signal processing, for example. The digital signal processor (digital signal processor) is abbreviated as "DSP". A chip including the digital signal processing circuit 8 making up the DSP is provided. Since the DSP including the digital signal processing circuit 8 is used, high-speed calculation processing can be executed by the CPU 10, etc., for example. By using the DSP, for example, since an SN (signal/noise) ratio becomes substantially 90 db (decibel) or more when executing signal processing, the effect of noise can easily be avoided and the effect of ambient atmospheric temperature can also easily be restrained. Therefore, highly accurate calculation processing, etc., is executed at high speed by using the DSP.

For example, the DSP of the optical disc apparatus 1 includes the digital signal processing circuit 8, the jitter-value detection circuit 9, the system control circuit 10, the defocus-value setting circuit 21, the detrack-value setting circuit 22, the tilt-value setting circuit 23, the focusing servo circuit 31, and the tracking servo circuit 32. For example, a chip obtained by integrating complicated circuits into one package is configured with the optical output signal processing circuit 6, the signal processing circuit 7, the digital signal processing circuit 8, the jitter-value detection circuit 9, the system control circuit 10, the first memory circuit 11, the second memory circuit 12, the defocus-value setting circuit 21, the detrack-value setting circuit 22, the tilt-value setting circuit 23, the focusing servo circuit 31, the tracking servo circuit 32, the focusing tilt band-pass filter circuit 41, and the tracking tilt band-pass filter circuit 42.

There is made up the optical disc apparatus 1 capable of setting the optimum defocus value by making up the optical disc apparatus 1 shown in FIG. 1. The optimum defocus value is set in the optical disc apparatus 1 in accordance with the jitter value detected based on the signal read from the optical disc M and the defocus value based on the detected jitter value.

There is made up the optical disc apparatus 1 capable of setting the optimum detrack value by making up the optical disc apparatus 1 shown in FIG. 1. The optimum detrack value is set in the optical disc apparatus 1 in accordance with the jitter value detected based on the signal read from the optical disc M and the detrack value based on the detected jitter value.

There is made up the optical disc apparatus 1 capable of setting the optimum tilt value by making up the optical disc apparatus 1 shown in FIG. 1. The optimum tilt value is set in the optical disc apparatus 1 in accordance with the jitter value detected based on the signal read from the optical disc M and the tilt value based on the detected jitter value.

After the optical disc M is disposed in the optical disc apparatus 1, the signal is read from the optical disc M and the jitter value is detected so that the defocus adjustment of the OBL 4 for the optical disc M is performed. The above defocus adjustment is performed within substantially 20 seconds.

Since the time spent on the defocus-value adjusting method of the optical disc apparatus 1 is set to a short time, the defocus adjustment is performed in the optical disc apparatus 1 without waiting for a long time due to the defocus adjustment. Since the defocus adjustment is performed within substantially 20 seconds when performing the defocus adjustment of the OBL 4 for the optical disc M, a situation is avoided where one must wait for a very long time due to the defocus adjustment automatically performed by the optical disc apparatus 1 from the time when the optical disc M is disposed in the optical disc apparatus 1 to the time when the signal such as data/information is started to be read from the optical disc M.

When the detrack adjustment of the OBL 4 is performed for the optical disc M by reading the signal from the optical disc M and detecting the jitter value after the optical disc M is disposed in the optical disc apparatus 1, the detrack adjustment is performed within substantially 20 seconds.

Since the time spent on the detrack-value adjusting method of the optical disc apparatus 1 is set to a short time, the detrack adjustment is performed in the optical disc apparatus 1 without waiting for a long time due to the detrack adjustment. Since the detrack adjustment is performed within substantially 20 seconds when performing the detrack adjustment of the OBL 4 for the optical disc M, a situation is avoided where one must wait for a very long time due to the detrack adjustment automatically performed by the optical disc apparatus 1 from the time when the optical disc M is disposed in the optical disc apparatus 1 to the time when the signal such as data/information is started to be read from the optical disc M.

When the tilt adjustment of the OBL 4 is performed for the optical disc M by reading the signal from the optical disc M and detecting the jitter value after the optical disc M is disposed in the optical disc apparatus 1, the tilt adjustment is performed within substantially 20 seconds.

Since the time spent on the tilt-value adjusting method of the optical disc apparatus 1 is set to a short time, the tilt adjustment is performed in the optical disc apparatus 1 without waiting for a long time due to the tilt adjustment. Since the tilt adjustment is performed within substantially 20 seconds when performing the tilt adjustment of the OBL 4 for the optical disc M, a situation is avoided where one must wait for a very long time due to the tilt adjustment automatically performed by the optical disc apparatus 1 from the time when the optical disc M is disposed in the optical disc apparatus 1 to the time when the signal such as data/information is started to be read from the optical disc M.

Although the optical disc apparatus 1 includes the three setting circuits 21, 22, and 23, which are the defocus-value setting circuit 21, the detrack-value setting circuit 22, and the tilt-value setting circuit 23, the optical disc apparatus 1 may be configured to include, for example, the defocus-value setting circuit 21 and the detrack-value setting circuit 22 in accordance with the design/specification, etc. of the optical disc apparatus 1. The optical disc apparatus 1 may be configured to include, for example, the detrack-value setting circuit 22 and the tilt-value setting circuit 23, in accordance with the design/specification, etc. of the optical disc apparatus 1. The optical disc apparatus 1 may be configured to include, for example, the tilt-value setting circuit 23 and the defocus-value setting circuit 21 in accordance with the design/specification, etc. of the optical disc apparatus 1.

In accordance with the design/specification, etc. of the optical disc apparatus 1, for example, the optical disc apparatus 1 may be configured to include a plurality of the required setting circuits 21 and/or 22 and/or 23 among the setting circuits 21, 22, 23 selected from a group consisting of the defocus-value setting circuit 21, the detrack-value setting circuit 22, and the tilt-value setting circuit 23.

When performing the adjusting method of the optical disc apparatus 1, the optical disc apparatus 1 including the OPU 2 with the OBL 4 is used to detect the jitter value of the signal read from the optical disc M and to adjust the position of the OBL 4 for the optical disc M based on the detected jitter value.

The defocus-value adjusting method of the optical disc apparatus 1 will then be described.

The defocus-value adjusting method of the optical disc apparatus 1 will be described with reference to the figures in conjunction with flowcharts shown in FIGS. 6A, 6B, and 7.

The defocus adjusting method of the optical disc apparatus 1 based on the jitter value is performed as follows. The offset adjustment of the focus is performed at the time of initial data reading or immediately after the initial data reading of the OPU 2 in the vicinity of the disc inner circumferential portion Mc immediately before performing the data reproduction of the reproduction/recording optical disc M (FIG. 1), for example. At this time, there are performed the defocus-value adjustment process, etc. corresponding to a reference voltage value (Vref), for example. For example, in the optical disc apparatus 1, there is read a signal having the shape of S-curve substantially laid sideways with −50% to +50% of the defocus values centering a reference value 0, which is the reference voltage value (Vref).

The optical disc apparatus 1 is used to perform the focusing adjustment of the OBL 4 for the signal face portion Ms of the optical disc M. The optical disc apparatus 1 is used to perform the defocus-value adjusting method in the optical disc apparatus 1.

For example, when the optical disc apparatus 1 is turned on, preparations are started for performing the defocus-value adjusting method of the optical disc apparatus 1. When the optical disc apparatus 1 is turned on and the optical disc apparatus 1 is rendered in the power-on state, for example, data such as various pieces of information are sent from the memory circuit 11 such as the ROM 11 to the system control circuit 10. At this point, various data, for example, a predetermined jitter value, jitter($i_a$f), and a determination value, jitter($i_a$s), are sent to the system control circuit 10 and set in the system control circuit 10 (FIG. 6A: S110).

The defocus-value adjusting method of this optical disc apparatus 1 (FIG. 1) is a defocus-value adjusting method of the optical disc apparatus 1 that performs the focusing adjustment of the OBL 4 for the optical disc M with the use of the optical disc apparatus 1 including the OPU 2 having the OBL 4 by detecting the jitter value of the signal read from the optical disc M and by adjusting the defocus value used for moving the OBL 4 in the light axis direction Df of the OBL 4 when the OBL 4 of the OPU 2 is focused on the signal face portion Ms of the optical disc M based on the detected jitter value. The defocus-value setting process is performed as follows.

Figure 11:
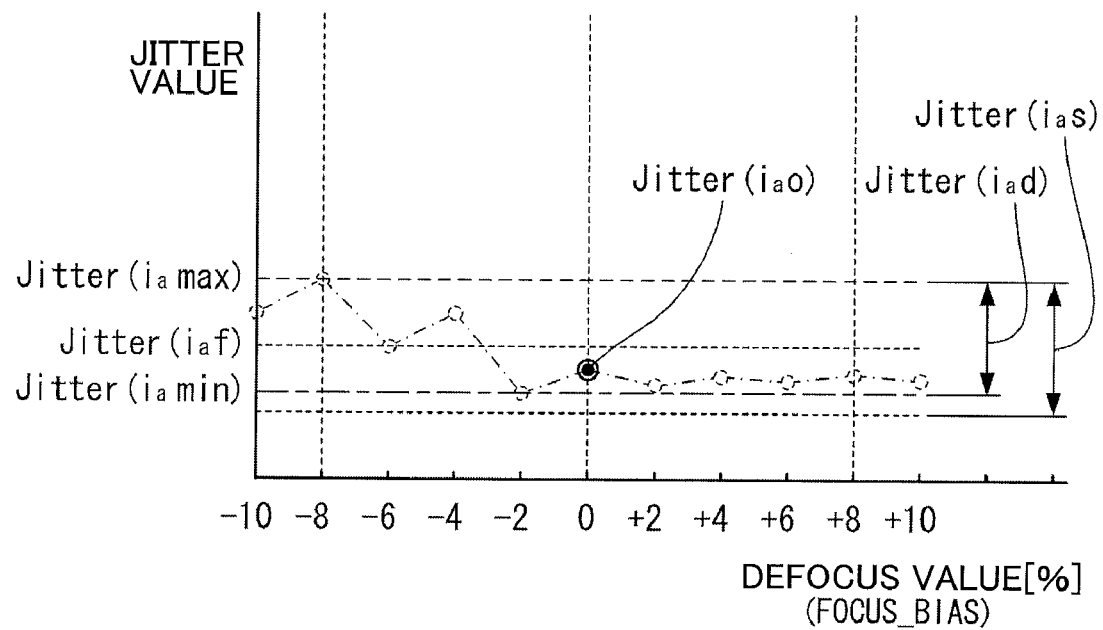
FIG. 11 is also a graphic representation of a relationship between a defocus value and a jitter value.
Figure 12:
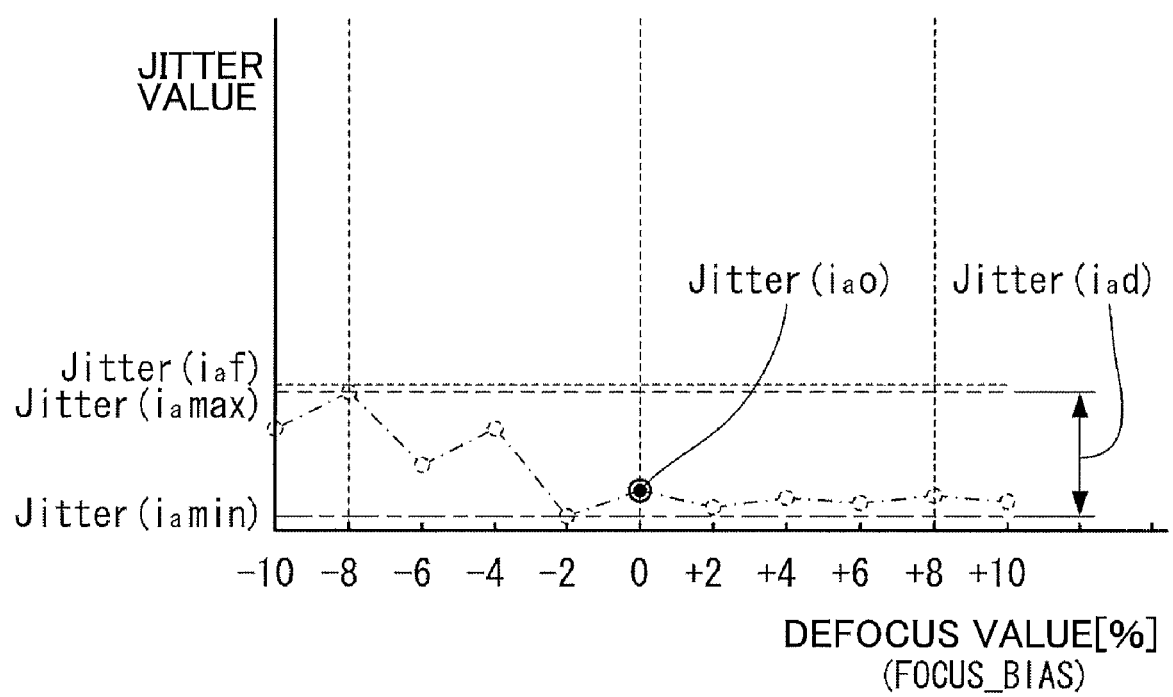
FIG. 12 is also a graphic representation of a relationship between a defocus value and a jitter value.

By disposing the optical disc M in the optical disc apparatus 1, the operation is substantially started for setting the suitable defocus value in the optical disc apparatus 1. First, focus bias, so-called defocus is applied to the focusing coil (FOCUSING COIL) 71 to measure the jitter with the use of the optical disc apparatus 1. When causing the optical disc apparatus 1 to perform the defocus-value adjusting method, the jitter is first detected/measured at the defocus value of ±0 (FIG. 6A: S120). At this point, for example, as shown in FIG. 11 or FIG. 12, if it is determined that the jitter value jitter($i_a$o) at the defocus value of ±0 is a small value equal to or smaller than a specified value jitter($i_a$f) and the program in the CPU 10 determines that the optical disc M (FIG. 1) has good jitter characteristics (FIG. 6A, S130: NO), the defocus value is set to zero (FIG. 6A: S180) and the defocus adjustment is completed.

This optical disc apparatus 1 (FIG. 1) performs a different defocus-value adjusting method for each of the optical disc M with good jitter characteristics and the optical disc (M) presumed/determined to have the jitter characteristics that are not good and requiring the detection/check of jitter values. In this description, for example, presence or absence of parentheses ( ) for the character M is used to differentiate between the optical disc M with good jitter characteristics and the optical disc (M) presumed/determined to have the jitter characteristics that are not good and requiring the detection/check of jitter values.

Figure 8:
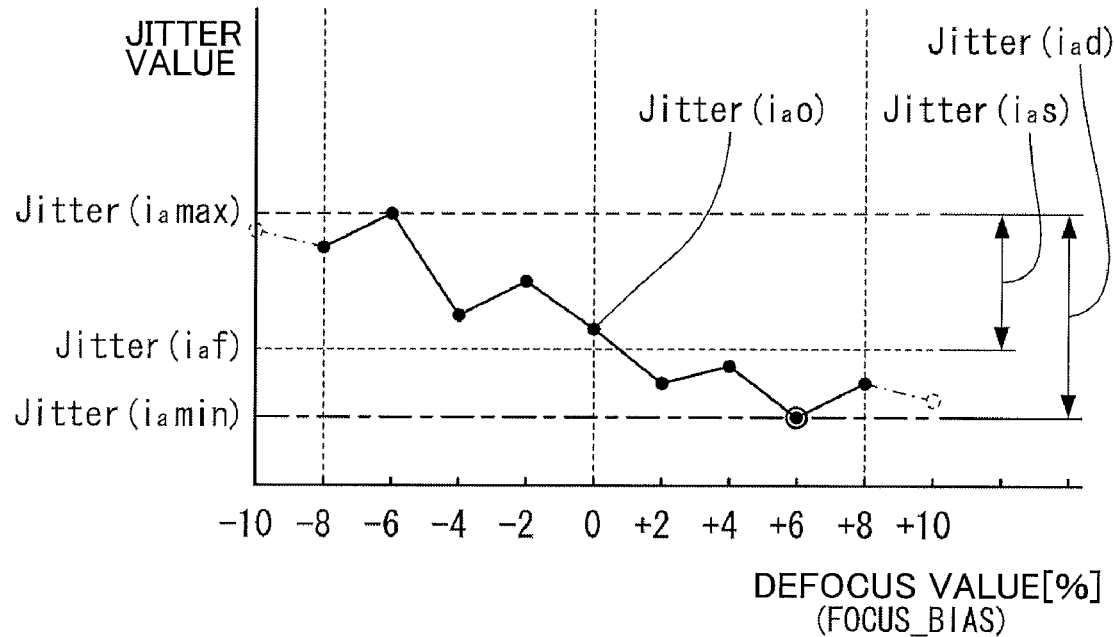
FIG. 8 is a graphical representation of a relationship between a defocus value and a jitter value.
Figure 9:
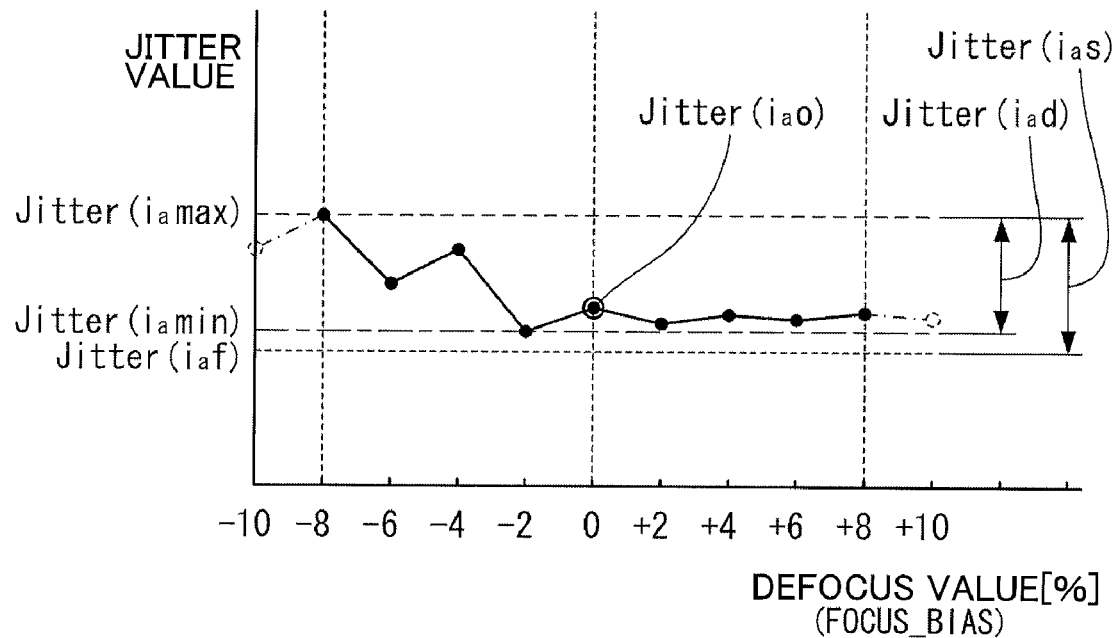
FIG. 9 is also a graphic representation of a relationship between a defocus value and a jitter value.
Figure 10:
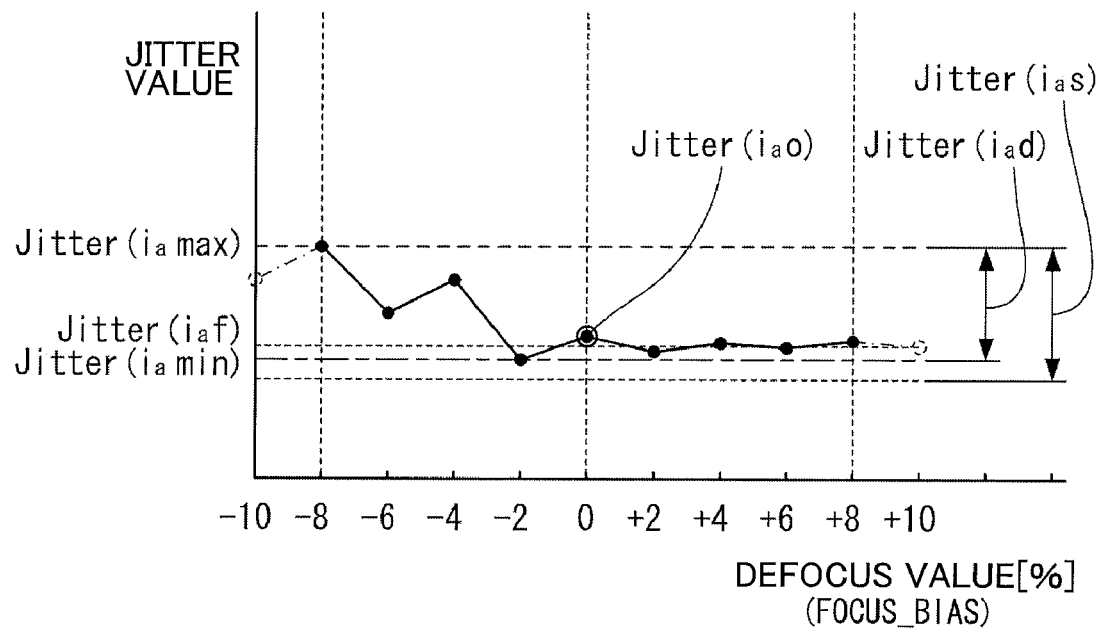
FIG. 10 is also a graphic representation of a relationship between a defocus value and a jitter value.

When the defocus-value adjusting method in the optical disc apparatus 1 is performed with the use of the optical disc apparatus 1, for example, as shown in FIGS. 8, 9, and 10, jitter values are detected/measured as needed. Specifically, in the case of the optical disc (M) for which: it is determined that the jitter value jitter ($i_a$o) at the defocus value of ±0 is a value greater than the specified value jitter ($i_a$f); the program in the CPU 10 (FIG. 1) presumes/determines that the jitter characteristics are not good; and that each of the jitter values requires the detection/check, the following measurement is performed. First, when reading the signal from the optical disc (M) to detect the jitter value, the defocus value within a predetermined range is changed. Specifically, when reading the signal from the optical disc (M) to detect the jitter value, the defocus value is changed stepwise within a predetermined range of numeric values including the reference value 0 of the defocus value (FIGS. 8, 9, and 10) being centered (FIG. 6A: S140, FIG. 6B: S141 to S146). Every time the defocus value is changed stepwise, the jitter value is detected.

The operation of setting the defocus value is performed by the defocus-value setting circuit 21 in the state of performing the reproduction operation for the signal recorded in the optical disc (M) (FIG. 1). In the defocus-value setting circuit 21, a value of the defocus value set for the focusing servo circuit 31 is changed in a stepwise of 2% from −8% to +8% relative to the reference value 0 (FIGS. 8, 9, and 10). At the same time, the jitter value of the reproduction signal is detected correspondingly to the defocus values by the jitter measurement circuit 9 to set the defocus value.

Specifically, while the defocus value for the focusing servo circuit 31 is set by the defocus-value setting circuit 21 to a value lower than the reference value 0 by about −8%, the reproduction operation is performed for the signal recorded in the optical disc (M) to detect the jitter value included in the reproduction signal with the jitter measurement circuit 9. The jitter value detected in this way is stored in the memory circuit 12 such as the RAM 12 along with the defocus value.

The defocus value is changed in a stepwise of 2% from −8% to +8% relative to the reference value 0, the jitter value corresponding to the defocus value is detected, and the jitter value is stored in the memory circuit 12 along with the defocus value. The above operations are repeatedly performed.

Figure 6A:
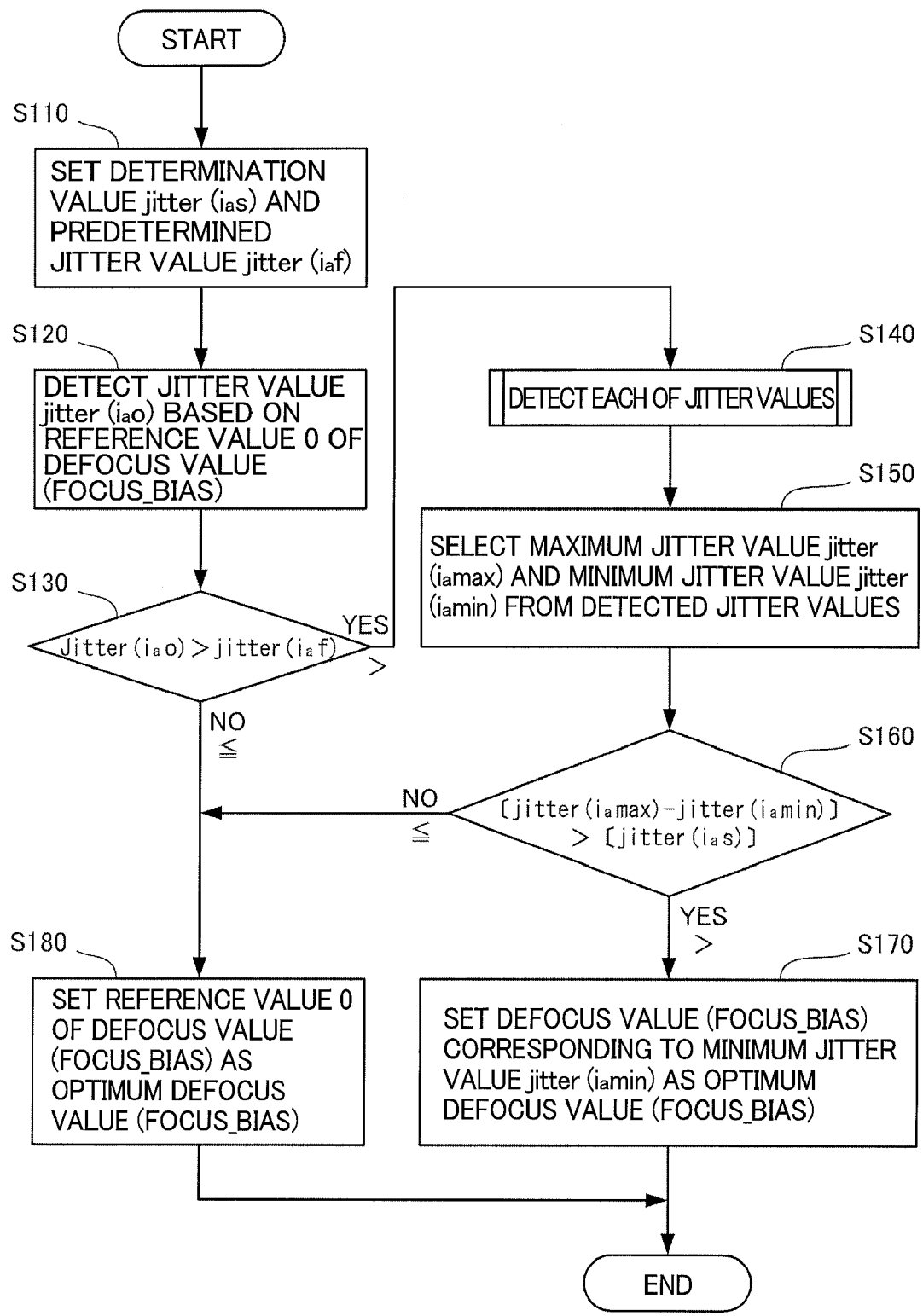
FIG. 6A is a flowchart of an embodiment of a defocus-value adjusting method of a disc apparatus.

When the operation is started for setting the defocus value in the optical disc apparatus 1, in the case of the optical disc (M) for which it is determined that the jitter values require detection/check during the process of the defocus adjusting method of the optical disc apparatus 1, the operation of detecting the jitter value is first performed every time the defocus value is changed within a predetermined range (FIG. 6A: S140, FIG. 6B: S141 to S146). The predetermined range is defined, for example, if the defocus value 0 is defined as a reference value, as the defocus values from −10% to +10% to be set for the focusing servo circuit 31 relative to the reference value (FIGS. 8, 9, and 10). The preferable predetermined range of defocus values is defined, for example, if the defocus value 0 is defined as a reference value, as a range from −8% to +8% to be set for the focusing servo circuit 31 relative to the reference value.

For example, if the defocus value is set to a value smaller than the −10% value, the focusing servo function may not work normally. Alternatively, for example, if the defocus value is set to a value greater than the +10% value, the focusing servo function may not work normally. Therefore, the defocus values from −10% to +10% centering the reference value 0 of the defocus value may be set for the focusing servo circuit 31. Preferably, the focusing servo function works normally by setting the defocus values from −8% to +8% centering the reference value 0 of the defocus value for the focusing servo circuit 31.

For example, in the case of the optical disc (M) (FIG. 1) for which: it is determined that the jitter value jitter($i_a$o) at the reference value 0 of the defocus value (FIGS. 8, 9, and 10) is a value greater than the specified value jitter($i_a$f); it is presumed/determined that the jitter value is not good; and it is also determined that each of the jitter values requires the detection/check, the following process is performed under the control of the program in the CPU 10. The following process is performed by the CPU 10 and the second memory circuit 12.

Figure 6B:
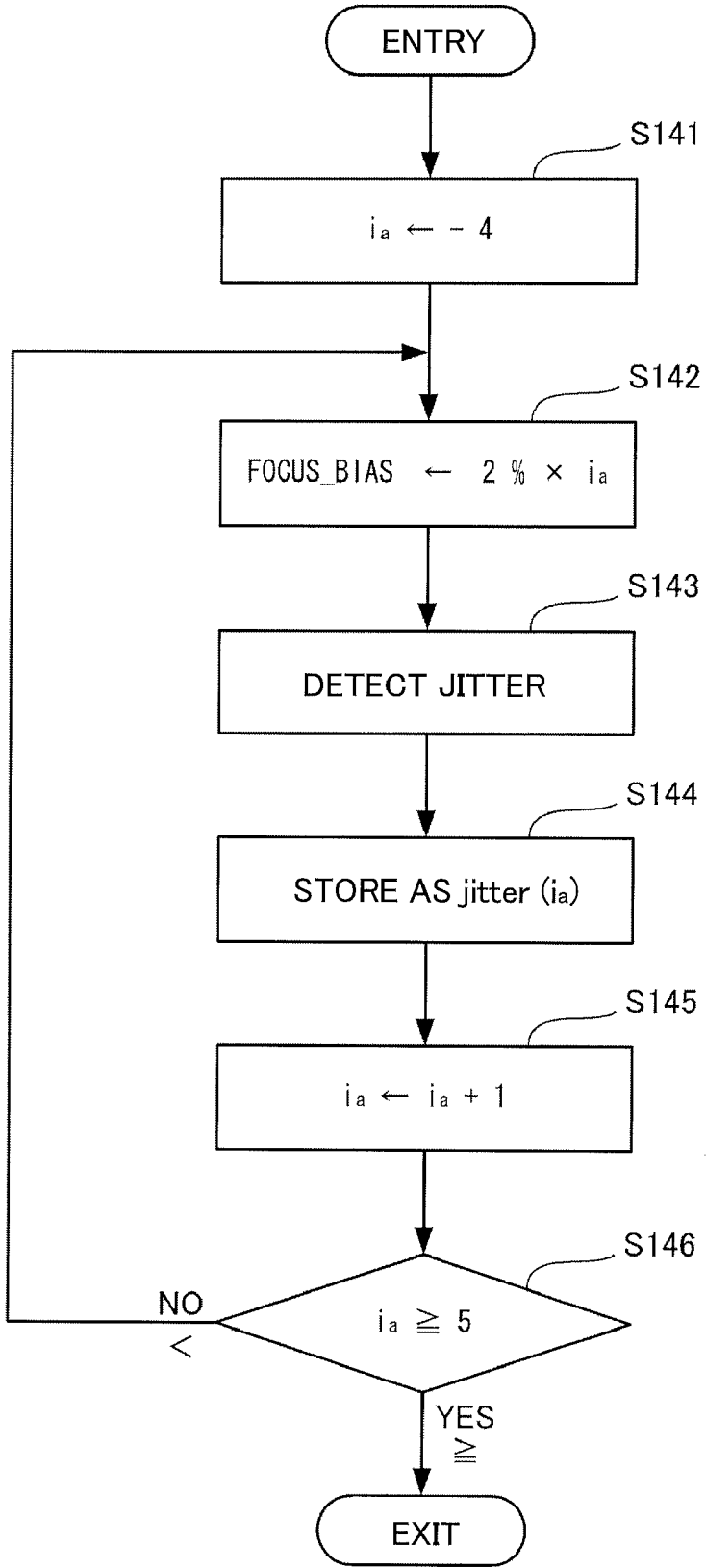
FIG. 6B is a flowchart of a jitter-value detecting process of a defocus-value adjusting method of a disc apparatus.

First, an initial value is set by the program in the CPU 10 to set $i_a$=−4 (FIG. 6B: S141). For example, a value of "DEFOCUS=2%×$i_a$" is set (SET) to "FOCUS_BIAS" (S142). The jitter value is measured by the OPU 2 (S143) and the result is stored in the second memory circuit 12 as "jitter ($i_a$)" (S144).

The "$i_a$" is incremented by the program in the CPU 10 (S141, S142 to S146). Increment (increment) means to increase a numeric value by a given value when repetitive processing, etc. are executed in programming.

In the case of "$i_a$<5" (S146: NO), a value of "DEFOCUS=2%×$i_a$" is set to "FOCUS_BIAS" (S142) and the jitter is measured again by the OPU 2 (S143) to store the result in the second memory circuit 12 as "jitter($i_a$)" (S144). In the case of "$i_a$≧5" (S146: YES), a minimum value is obtained from "jitter($i_a$)", and "$i_a$" at this point is defined as "$i_a$min" (FIG. 6A: S150). In the case of "$i_a$≧5" (FIG. 6B, S146: YES), a maximum value is obtained from "jitter($i_a$)", and "$i_a$" at this point is defined as "$i_a$max" (FIG. 6A: S150).

The optimum defocus value is then set based on a difference value jitter($i_a$d) between the maximum jitter value jitter ($i_a$max) and the minimum jitter value jitter($i_a$min) of the detected jitter values (S160).

The defocus value is changed within the predetermined range: the detection operation of the jitter values is performed (FIG. 6A: S140, FIG. 6B: S141 to S146); and the maximum jitter value jitter($i_a$max) and the minimum jitter value jitter ($i_a$min) are selected from the detected jitter values (FIG. 6A: S150).

After performing the selection setting operation at the step of S150, there is performed a determination operation which determines whether [jitter($i_a$max)−jitter($i_a$min)>jitter($i_a$s)] is satisfied (S160: YES) or [jitter($i_a$max)−jitter($i_a$min)>jitter ($i_a$s)] is not satisfied (S160: NO). If it is determined that [jitter($i_a$max)−jitter($i_a$min)>jitter($i_a$s)] is satisfied at the step of S160 (S160: YES), the defocus value corresponding to the minimum jitter value jitter($i_a$min) is set as the optimum defocus value (S170). Alternatively, if it is determined that [jitter ($i_a$max)−jitter($i_a$min)>jitter($i_a$s)] is not satisfied at the step of S160 (S160: NO), the reference value 0 of the defocus value is set as the optimum defocus value (S180).

The optimum defocus value is set in the optical disc apparatus 1 by performing the defocus-value adjusting method of the optical disc apparatus 1 as above. The jitter value is detected as needed every time the defocus value is changed stepwise within the predetermined range of numeric values including the reference value 0 of the defocus value being centered, so that the optimum defocus value is set based on the difference value jitter($i_a$d) between the maximum jitter value jitter($i_a$max) and the minimum jitter value jitter($i_a$min) of the detected jitter values. Therefore, the optimum defocus value is set in the optical disc apparatus 1. Since the optimum defocus value is set in the optical disc apparatus 1, the OPU 2 performs the stable focusing servo operation for the optical disc M. The defocus value setting operation can easily be performed in the optical disc apparatus 1.

After the optical disc (M) is completely disposed in the optical disc apparatus 1, when reading each of the signals from the optical disc (M) and detecting each of the jitter values to perform the defocus adjustment of the OBL 4 for the optical disc (M), the defocus adjustment is performed within a time period from more than 0 second to substantially 20 seconds. More specifically, after the optical disc (M) is completely disposed in the optical disc apparatus 1, when the defocus value is changed stepwise within the predetermined range of numeric values including the reference value 0 (FIGS. 8, 9, and 10) of the defocus value being centered (FIG. 6A: S140, FIG. 6B: S141 to S146), to read each of the signals from the optical disc (M) (FIG. 1) and detect each of the jitter values, so that the optimum defocus-value adjustment of the OBL 4 for the optical disc (M) (FIG. 1) is performed based on the difference value jitter($i_a$d) between the maximum jitter value jitter($i_a$max) (FIGS. 8, 9, and 10) and the minimum jitter value jitter($i_a$min) of the detected jitter values (FIG. 6A: S160). The above defocus adjustment is preferably completed within a time period from more than 0 second to substantially 15 seconds.

Since the time spent for the defocus-value adjusting method of the optical disc apparatus 1 is set to a short time, there is swiftly completed the setting process when the defocus adjustment is performed in the optical disc apparatus 1 without waiting for a long time due to the defocus adjustment. After the optical disc (M) is completely disposed in the optical disc apparatus 1, when the defocus value is changed stepwise within the predetermined range of numeric values including the reference value 0 of the defocus value being centered, to read each of the signals from the optical disc (M) and detect each of the jitter values so that the defocus adjustment of the OBL 4 for the optical disc (M) is performed based on the difference value jitter($i_a$d) between the maximum jitter value jitter($i_a$max) and the minimum jitter value jitter($i_a$min) of the detected jitter values, the defocus adjustment is performed within a time period from more than 0 second to substantially 20 seconds, preferably, within a time period from more than 0 second to substantially 15 seconds. Therefore, a situation is avoided where one must wait for a very long time due to the defocus adjustment automatically performed by the optical disc apparatus 1 from the time when the optical disc (M) is disposed in the optical disc apparatus 1 to the time when the main data/information/signals of the optical disc (M) are started to be read.

FIG. 8 is a characteristic view of a relationship between the jitter value and the defocus value when it is determined in the CPU 10 (FIG. 1) that [jitter($i_a$max)−jitter($i_a$min)>jitter($i_a$s)] is satisfied (FIG. 6A, S160: YES).

When performing the defocus adjustment of the OBL 4 for the optical disc (M) (FIG. 1), if it is determined that the difference value jitter($i_a$d) between the maximum jitter value jitter($i_a$max) and the minimum jitter value jitter($i_a$min) is a value greater than the predetermined value jitter($i_a$s) as shown in FIG. 8, the defocus value corresponding to the minimum jitter value jitter($i_a$min) is set as the optimum defocus value.

The minimum jitter value jitter($i_a$min) is smaller than the jitter value jitter($i_a$f) that is smaller than the maximum jitter value jitter($i_a$max) by the determination value jitter($i_a$s), for example. In such a case, in the optical disc apparatus 1, there is performed the operation of setting the defocus value corresponding to the minimum jitter value jitter($i_a$min), i.e., the defocus value greater than the reference value 0 by +6% as the optimum defocus value for the focusing servo circuit 31.

In the program in the CPU 10 (FIG. 1), the next setting is performed based on the value of [jitter($i_a$max)−jitter($i_a$min)]. If the value of [jitter($i_a$max)−jitter($i_a$min)] exceeds a certain value jitter($i_a$s), "DEFOCUS" is set to "2%×$i_a$min", for example. The defocus adjustment is completed in this way.

When the defocus-value setting operation is performed as above, the defocus value greater than the reference defocus value 0 by +6% is set for the focusing servo circuit 31, and the focusing servo operation of the focusing servo circuit 31 is performed centering the set defocus value.

By performing the defocus-value adjusting method of the optical disc apparatus 1 as above, the OPU 2 making up the optical disc apparatus 1 performs the stable focusing servo operation for the optical disc (M). The optical disc (M): when it is determined that the difference value jitter($i_a$d) between the maximum jitter value jitter($i_a$max) therefor and the minimum jitter value jitter($i_a$min) therefor is a value greater than the predetermined value jitter($i_a$s); is considered as the optical disc (M) with poor jitter characteristics. Since the defocus value corresponding to the minimum jitter value jitter($i_a$min) is set as the optimum defocus value when reading a signal from the optical disc (M) with the poor jitter characteristics, the stable focusing servo operation is performed in the OPU 2.

If it is determined that [jitter($i_a$max)−jitter($i_a$min)>jitter ($i_a$s)] is not satisfied at the step of S160 shown in FIG. 6A (S160: NO), the reference defocus value 0 is set as the optimum defocus value (S180).

FIG. 9 is a characteristic view of a relationship between the jitter value and the defocus value when it is determined in the CPU 10 (FIG. 1) that [jitter($i_a$max)−jitter($i_a$min)>jitter($i_a$s)] is not satisfied (FIG. 6A, S160: NO).

When performing the defocus adjustment of the OBL 4 for the optical disc (M) (FIG. 1), if it is determined that the difference value jitter($i_a$d) between the maximum jitter value jitter($i_a$max) and the minimum jitter value jitter($i_a$min) is a small value equal to or smaller than the predetermined value jitter($i_a$s) as shown in FIG. 9, the reference value 0 of the defocus value is set as the optimum defocus value. If the value of maximum value−minimum value (MAX−MIN) of the jitter values is equal to or smaller than a certain value, the defocus value is set to ±0. For example, when the jitter values with a wave shape shown in FIG. 9 are detected, if it is determined that the jitter value jitter($i_ao$) at the reference value 0 of the defocus value is a value greater than the predetermined jitter value jitter($i_af$) and that the difference value jitter($i_ad$) between the maximum jitter value jitter($i_a$max) and the minimum jitter value jitter($i_a$min) is a small value equal to or smaller than the predetermined value jitter($i_as$), the defocus value is set to ±0. Alternatively, for example, when the jitter values with a wave shape shown in FIG. 9 are detected, if it is determined that all the jitter values are values greater than the predetermined jitter value jitter($i_af$) and that the difference value jitter($i_ad$) between the maximum jitter value jitter($i_a$max) and the minimum jitter value jitter($i_a$min) is a small value equal to or smaller than the predetermined value jitter($i_as$), the defocus value is set to ±0.

The minimum jitter value jitter($i_a$min) is greater than the jitter value jitter($i_af$) that is smaller than the maximum jitter value jitter($i_a$max) by the determination value jitter($i_as$), for example. In such a case, since the changes in the jitter values are small, there is performed the operation of setting the reference defocus value as the optimum defocus value for the focusing servo circuit 31 in the optical disc apparatus 1.

In the program in the CPU 10 (FIG. 1), the next setting is performed based on the value of [jitter($i_a$max)–jitter($i_a$min)]. If the value of [jitter($i_a$max)–jitter($i_a$min)] is equal to or smaller than a certain value jitter($i_as$), "DEFOCUS" is set to 0. The defocus adjustment is completed in this way.

When the defocus-value setting operation is performed as above, the focusing servo operation of the focusing servo circuit 31 is performed with the reference defocus value 0 being centered. Since the focusing servo operation is performed with the reference defocus value 0 being centered, the focusing control can stably be performed in the OPU 2.

By performing the defocus-value adjusting method of the optical disc apparatus 1 as above, the OPU 2 making up the optical disc apparatus 1 performs the stable focusing servo operation for the optical disc M. The optical disc M: when it is determined that the difference value jitter($i_ad$) between the maximum jitter value jitter($i_a$max) therefor and the minimum jitter value jitter($i_a$min) therefor is a small value equal to or smaller than the predetermined value jitter($i_as$); is considered as the optical disc M with relatively good jitter characteristics. Since the reference value 0 of the defocus value is set as the optimum defocus value in the optical disc apparatus 1 when reading a signal from the optical disc M with the relatively good jitter characteristics, the stable focusing servo operation is performed in the OPU 2 without malfunction occurring in the focusing servo operation of the OPU 2. The setting of the defocus value can easily be performed in the optical disc apparatus 1.

When performing the defocus adjustment of the OBL 4 for the optical disc (M) (FIG. 1), if it is determined that the difference value jitter($i_ad$) between the maximum jitter value jitter($i_a$max) and the minimum jitter value jitter($i_a$min) is a small value equal to or smaller than the predetermined value jitter($i_as$) as shown in FIG. 10, the reference value 0 of the defocus value is set as the optimum defocus value. If the value of maximum value–minimum value (MAX–MIN) of the jitter values is equal to or smaller than a certain value, the defocus value is set to ±0. For example, when the jitter values with a wave shape shown in FIG. 10 are detected, if it is determined that the jitter value jitter($i_ao$) at the reference value 0 of the defocus value is a value greater than the predetermined jitter value jitter($i_af$) and that the difference value jitter($i_ad$) between the maximum jitter value jitter($i_a$max) and the minimum jitter value jitter($i_a$min) is a small value equal to or smaller than the predetermined value jitter($i_as$), the defocus value is set to ±0. In such a case, since the changes in the jitter values are small, there is performed the operation of setting the reference defocus value as the optimum defocus value for the focusing servo circuit 31 in the optical disc apparatus 1.

In the program in the CPU 10 (FIG. 1) the next setting is performed based on the value of [jitter($i_a$max)–jitter($i_a$min)]. If the value of [jitter($i_a$max)–jitter($i_a$min)] is equal to or smaller than a certain value jitter($i_as$), "DEFOCUS" is set to 0. The defocus adjustment is completed in this way.

When the defocus-value setting operation is performed as above, the focusing servo operation of the focusing servo circuit 31 is performed centering the reference defocus value 0. Since the focusing servo operation is performed centering the reference defocus value 0, the focusing control can stably be performed in the OPU 2.

By performing the defocus-value adjusting method of the optical disc apparatus 1 as above, the OPU 2 making up the optical disc apparatus 1 performs the stable focusing servo operation for the optical disc M. The optical disc M: when it is determined that the difference value jitter($i_ad$) between the maximum jitter value jitter($i_a$max) therefor and the minimum jitter value jitter($i_a$min) therefor is a small value equal to or smaller than the predetermined value jitter($i_as$); is considered as the optical disc M with relatively good jitter characteristics. Since the reference value 0 of the defocus value is set as the optimum defocus value in the optical disc apparatus 1 when reading a signal from the optical disc M with the relatively good jitter characteristics, the stable focusing servo operation is performed in the OPU 2 without malfunction occurring in the focusing servo operation of the OPU 2. The setting of the defocus value can easily be performed in the optical disc apparatus 1.

After the optical disc (M) is completely disposed in the optical disc apparatus 1, each of the signals is read from the optical disc (M) and each of the jitter values is detected, to perform the defocus adjustment of the OBL 4 for the optical disc (M). The defocus adjustment is performed within a time period from more than 0 second to substantially 15 seconds. More specifically, after the optical disc (M) is completely disposed in the optical disc apparatus 1, when the defocus value is changed stepwise within the predetermined range of numeric values including the reference value 0 (FIGS. 8, 9, and 10) of the defocus value being centered (FIG. 6A: S140, FIG. 6B: S141 to S146), to read the signal from the optical disc (M) (FIG. 1) and detect the jitter values, so that the optimum defocus-value adjustment of the OBL 4 for the optical disc (M) (FIG. 1) is performed based on the difference value jitter($i_ad$) between the maximum jitter value jitter($i_a$max) (FIGS. 8, 9, and 10) and the minimum jitter value jitter($i_a$min) of the detected jitter values (FIG. 6A: S160). The above defocus adjustment is preferably completed within a time period from more than 0 second to substantially 10 seconds.

Since the time spent for the defocus-value adjusting method of the optical disc apparatus 1 is set to a short time, there is swiftly completed the setting process when the defocus adjustment is performed in the optical disc apparatus 1 without waiting for a long time due to the defocus adjustment. After the optical disc (M) is completely disposed in the optical disc apparatus 1, when the defocus value is changed stepwise within the predetermined range of numeric values including the reference value 0 of the defocus value being centered, to read the signal from the optical disc (M) and detect the jitter values, so that the defocus adjustment of the OBL 4 for the optical disc (M) is performed based on the difference value jitter($i_a$d) between the maximum jitter value jitter($i_a$max) and the minimum jitter value jitter($i_a$min) of the detected jitter values; since the defocus adjustment is performed within a time period from more than 0 second to substantially 15 seconds, preferably, within a time period from more than 0 second to substantially 10 seconds; a situation is avoided where one must wait for a very long time due to the defocus adjustment automatically performed by the optical disc apparatus 1 from the time when the optical disc (M) is disposed in the optical disc apparatus 1 to the time when the main data/information/signals of the optical disc (M) are started to be read.

As described above, when the defocus adjustment of the OBL 4 is performed for the optical disc (M) (FIG. 1) and the optimum defocus value is set in the optical disc apparatus 1, the jitter value is first detected based on the reference value 0 (FIGS. 8, 9, and 10) of the defocus value, and if it is determined that the detected jitter value jitter($i_a$o) based on the reference value 0 of the defocus value is a value greater than the predetermined jitter value jitter($i_a$f), there is then executed a jitter-value detecting process of detecting each of the jitter values every time the defocus value is changed stepwise within the predetermined range (e.g., −8% to +8%/−10% to +10%) of numeric values including the reference value 0 of the defocus value.

The optimum defocus value is set in the optical disc apparatus 1 by performing the defocus-value adjusting method of the optical disc apparatus 1 (FIG. 1) as above. When the defocus adjustment of the OBL 4 is performed for the optical disc (M) and the optimum defocus value is set in the optical disc apparatus 1, the jitter value jitter($i_a$o) based on the reference value 0 of the defocus value is first detected (FIG. 6A: S120). As shown in FIGS. 8, 9, and 10, the optical disc (M) (FIG. 1): if it is determined that the jitter value jitter($i_a$o) therefor based on the reference value 0 of the defocus value is a value greater than the predetermined jitter value jitter($i_a$f); is considered as the optical disc (M) in need of detecting/checking each of the jitter values corresponding to each of the defocus values. As shown in FIG. 6A, if it is determined that the detected jitter value jitter($i_a$o) based on the reference value 0 of the defocus value is a value greater than the predetermined jitter value jitter($i_a$f) (S130: YES), there are then performed the jitter-value detecting/comparing and determining/optimum value setting processes in which: each of the jitter values is detected every time the defocus value is changed stepwise within the predetermined range (e.g., −8% to +8%/−10% to +10%) of numeric values including the reference value 0 of the defocus value (FIG. 6A: S140, FIG. 6B: S141 to S146); and the optimum defocus value is set based on the difference value jitter($i_a$d) between the maximum jitter value jitter($i_a$max) and the minimum jitter value jitter($i_a$min) of the detected jitter values (FIG. 6A: S140, FIG. 6B: S141 to S146, FIG. 6A: S150, S160, S170/S180).

When the defocus value is changed stepwise within the predetermined range (e.g., −10% to +10%/−8% to +8%) of numeric values including the reference value 0 (FIGS. 8, 9, and 10) of the defocus value, a divided width of the defocus value is set to, for example, a value within a range from 0.5% to 5%, specifically, a value within a range from 1% to 4% of the whole defocus values. If the divided width of the defocus value is a small divided width, for example, less than 0.5% of the whole defocus values, since a large amount of data is to be acquired, it is feared that the time spent for the defocus adjustment may be prolonged since a large amount of data is to be acquired. If the divided width of the defocus value is a great divided width, for example, greater than 5% of all the defocus values, since the number of acquired data is insufficient, it is feared that the accurate defocus adjustment may not be performed. By setting the divided width of the defocus value to a value within a range from 1% to 4% of the whole defocus values, preferably, by setting the divided width of the defocus value to 2% of the whole defocus values, the time spent for the defocus adjustment is not so prolonged and the relatively accurate defocus adjustment is performed.

As shown in FIGS. 11 and 12, before there is performed the operation for detecting the jitter value every time the defocus value is changed stepwise within the predetermined range of numeric values including the reference value 0 of the defocus value being centered, the jitter value is detected based on the reference value 0 of the defocus value, and if it is determined that the detected jitter value jitter($i_a$o) based on the reference value 0 of the defocus value is a small value equal to or smaller than the predetermined jitter value jitter($i_a$f), the reference value 0 of the defocus value is set as the optimum defocus value.

Specifically, when the defocus adjustment of the OBL 4 is performed for the optical disc (M) (FIG. 1) and the optimum defocus value is set in the optical disc apparatus 1, the jitter value is first detected based on the reference value 0 (FIG. 11) of the defocus value: and if it is determined that the detected jitter value jitter($i_a$o) based on the reference value 0 of the defocus value is a small value equal to or smaller than the predetermined jitter value jitter($i_a$f), the jitter-value detecting process is omitted without detecting each of the jitter values every time the defocus value is changed stepwise within the predetermined range of numeric values including the reference value 0 of the defocus value; and the reference value 0 of the defocus value is set as the optimum defocus value immediately after the detecting process of the jitter value jitter($i_a$o) based on the reference value 0 of the defocus value and the comparing and determining process between the predetermined jitter value jitter($i_a$f) and the jitter value jitter($i_a$o) based on the reference value 0 of the defocus value.

When the defocus value is ±0, if the jitter value jitter($i_a$o) is a small value equal to or smaller than the predetermined jitter value jitter($i_a$f), the optimum defocus value is set to ±0. If the optical disc M with good jitter characteristics is used, the stability of the focusing servo is prioritized.

By performing the defocus-value adjusting method of the optical disc apparatus 1 (FIG. 1) as above, when the optical disc M with good jitter characteristics is used, the defocus value is swiftly set and the OPU 2 making up the optical disc apparatus 1 performs the stable focusing servo operation for the optical disc M. When the defocus adjustment of the OBL 4 is performed for the optical disc M and the optimum defocus value is set in the optical disc apparatus 1, the jitter value jitter($i_a$o) based on the reference value 0 of the defocus value is first detected (FIG. 6A: S120). As shown in FIG. 11, the optical disc M (FIG. 1): if it is determined that the jitter value jitter($i_a$o) therefor based on the reference value 0 of the defocus value is a small value equal to or smaller than the predetermined jitter value jitter($i_a$f); is considered as the optical disc M with good jitter characteristics.

When reading the signal from the optical disc M with good jitter characteristics: the jitter-value detecting/comparing and determining processes (FIG. 6A: S140, FIG. 6B: S141 to S146, FIG. 6A: S150, S160) are omitted without detecting each of the jitter values every time the defocus value is changed stepwise within the predetermined range of numeric values including the reference value 0 of the defocus value; and the reference value 0 of the defocus value is set as the optimum defocus value in the optical disc apparatus 1 (FIG. 6A: S180) immediately after the detecting process (FIG. 6A: S120) of the jitter value jitter($i_a$o) based on the reference value 0 of the defocus value and the comparing and determining process (FIG. 6A: S130) between the predetermined jitter value jitter($i_af$) and the jitter value jitter($i_ao$) based on the reference value 0 of the defocus value. Therefore, the setting time of the defocus value is reduced in the optical disc apparatus 1. When reading the signal from the optical disc M with good jitter characteristics, since the reference value 0 of the defocus value is set as the optimum defocus value in the optical disc apparatus 1, the stable focusing servo operation is performed in the OPU 2 without malfunction occurring in the focusing servo operation of the OPU 2.

When the defocus adjustment of the OBL 4 is performed for the optical disc M (FIG. 1) and the optimum defocus value is set in the optical disc apparatus 1, the jitter value is first detected based on the reference value 0 (FIG. 12) of the defocus value: and if it is determined that the detected jitter value jitter($i_ao$) based on the reference value 0 of the defocus value is a small value equal to or smaller than the predetermined jitter value jitter($i_af$), the jitter-value detecting process is omitted without detecting each of the jitter values every time the defocus value is changed stepwise within the predetermined range of numeric values including the reference value 0 of the defocus value; and the reference value 0 of the defocus value is set as the optimum defocus value immediately after the detecting process of the jitter value jitter($i_ao$) based on the reference value 0 of the defocus value and the comparing and determining process between the predetermined jitter value jitter($i_af$) and the jitter value jitter($i_ao$) based on the reference value 0 of the defocus value.

When the defocus value is ±0, if the jitter value jitter($i_ao$) is a small value equal to or smaller than the predetermined jitter value jitter($i_af$), the optimum defocus value is set to ±0. If the optical disc M with good jitter characteristics is used, the stability of the focusing servo is prioritized.

By performing the defocus-value adjusting method of the optical disc apparatus 1 (FIG. 1) as above, when the optical disc M with good jitter characteristics is used, the defocus value is swiftly set and the OPU 2 making up the optical disc apparatus 1 performs the stable focusing servo operation for the optical disc M. When the defocus adjustment of the OBL 4 is performed for the optical disc M and the optimum defocus value is set in the optical disc apparatus 1, the jitter value jitter($i_ao$) based on the reference value 0 of the defocus value is first detected (FIG. 6A: S120). As shown in FIG. 12, the optical disc M (FIG. 1): if it is determined that the jitter value jitter($i_ao$) therefor based on the reference value 0 of the defocus value is a small value equal to or smaller than the predetermined jitter value jitter($i_af$); is considered as the optical disc M with good jitter characteristics. Alternatively, for example, as shown in FIG. 12, the optical disc M (FIG. 1): if it is determined that all the jitter values between the maximum jitter value jitter($i_a$max) therefor and the minimum jitter value jitter($i_a$min) therefor are small values equal to or smaller than the predetermined jitter value jitter($i_af$); is considered as the optical disc M with good jitter characteristics.

When the reading a signal from the optical disc M with good jitter characteristics: the jitter-value detecting/comparing and determining processes (FIG. 6A: S140, FIG. 6B: S141 to S146, FIG. 6A: S150, S160) are omitted without detecting each of the jitter values every time the defocus value is changed stepwise within the predetermined range of numeric values including the reference value 0 of the defocus value; and the reference value 0 of the defocus value is set as the optimum defocus value in the optical disc apparatus 1 (FIG. 6A: S180) immediately after the detecting process (FIG. 6A: S120) of the jitter value jitter($i_ao$) based on the reference value 0 of the defocus value and the comparing and determining process (FIG. 6A: S130) between the predetermined jitter value jitter($i_af$) and the jitter value jitter($i_ao$) based on the reference value 0 of the defocus value. Therefore, the setting time of the defocus value is reduced in the optical disc apparatus 1. When reading the signal from the optical disc M with good jitter characteristics, since the reference value 0 of the defocus value is set as the optimum defocus value in the optical disc apparatus 1, the stable focusing servo operation is performed in the OPU 2 without malfunction occurring in the focusing servo operation of the OPU 2.

Since the defocus value ±0 is first measured and set, the measurement time for detecting the jitter value can be reduced. It is possible to allow the optical disc apparatus 1 including the OPU 2 to perform the defocus adjustment only for the optical disc (M) for which the jitter value is presumed/determined as not good and the detection/check of each of the jitter values is required. Since the defocus adjustment is performed only for the optical disc (M) for which the jitter value is presumed/determined that not good and the detection/check of each of the jitter values is required, the initial measurement time of the optical disc M with good jitter characteristics can be reduced in the OPU 2. Since the defocus value is set to ±0 for the optical disc M with good jitter, the stable focusing servo can be performed for the optical disc M with good jitter. Since the defocus value is set to ±0 for the focusing servo circuit 31 when the optical disc apparatus 1 is disposed with the optical disc M for which the jitter value therefore is not substantially changed, no focus drop, so-called F-drop, occurs and the stable focusing servo can be performed.

The focus drop means that the focus Ls (FIGS. 1, 2, 4A, and 4B) of the laser beam L emitted from the LD 3 of the OPU 2 (FIG. 1) and having passed through the OBL 4 deviates from the pits Mt of an optical disc (M) in a state of being tracked, so that data recorded in the optical disc (M) becomes unable to be read.

As described above, in the defocus-value adjusting method of the optical disc apparatus 1, the jitter value is detected every time the defocus value is changed by the predetermined % within the predetermined range centering the reference value 0 of the defocus value, to perform the operation of setting the optimum defocus value. Before such an operation is performed, the operation of detecting the jitter value is performed in the state where the defocus value is set to the reference defocus value defined as zero. If it is determined that the detected jitter value jitter($i_ao$) is a small value equal to or smaller than the predetermined value jitter($i_af$), i.e., if it is determined that the optical disc M has good reproduction characteristics, there is performed the operation of setting the reference defocus value 0, as it is, as the optimum defocus value in the optical disc apparatus 1.

If the jitter value jitter($i_ao$) to be detected/set for the determining operation is detected as a small jitter value equal to or smaller than, for example, a predetermined jitter value jitter ($i_af$), the optical disc M is determined as a good disc, and the reproduction operation can be performed without trouble even if the selecting operation of the defocus value is not performed.

After the optical disc M with good jitter characteristics is completely disposed in the optical disc apparatus 1, when performing the defocus adjustment of the OBL 4 for the optical disc M with good jitter characteristics in the optical disc apparatus 1, the defocus adjustment is performed within a time period from more than 0 second to substantially 3 seconds, preferably, a time period from more than 0 second to substantially 1 second.

After the optical disc M with good jitter characteristics is completely disposed in the optical disc apparatus 1, when performing the defocus adjustment of the OBL 4 for the optical disc M, the defocus adjustment is performed within a time period from more than 0 second to substantially 3 seconds, preferably, a time period from more than 0 second to substantially 1 second. Therefore, a situation is avoided where one must wait for a long time due to the defocus adjustment automatically performed by the optical disc apparatus 1 from the time when the optical disc M is disposed in the optical disc apparatus 1 to the time when the main data/information/signals of the optical disc M are started to be read. When the optical disc M with good jitter characteristics is disposed in the optical disc apparatus 1, the defocus adjustment in the optical disc apparatus 1 is swiftly completed in a short time.

Description will then be made of a state when the track jump of the OPU 2 is performed if the defocus value other than the reference value 0 is set.

First, the defocus adjustment of the optical disc apparatus 1 (FIG. 1) is performed. The defocus value is set to a numeric value other than the reference value 0 in this case. Before starting the track jump, the defocus value is set to the reference value 0. The track jump operation is performed. After the track jump is completed, the defocus value is set back to the original numeric value other than the reference value 0.

Specifically describing the operation of the optical disc apparatus 1 from the start to the end of the track jump process, if the optimum defocus value is set to any one of biased numeric values other than the reference value 0 among the defocus values within the predetermined range (FIG. 6A: S170, FIG. 7, S191: NO, FIG. 8), when the OPU 2 is driven to perform the track jump on the optical disc (M) (FIG. 1), the defocus value is temporarily set to the reference value 0. After the defocus value is temporarily set to the reference value 0 (FIG. 7: S192), the OPU 2 (FIG. 1) is driven to perform the track jump (FIG. 7: S193).

Figure 7:
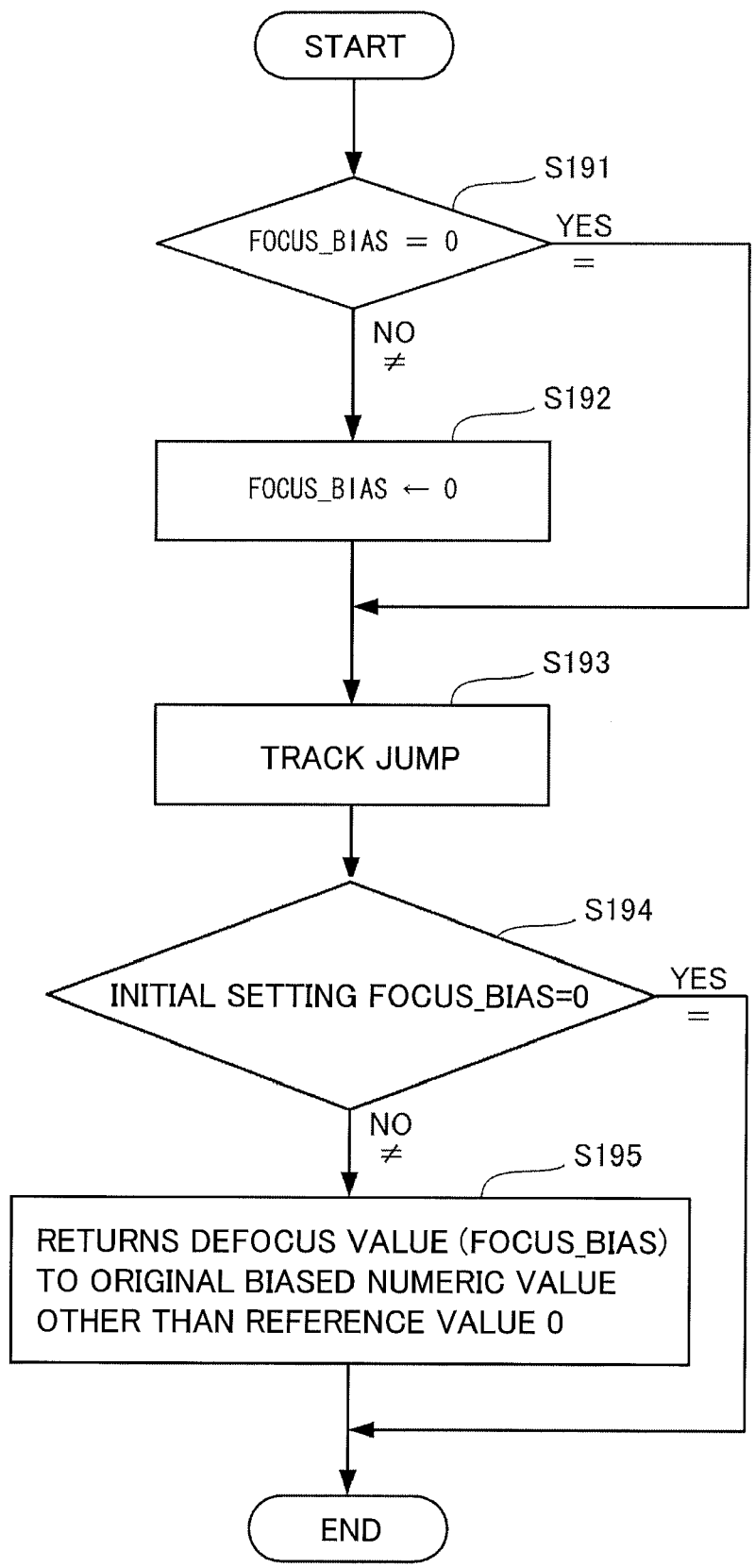
FIG. 7 is a flowchart of a track jump process when performing a defocus-value adjusting method of a disc apparatus.

By setting the defocus value in the optical disc apparatus 1 (FIG. 1) as shown in the steps of S191 and S192 of FIG. 7, even if the optimum defocus value is set to any one of biased numeric values (e.g., +6%) other than the reference value 0 of the defocus value among the defocus values within the predetermined range, the track jump of the OPU 2 on the optical disc (M) is favorably performed. When the defocus adjustment of the OPU 2 is performed for the optical disc (M), if the optimum defocus value is set to a biased numeric value (+6%) other than the reference value 0, a track of the optical disc (M) may not be caught when the track jump is performed by the OPU 2 on the optical disc (M). However, since the defocus value is temporarily set to the reference value 0 when the track jump is performed by the OPU 2, even if the defocus value is set to a biased numeric value other than the reference value 0, the track jump becomes easily performed by the OPU 2 on the optical disc (M) in a normal manner.

After the track jump of the OPU 2 is performed on the optical disc (M) (FIG. 1) (FIG. 7: S193) and the track jump operation is completed, the defocus value is returned to the original biased numeric value (e.g., +6%) other than the reference value 0 (FIG. 7: S195, FIG. 8). Since the optimum defocus value of the initial setting was set to the biased numeric value other than the reference value 0 (FIG. 7, S194: NO, FIG. 8), the defocus value is returned to the original biased numeric value (e.g., +6%) other than the reference value 0 after the track jump is completed (FIG. 7: S195).

Therefore, the optimum defocus value is again set in the optical disc apparatus 1. When the track jump of the OPU 2 is not performed on the optical disc (M), a biased numeric value other than the reference value 0 of the defocus value is again set as the optimum defocus value in the optical disc apparatus 1 and, therefore, the focusing adjustment of the OBL 2 of the OPU 2 is favorably performed for the optical disc (M). Since the defocus value other than the reference value 0 stored earlier in the second memory circuit 12 is again set as the optimum defocus value in the optical disc apparatus 1, the optimum defocus value is swiftly set again.

Description will then be made of a state when the track jump of the OPU 2 is performed if the optimum defocus value is set to the reference value 0. Specifically describing the operation of the optical disc apparatus 1 from the start to the end of the track jump process when the optimum defocus value is set to the reference value 0, if the optimum defocus value is set to the reference value 0 (FIG. 7, S191: YES, FIGS. 9, 10, 11, and 12), the OPU 2 (FIG. 1) is driven to perform the track jump without changing the defocus value (FIG. 7: S193). Since the optimum defocus value continues to be set to the reference value 0, the track jump continues to be performed by the OPU 2 on the optical disc M/(M) (FIG. 1) in a normal manner. Since the optimum defocus value of the initial setting was set to the reference value 0 (FIG. 7, S194: YES, FIGS. 9, 10, 11, and 12), the defocus value is not changed after the track jump is completed and the optimum defocus value is maintained at the reference value 0.

The detrack-value adjusting method of the disc apparatus 1 will then be described.

Figure 13A:
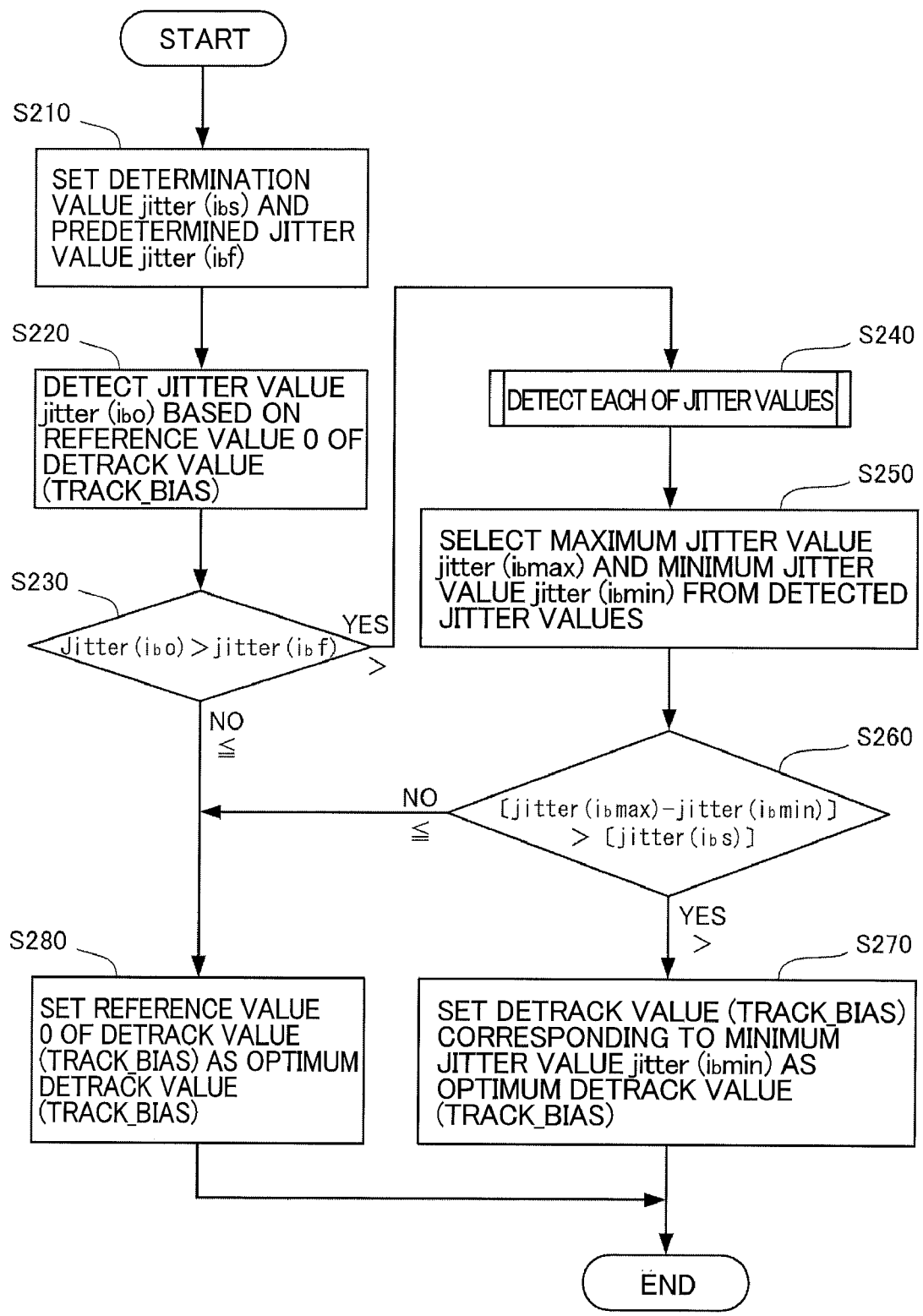
FIG. 13A is a flowchart of an embodiment of a detrack-value adjusting method of a disc apparatus.
Figure 13B:
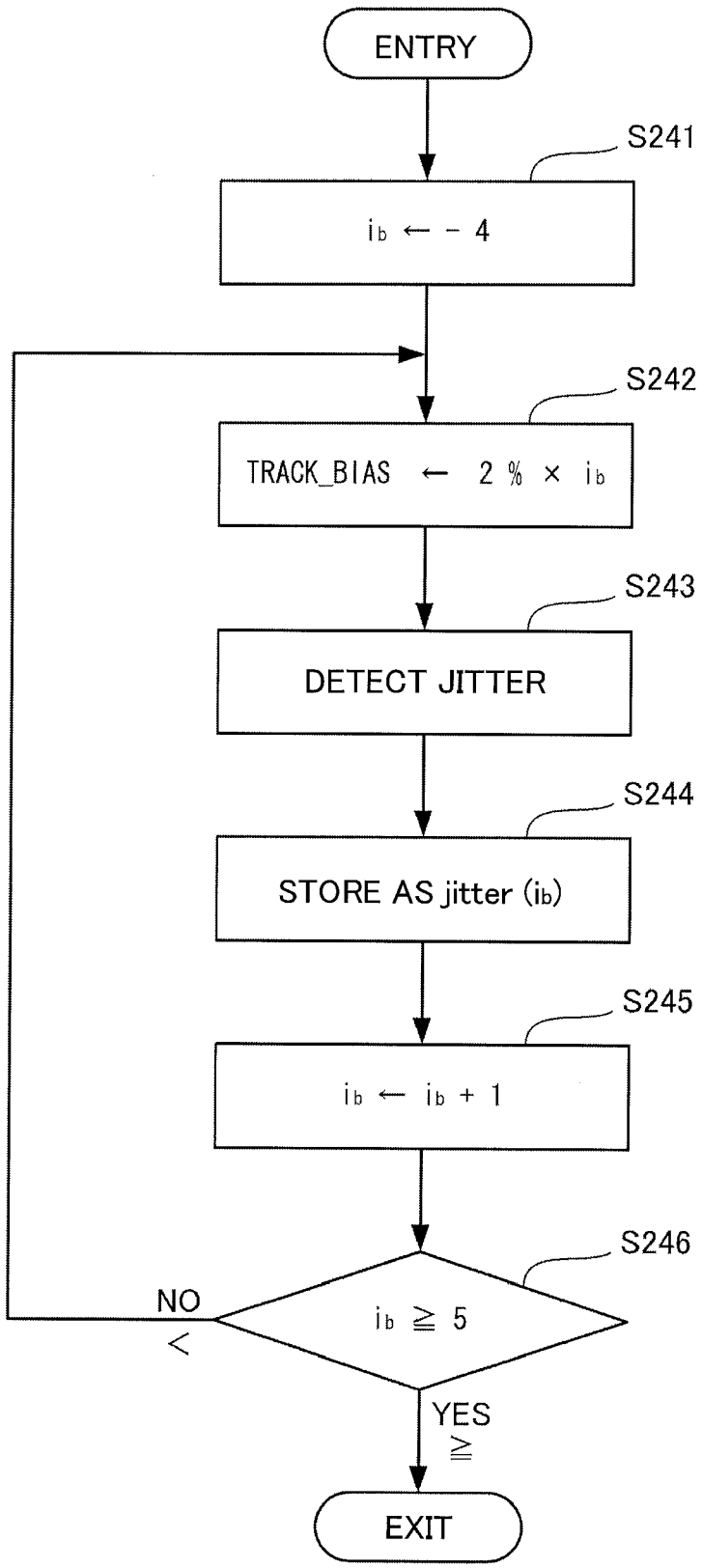
FIG. 13B is a flowchart of a jitter-value detecting process of a detrack-value adjusting method of a disc apparatus.
Figure 14:
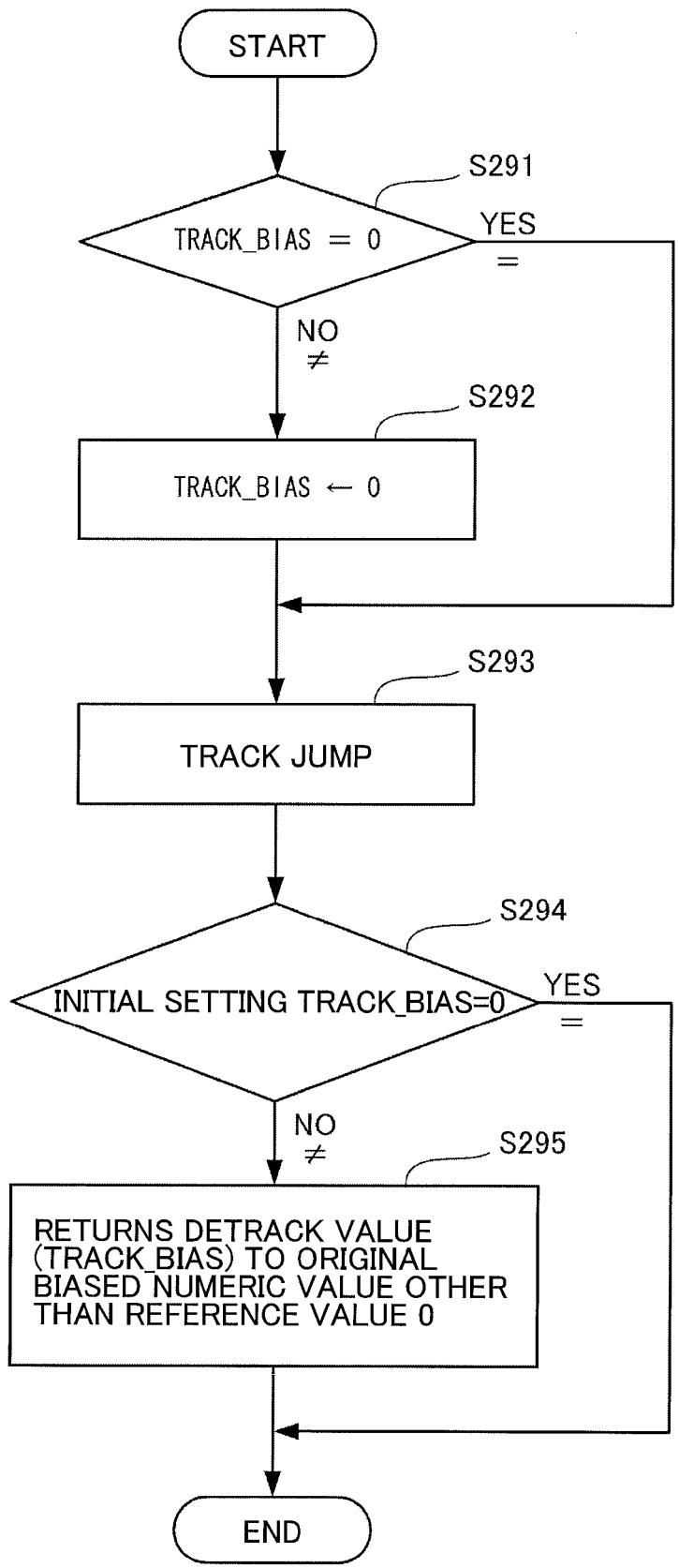
FIG. 14 is a flowchart of a track jump process when performing a detrack-value adjusting method of a disc apparatus.
Figure 15:
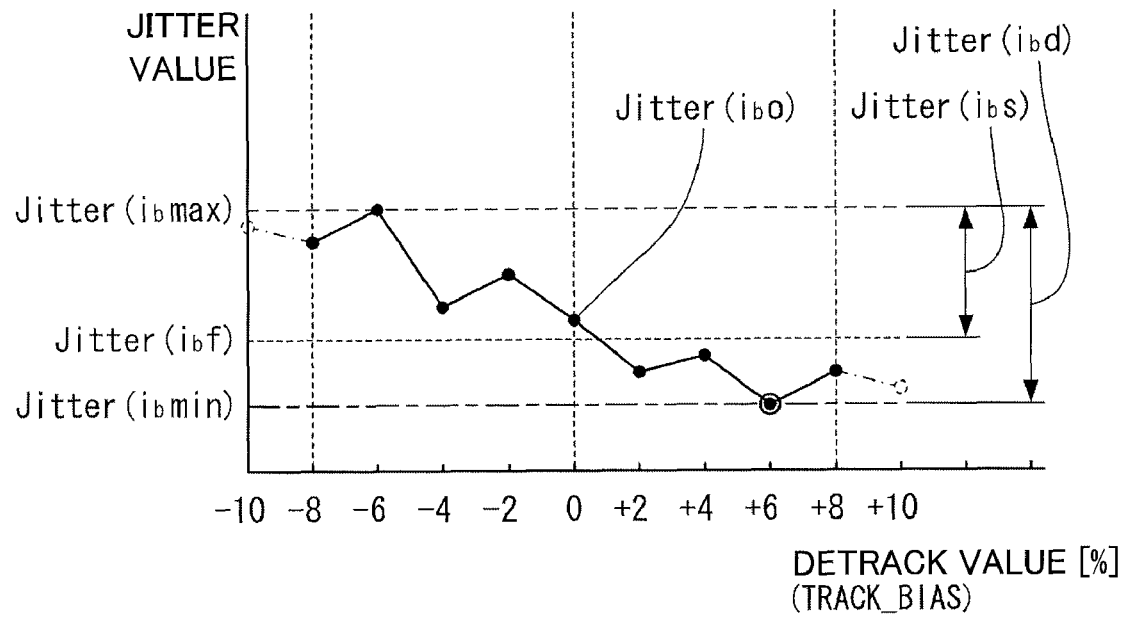
FIG. 15 is a graphical representation of a relationship between a detrack value and a jitter value.
Figure 16:
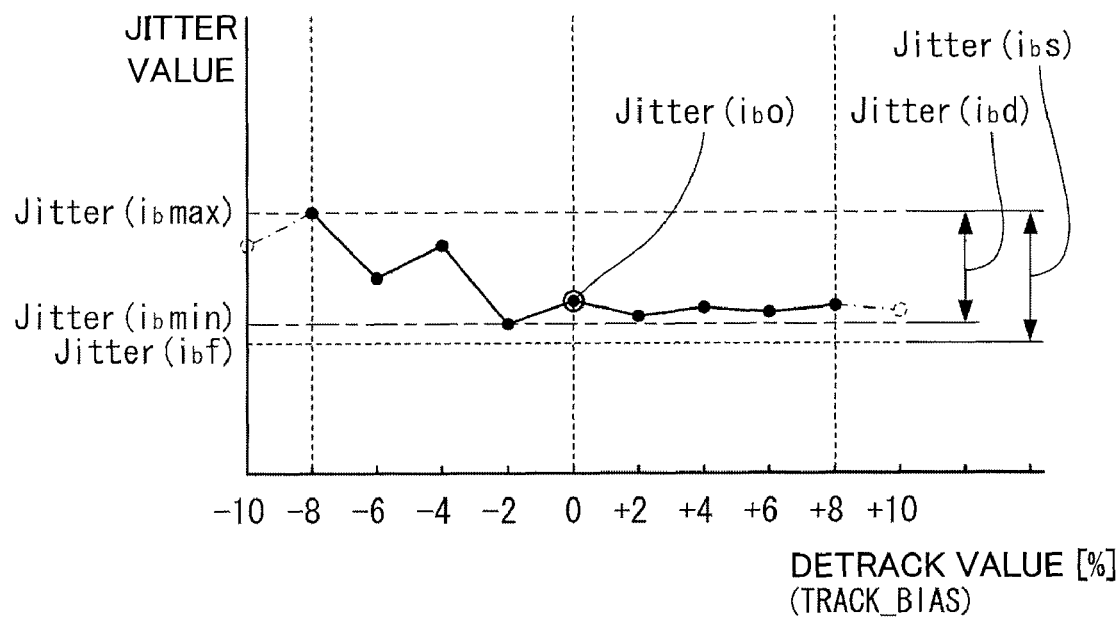
FIG. 16 is also a graphic representation of a relationship between a detrack value and a jitter value.
Figure 17:
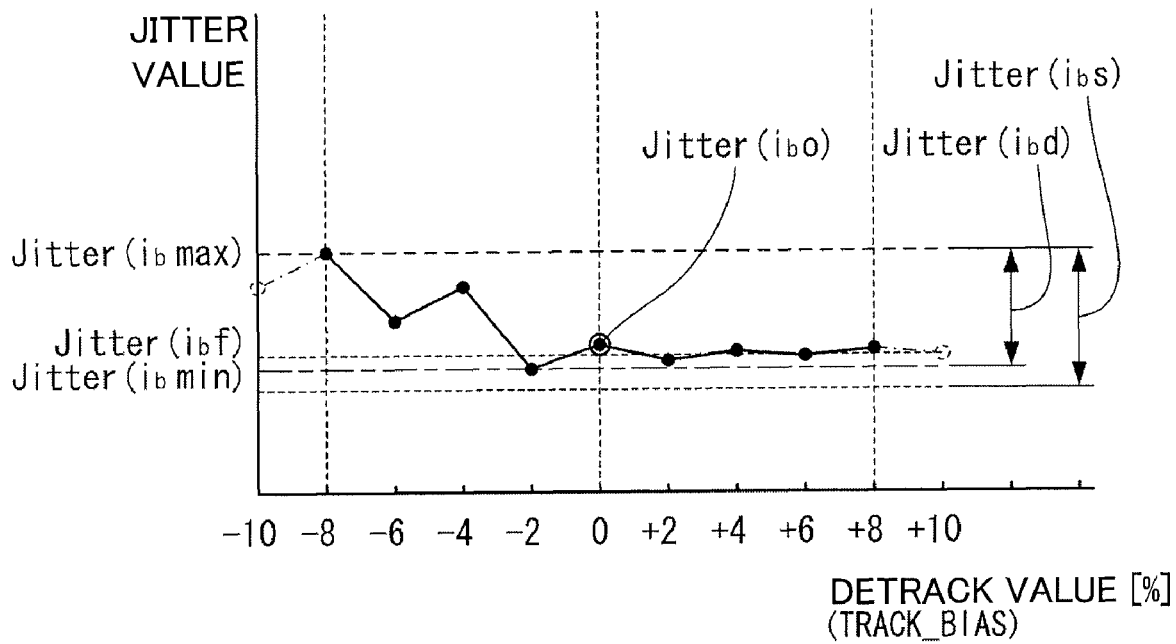
FIG. 17 is also a graphic representation of a relationship between a detrack value and a jitter value.
Figure 18:
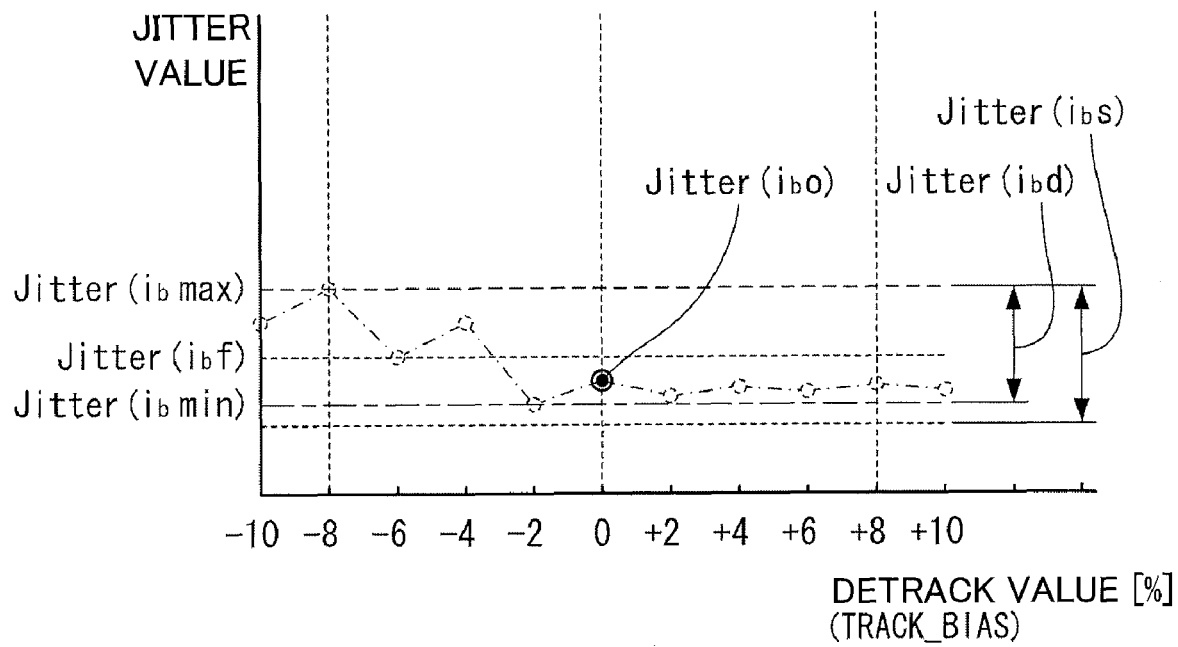
FIG. 18 is also a graphic representation of a relationship between a detrack value and a jitter value.
Figure 19:
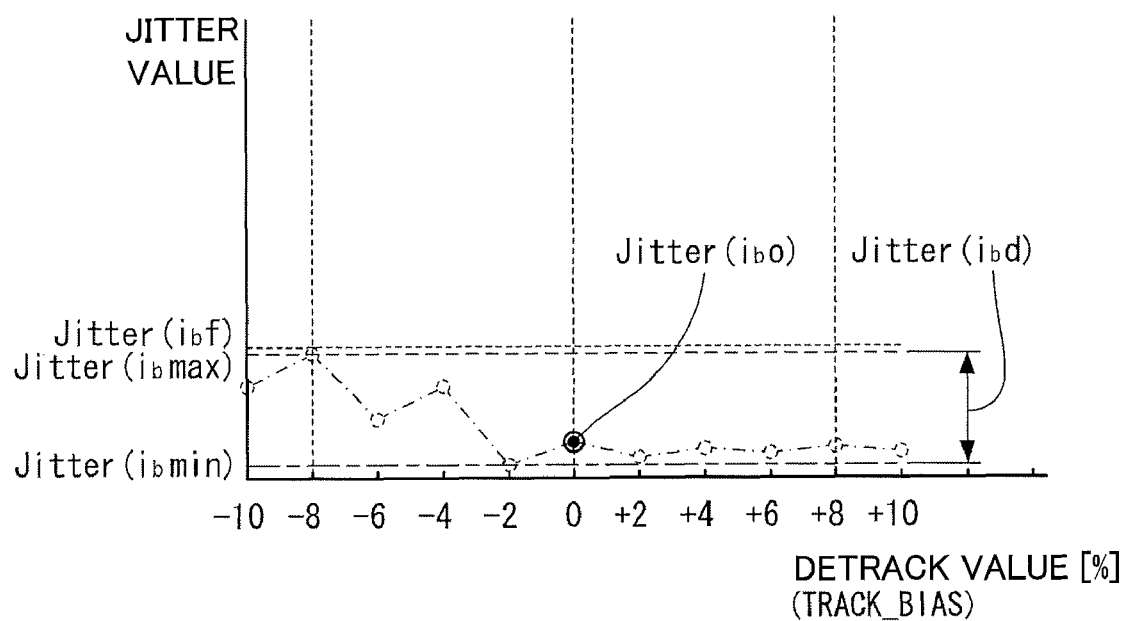
FIG. 19 is also a graphic representation of a relationship between a detrack value and a jitter value.

FIG. 13A is a flowchart of an embodiment of the detrack-value adjusting method of the disc apparatus; FIG. 13B is a flowchart of the jitter-value detecting process of the detrack-value adjusting method of the disc apparatus; FIG. 14 is a flowchart of a track jump process when performing the detrack-value adjusting method of the disc apparatus; FIG. 15 is a graphical representation of a relationship between the detrack value and the jitter value; FIG. 16 is also a graphical representation of a relationship between the detrack value and the jitter value; FIG. 17 is also a graphical representation of a relationship between the detrack value and the jitter value; FIG. 18 is also a graphical representation of a relationship between the detrack value and the jitter value; and FIG. 19 is also a graphical representation of a relationship between the detrack value and the jitter value.

The detrack-value adjusting method of the optical disc apparatus 1 will be described with reference to the figures in conjunction with flowcharts shown in FIGS. 13A, 13B, and 14.

The detrack adjusting method of the optical disc apparatus 1 based on the jitter value is performed as follows. The offset adjustment of the track is performed at the time of initial data reading or immediately after the initial data reading of the OPU 2 in the vicinity of the disc inner circumferential portion Mc immediately before performing the data reproduction of the reproduction/recording optical disc M (FIG. 1), for example. At this time, there are performed the detrack-value adjustment process, etc. corresponding to the reference voltage value (Vref), for example. For example, in the optical disc apparatus 1, there is read a signal having the shape of S-curve substantially laid sideways with −50% to +50% of the detrack values centering a reference value 0, which is the reference voltage value (Vref).

The optical disc apparatus 1 is used to perform the tracking adjustment of the OBL 4 for the signal face portion Ms of the optical disc M. The optical disc apparatus 1 is used to perform the detrack-value adjusting method in the optical disc apparatus 1.

For example, when the optical disc apparatus 1 is turned on, preparations are started for performing the detrack-value adjusting method of the optical disc apparatus 1. When the optical disc apparatus 1 is turned on and the optical disc apparatus 1 is rendered in the power-on state, for example, data such as various pieces of information are sent from the memory circuit 11 such as the ROM 11 to the system control circuit 10. At this point, various data, for example, a predetermined jitter value jitter($i_b$f) and a determination value jitter ($i_b$s) are sent to the system control circuit 10 and set in the system control circuit 10 (FIG. 13A: S210).

The detrack-value adjusting method of this optical disc apparatus 1 (FIG. 1) is a detrack-value adjusting method of the optical disc apparatus 1 that performs the tracking adjustment of the OBL 4 for the optical disc M with the use of the optical disc apparatus 1 including the OPU 2 having the OBL 4 by detecting the jitter value of the signal read from the optical disc M and by adjusting the detrack value used for moving the OBL 4 in the radial direction Dt of the optical disc M when the OBL 4 of the OPU 2 is focused on the signal face portion Ms of the optical disc M based on the detected jitter value. The detrack-value setting process is performed as follows.

By disposing the optical disc M in the optical disc apparatus 1, the operation is substantially started for setting the suitable detrack value in the optical disc apparatus 1. First, track bias, so-called detrack is applied to the tracking coil (TRACKING COIL) 72 to measure the jitter with the use of the optical disc apparatus 1. When causing the optical disc apparatus 1 to perform the detrack-value adjusting method, the jitter is first detected/measured at the detrack value of ±0 (FIG. 13A: S220). At this point, for example, as shown in FIG. 18 or FIG. 19, if it is determined that a jitter value jitter($i_b$o) at the detrack value of ±0 is a small value equal to or smaller than a specified value jitter($i_b$f) and the program in the CPU 10 determines that the optical disc M (FIG. 1) has good jitter characteristics (FIG. 13A, S230: NO), the detrack value is set to zero (FIG. 13A: S280) and the detrack adjustment is completed.

This optical disc apparatus 1 (FIG. 1) performs a different detrack-value adjusting method for each of the optical disc M with good jitter characteristics and the optical disc (M) presumed/determined to have the jitter characteristics that are not good and requiring the detection/check of jitter values.

When the detrack-value adjusting method in the optical disc apparatus 1 is performed with the use of the optical disc apparatus 1, for example, as shown in FIGS. 15, 16, and 17, jitter values are detected/measured as needed. Specifically, in the case of the optical disc (M) for which: it is determined that the jitter value jitter($i_b$o) at the detrack value of ±0 is a value greater than the specified value jitter($i_b$f); the program in the CPU 10 (FIG. 1) presumes/determines that the jitter characteristics are not good; and it is also determined that each of the jitter values requires the detection/check, the following measurement is performed. First, when reading the signal from the optical disc (M) to detect the jitter value, the detrack value within a predetermined range is changed. Specifically, when reading the signal from the optical disc (M) to detect the jitter value, the detrack value is changed stepwise within a predetermined range of numeric values including the reference value 0 of the detrack value (FIGS. 15, 16, and 17) being centered (FIG. 13A: S240, FIG. 13B: S241 to S246). Every time the detrack value is changed stepwise, the jitter value is detected.

The operation of setting the detrack value is performed by the detrack-value setting circuit 22 in the state of performing the reproduction operation for the signal recorded in the optical disc (M) (FIG. 1). In the detrack-value setting circuit 22, a value of the detrack value set for the tracking servo circuit 32 is changed in a stepwise of 2% from −8% to +8% relative to the reference value 0 (FIGS. 15, 16, and 17). At the same time, the jitter value of the reproduction signal is detected correspondingly to the detrack values by the jitter measurement circuit 9 to set the detrack value.

Specifically, while the detrack value for the tracking servo circuit 32 is set by the detrack-value setting circuit 22 to a value lower than the reference value 0 by substantially −8%, the reproduction operation is performed for the signal recorded in the optical disc (M) to detect the jitter value included in the reproduction signal with the jitter measurement circuit 9. The jitter value detected in this way is stored in the memory circuit 12 such as the RAM 12 along with the detrack value.

As the detrack value is changed in a stepwise of 2% from −8% to +8% relative to the reference value 0, the jitter value corresponding to the detrack value is detected and the jitter value is stored in the memory circuit 12 along with the detrack value. The operations are repeatedly performed.

When the operation is started for setting the detrack value in the optical disc apparatus 1, in the case of the optical disc (M) for which it is determined that the jitter values require detection/check during the process of the detrack adjusting method of the optical disc apparatus 1, the operation of detecting the jitter value is first performed every time the detrack value is changed within a predetermined range (FIG. 13A: S240, FIG. 13B: S241 to S246). The predetermined range is defined, for example, if the detrack value 0 is defined as a reference value, as the detrack values from −10% to +10% to be set for the tracking servo circuit 32 relative to the reference value (FIGS. 15, 16, and 17). The preferable predetermined range of detrack values is defined, for example, if the detrack value 0 is defined as a reference value, as a range from −8% to +8% to beset for the tracking servo circuit 32 relative to the reference value.

For example, if the detrack value is set to a value smaller than the −10% value, the tracking servo function may not work normally. Alternatively, for example, if the detrack value is set to a value greater than the +10% value, the tracking servo function may not work normally. Therefore, the detrack values from −10% to +10% centering the reference value 0 of the detrack value may be set for the tracking servo circuit 32. Preferably, the tracking servo function works normally by setting the detrack values from −8% to +8% centering the reference value 0 of the detrack value for the tracking servo circuit 32.

For example, in the case of the optical disc (M) (FIG. 1) for which: it is determined that the jitter value jitter($i_b$o) at the reference value 0 of the detrack value (FIGS. 15, 16, and 17) is a value greater than the specified value jitter($i_b$f); it is presumed/determined that the jitter value is not good; and it is also determined that each of the jitter values requires detection/check, the following process is performed under the control of the program in the CPU 10. The following process is performed by the CPU 10 and the second memory circuit 12.

First, an initial value is set by the program in the CPU 10 to set $i_b$=−4 (FIG. 13B: S241). For example, a value of "DETRACK=2%×$i_b$" is set (SET) to "TRACK_BIAS" (S242). The jitter value is measured by the OPU 2 (S243) and the result is stored in the second memory circuit 12 as "jitter ($i_b$)" (S244).

The "$i_b$" is incremented by the program in the CPU 10 (S241, S242 to S246).

In the case of "$i_b$<5" (S246: NO), a value of "DETRACK=2%×$i_b$" is set to "TRACK_BIAS" (S242) and the jitter is measured again by the OPU 2 (S243) to store the result in the second memory circuit 12 as "jitter($i_b$)" (S244).

In the case of "$i_b \geq 5$" (S246: YES), a minimum value is obtained from "jitter($i_b$)", and "$i_b$" at this point is defined as "$i_b$min" (FIG. 13A: S250). In the case of "$i_b \geq 5$" (FIG. 13B, S246: YES), a maximum value is obtained from "jitter($i_b$)", and "$i_b$" at this point is defined as "$i_b$max" (FIG. 13A: S250).

The optimum detrack value is then set based on a difference value jitter($i_b$d) between the maximum jitter value jitter($i_b$max) and the minimum jitter value jitter($i_b$min) of the detected jitter values (S260).

The detrack value is changed within the predetermined range: the detection operation of each of the jitter values is performed (FIG. 13A: S240, FIG. 13B: S241 to S246); and the maximum jitter value jitter($i_b$max) and the minimum jitter value jitter($i_b$min) are selected from the detected jitter values (FIG. 13A: S250).

After performing the selection setting operation at the step of S250 is performed, there is performed a determination operation which determines whether [jitter($i_b$max)−jitter($i_b$min)>jitter($i_b$s)] is satisfied (S260: YES) or [jitter($i_b$max)−jitter($i_b$min)>jitter($i_b$s)] is not satisfied (S260: NO). If it is determined that [jitter($i_b$max)−jitter($i_b$min)>jitter($i_b$s)] is satisfied at the step of S260 (S260: YES), the detrack value corresponding to the minimum jitter value jitter($i_b$min) is set as the optimum detrack value (S270). Alternatively, if it is determined that [jitter($i_b$max)−jitter($i_b$min)>jitter($i_b$s)] is not satisfied at the step of S260 (S260: NO), the reference value 0 of the detrack value is set as the optimum detrack value (S280).

The optimum detrack value is set in the optical disc apparatus 1 by performing the detrack-value adjusting method of the optical disc apparatus 1 as above. The jitter value is detected as needed every time the detrack value is changed stepwise within the predetermined range of numeric values including the reference value 0 of the detrack value being centered, so that the optimum detrack value is set based on the difference value jitter($i_b$d) between the maximum jitter value jitter($i_b$max) and the minimum jitter value jitter($i_b$min) of the detected jitter values. Therefore, the optimum detrack value is set in the optical disc apparatus 1. Since the optimum detrack value is set in the optical disc apparatus 1, the OPU 2 performs the stable tracking servo operation for the optical disc M. The detrack value setting operation can easily be performed in the optical disc apparatus 1.

After the optical disc (M) is completely disposed in the optical disc apparatus 1, when reading each of the signals from the optical disc (M) and detecting each of the jitter values to perform the detrack adjustment of the OBL 4 for the optical disc (M), the detrack adjustment is performed within a time period from more than 0 second to substantially 20 seconds. More specifically, after the optical disc (M) is completely disposed in the optical disc apparatus 1, when the detrack value is changed stepwise within the predetermined range of numeric values including the reference value 0 (FIGS. 15, 16, and 17) of the detrack value being centered (FIG. 13A: S240, FIG. 13B: S241 to S246), to read each of the signals from the optical disc (M) (FIG. 1) and detect each of the jitter values, so that the optimum detrack-value adjustment of the OBL 4 for the optical disc (M) (FIG. 1) is performed based on the difference value jitter($i_b$d) between the maximum jitter value jitter($i_b$max) (FIGS. 15, 16, and 17) and the minimum jitter value jitter($i_b$min) of the detected jitter values (FIG. 13A: S260). The above detrack adjustment is preferably completed within a time period from more than 0 second to substantially 15 seconds.

Since the time spent for the detrack-value adjusting method of the optical disc apparatus 1 is set to a short time, there is swiftly completed the setting process when the detrack adjustment is performed in the optical disc apparatus 1 without waiting for a long time due to the detrack adjustment. After the optical disc (M) is completely disposed in the optical disc apparatus 1, when the detrack value is changed stepwise within the predetermined range of numeric values including the reference value 0 of the detrack value being centered, to read each of the signals from the optical disc (M) and detect each of the jitter values, so that the detrack adjustment of the OBL 4 for the optical disc (M) is performed based on the difference value jitter($i_b$d) between the maximum jitter value jitter($i_b$max) and the minimum jitter value jitter($i_b$min) of the detected jitter values, the detrack adjustment is performed within a time period from more than 0 second to substantially 20 seconds, preferably, within a time period from more than 0 second to substantially 15 seconds. Therefore, a situation is avoided where one must wait for a very long time due to the detrack adjustment automatically performed by the optical disc apparatus 1 from the time when the optical disc (M) is disposed in the optical disc apparatus 1 to the time when the main data/information/signals of the optical disc (M) are started to be read.

FIG. 15 is a characteristic view of a relationship between the jitter value and the detrack value when it is determined in the CPU 10 (FIG. 1) that [jitter($i_b$max)−jitter($i_b$min)>jitter($i_b$s)] is satisfied (FIG. 13A, S260: YES).

When performing the detrack adjustment of the OBL 4 for the optical disc (M) (FIG. 1), if it is determined that the difference value jitter($i_b$d) between the maximum jitter value jitter($i_b$max) and the minimum jitter value jitter($i_b$min) is a value greater than the predetermined value jitter($i_b$s) as shown in FIG. 15, the detrack value corresponding to the minimum jitter value jitter($i_b$min) is set as the optimum detrack value.

The minimum jitter value jitter($i_b$min) is smaller than the jitter value jitter($i_b$f) that is smaller than the maximum jitter value jitter($i_b$max) by the determination value jitter($i_b$s), for example. In such a case, in the optical disc apparatus 1, there is performed the operation of setting the detrack value corresponding to the minimum jitter value jitter($i_b$min), i.e., the detrack value greater than the reference value 0 by +6% as the optimum detrack value for the tracking servo circuit 32.

In the program in the CPU 10 (FIG. 1), the next setting is performed based on the value of [jitter($i_b$max)−jitter($i_b$min)]. If the value of [jitter($i_b$max)−jitter($i_b$min)] exceeds a certain value jitter($i_b$s), "DETRACK" is set to "2%×$i_b$min", for example. The detrack adjustment is completed in this way.

When the detrack-value setting operation is performed as above, the detrack value greater than the reference detrack value 0 by +6% is set for the tracking servo circuit 32, and the tracking servo operation of the tracking servo circuit 32 is performed centering the set detrack value.

By performing the detrack-value adjusting method of the optical disc apparatus 1 as above, the OPU 2 making up the optical disc apparatus 1 performs the stable tracking servo operation for the optical disc (M). The optical disc (M): when it is determined that the difference value jitter($i_b$d) between the maximum jitter value jitter($i_b$max) therefor and the minimum jitter value jitter($i_b$min) therefor is a value greater than the predetermined value jitter($i_b$s); is considered as the optical disc (M) with poor jitter characteristics. Since the detrack value corresponding to the minimum jitter value jitter($i_b$min) is set as the optimum detrack value when reading a signal from the optical disc (M) with the poor jitter characteristics, the stable tracking servo operation is performed in the OPU 2.

If it is determined that [jitter($i_b$max)−jitter($i_b$min)>jitter($i_b$s)] is not satisfied at step of S260 shown in FIG. 13A (S260: NO), the reference detrack value 0 is set as the optimum detrack value (S280).

FIG. 16 is a characteristic view of a relationship between the jitter value and the detrack value when it is determined in the CPU 10 (FIG. 1) that [jitter($i_b$max)−jitter($i_b$min)]>jitter ($i_b$s)] is not satisfied (FIG. 13A, S260: NO).

When performing the detrack adjustment of the OBL 4 for the optical disc (M) (FIG. 1), if it is determined that the difference value jitter($i_b$d) between the maximum jitter value jitter($i_b$max) and the minimum jitter value jitter($i_b$min) is a small value equal to or smaller than the predetermined value jitter($i_b$s) as shown in FIG. 16, the reference value 0 of the detrack value is set as the optimum detrack value. If the maximum value−minimum value (MAX−MIN) of the jitter values is equal to or smaller than a certain value, the detrack value is set to ±0. For example, when the jitter values with a wave shape shown in FIG. 16 are detected, if it is determined that the jitter value jitter($i_b$o) at the reference value 0 of the detrack value is a value greater than the predetermined jitter value jitter($i_b$f) and that the difference value jitter($i_b$d) between the maximum jitter value jitter($i_b$max) and the minimum jitter value jitter($i_b$min) is a small value equal to or smaller than the predetermined value jitter($i_b$s), the detrack value is set to ±0. Alternatively, for example, when the jitter values with a wave shape shown in FIG. 16 are detected, if it is determined that all the jitter values are values greater than the predetermined jitter value jitter($i_b$f) and that the difference value jitter($i_b$d) between the maximum jitter value jitter($i_b$max) and the minimum jitter value jitter($i_b$min) is a small value equal to or smaller than the predetermined value jitter ($i_b$s), the detrack value is set to ±0.

The minimum jitter value jitter($i_b$min) is greater than the jitter value jitter($i_b$f) that is smaller than the maximum jitter value jitter($i_b$max) by the determination value jitter($i_b$s), for example. In such a case, since the changes in the jitter values are small, there is performed the operation of setting the reference detrack value as the optimum detrack value for the tracking servo circuit 32 in the optical disc apparatus 1.

In the program in the CPU 10 (FIG. 1), the next setting is performed based on the value of [jitter($i_b$max)−jitter($i_b$min)]. If the value of [jitter($i_b$max)−jitter($i_b$min)] is equal to or smaller than a certain value jitter($i_b$s), "DETRACK" is set to 0. The detrack adjustment is completed in this way.

When the detrack-value setting operation is performed as above, the tracking servo operation of the tracking servo circuit 32 is performed centering the reference detrack value 0. Since the tracking servo operation is performed centering the reference detrack value 0, the tracking control can stably be performed in the OPU 2.

By performing the detrack-value adjusting method of the optical disc apparatus 1 as above, the OPU 2 making up the optical disc apparatus 1 performs the stable tracking servo operation for the optical disc M. The optical disc M: when it is determined that the difference value jitter($i_b$d) between the maximum jitter value jitter($i_b$max) therefor and the minimum jitter value jitter($i_b$min) therefor is a small value equal to or smaller than the predetermined value jitter($i_b$s); is considered as the optical disc M with relatively good jitter characteristics. Since the reference value 0 of the detrack value is set as the optimum detrack value in the optical disc apparatus 1 when reading a signal from the optical disc M with the relatively good jitter characteristics, the stable tracking servo operation is performed in the OPU 2 without malfunction occurring in the tracking servo operation of the OPU 2. The setting of the detrack value can easily be performed in the optical disc apparatus 1.

When performing the detrack adjustment of the OBL 4 for the optical disc (M) (FIG. 1), if it is determined that the difference value jitter($i_b$d) between the maximum jitter value jitter($i_b$max) and the minimum jitter value jitter($i_b$min) is a small value equal to or smaller than the predetermined value jitter($i_b$s) as shown in FIG. 17, the reference value 0 of the detrack value is set as the optimum detrack value. If the value of maximum value−minimum value (MAX−MIN) of the jitter values is equal to or smaller than a certain value, the detrack value is set to ±0. For example, when the jitter values with a wave shape shown in FIG. 17 are detected, if it is determined that the jitter value jitter($i_b$o) at the reference value 0 of the detrack value is a value greater than the predetermined jitter value jitter($i_b$f) and that the difference value jitter($i_b$d) between the maximum jitter value jitter($i_b$max) and the minimum jitter value jitter($i_b$min) is a small value equal to or smaller than the predetermined value jitter($i_b$s), the detrack value is set to ±0. In such a case, since the changes in the jitter values are small, the optical disc apparatus 1 performs the operation of setting the reference detrack value as the optimum detrack value for the tracking servo circuit 32.

In the program in the CPU 10 (FIG. 1), the next setting is performed based on the value of [jitter($i_b$max)−jitter($i_b$min)]. If the value of [jitter($i_b$max)−jitter($i_b$min)] is equal to or smaller than a certain value jitter($i_b$s), "DETRACK" is set to 0. The detrack adjustment is completed in this way.

When the detrack-value setting operation is performed as above, the tracking servo operation of the tracking servo circuit 32 is performed with the reference detrack value 0 being centered. Since the tracking servo operation is performed with the reference detrack value 0 being centered, the tracking control can stably be performed in the OPU 2.

By performing the detrack-value adjusting method of the optical disc apparatus 1 as above, the OPU 2 making up the optical disc apparatus 1 performs the stable tracking servo operation for the optical disc M. The optical disc M: when it is determined that the difference value jitter($i_b$d) between the maximum jitter value jitter($i_b$max) therefor and the minimum jitter value jitter($i_b$min) therefor is a small value equal to or smaller than the predetermined value jitter($i_b$s); is considered as the optical disc M with relatively good jitter characteristics. Since the reference value 0 of the detrack value is set as the optimum detrack value in the optical disc apparatus 1 when reading a signal from the optical disc M with the relatively good jitter characteristics, the stable tracking servo operation is performed in the OPU 2 without malfunction occurring in the tracking servo operation of the OPU 2. The setting of the detrack value can easily be performed in the optical disc apparatus 1.

After the optical disc (M) is completely disposed in the optical disc apparatus 1, each of the signals is read from the optical disc (M) and each of the jitter values is detected, to perform the detrack adjustment of the OBL 4 for the optical disc (M). The detrack adjustment is performed within a time period from more than 0 second to substantially 15 seconds. More specifically, after the optical disc (M) is completely disposed in the optical disc apparatus 1, when the detrack value is changed stepwise within the predetermined range of numeric values including the reference value 0 (FIGS. 15, 16, and 17) of the detrack value being centered (FIG. 13A: S240, FIG. 13B: S241 to S246), to read the signal from the optical disc (M) (FIG. 1) and detect the jitter values, so that the optimum detrack-value adjustment of the OBL 4 for the optical disc (M) (FIG. 1) is performed based on the difference value jitter($i_b$d) between the maximum jitter value jitter($i_b$max) (FIGS. 15, 16, and 17) and the minimum jitter value jitter($i_b$min) of the detected jitter values (FIG. 13A: S260). The above detrack adjustment is preferably completed within a time period from more than 0 second to substantially 10 seconds.

Since the time spent for the detrack-value adjusting method of the optical disc apparatus 1 is set to a short time as above, There is swiftly completed the setting process when the detrack adjustment is performed in the optical disc apparatus 1 without waiting for a long time due to the detrack adjustment. After the optical disc (M) is completely disposed in the optical disc apparatus 1, when the detrack value is changed stepwise within the predetermined range of numeric values including the reference value 0 of the detrack value being centered, to read the signal from the optical disc (M) and detect the jitter values so that the detrack adjustment of the OBL 4 for the optical disc (M) is performed based on the difference value jitter($i_b$d) between the maximum jitter value jitter($i_b$max) and the minimum jitter value jitter($i_b$min) of the detected jitter values; since the detrack adjustment is performed within a time period from more than 0 second to substantially 15 seconds, preferably, within a time period from more than 0 seconds to substantially 10 seconds, a situation is avoided where one must wait for a very long time due to the detrack adjustment automatically performed by the optical disc apparatus 1 from the time when the optical disc (M) is disposed in the optical disc apparatus 1 to the time when the main data/information/signals of the optical disc (M) are started to be read.

As described above, when the detrack adjustment of the OBL 4 is performed for the optical disc (M) (FIG. 1) and the optimum detrack value is set in the optical disc apparatus 1, the jitter value is first detected based on the reference value 0 (FIGS. 15, 16, and 17) of the detrack value, and if it is determined that the detected jitter value jitter($i_b$o) based on the reference value 0 of the detrack value is a value greater than the predefined jitter value jitter($i_b$f), a jitter-value detecting process is then executed to detect the jitter value every time the detrack value is changed stepwise within the predetermined range (e.g., −8% to +8%/−10% to +10%) of numeric values including the reference value 0 of the detrack value.

The optimum detrack value is set in the optical disc apparatus 1 by performing the detrack-value adjusting method of the optical disc apparatus 1 (FIG. 1) as above. When the detrack adjustment of the OBL 4 is performed for the optical disc (M) and the optimum detrack value is set in the optical disc apparatus 1, the jitter value jitter($i_b$o) based on the reference value 0 of the detrack value is first detected (FIG. 13A: S220). As shown in FIGS. 15, 16, and 17, the optical disc (M) (FIG. 1): if it is determined that the jitter value jitter($i_b$o) therefor based on the reference value 0 of the detrack value is a value greater than the predetermined jitter value jitter($i_b$f); is considered as the optical disc (M) in need of detecting/checking each of the jitter values corresponding to each of the detrack values. As shown in FIG. 13A, if it is determined that the detected jitter value jitter($i_b$o) based on the reference value 0 of the detrack value is a value greater than the predetermined jitter value jitter($i_b$f) (S230: YES), there are then performed the jitter-value detecting/comparing and determining/optimum value setting processes in which: each of the jitter values is detected every time the detrack value is changed stepwise within the predetermined range (e.g., −8% to +8%/−10% to +10%) of numeric values including the reference value 0 of the detrack value (FIG. 13A: S240, FIG. 13B: S241 to S246); and the optimum detrack value is set based on the difference value jitter($i_b$d) between the maximum jitter value jitter($i_b$max) and the minimum jitter value jitter($i_b$min) of the detected jitter values (FIG. 13A: S240, FIG. 13B: S241 to S246, FIG. 13A: S250, S260, S270/S280).

When the detrack value is changed stepwise within the predetermined range (e.g., −10% to +10%/−8% to +8%) of numeric values including the reference value 0 (FIGS. 15, 16, and 17) of the detrack value, a divided width of the detrack value is set to, for example, a value within a range from 0.5% to 5%, specifically, a value within a range from 1% to 4% of the whole detrack values. If the divided width of the detrack value is a small divided width, for example, less than 0.5% of the whole detrack values, since a large amount of data is to be acquired it is feared that the time spent for the detrack adjustment may be prolonged. If the divided width of the detrack value is a great divided width, for example, greater than 5% of the whole detrack values, since the number of acquired data is insufficient, it is feared that the accurate detrack adjustment may not be performed. By setting the divided width of the detrack value to a value within a range from 1% to 4% of whole the detrack values, preferably, by setting the divided width of the detrack value to 2% of the whole detrack values, the time spent for the detrack adjustment is not so prolonged and the relatively accurate detrack adjustment is performed.

As shown in FIGS. 18 and 19, before there is performed the operation for detecting the jitter value every time the detrack value is changed stepwise within the predetermined range of numeric values including the reference value 0 of the detrack value being centered, the jitter value is detected based on the reference value 0 of the detrack value, and if it is determined that the detected jitter value jitter($i_b$o) based on the reference value 0 of the detrack value is a small value equal to or smaller than the predetermined jitter value jitter($i_b$f), the reference value 0 of the detrack value is set as the optimum detrack value.

Specifically, when the detrack adjustment of the OBL 4 is performed for the optical disc (M) (FIG. 1) and the optimum detrack value is set in the optical disc apparatus 1, the jitter value is first detected based on the reference value 0 (FIG. 18) of the detrack value: and if it is determined that the detected jitter value jitter($i_b$o) based on the reference value 0 of the detrack value is a small value equal to or smaller than the predetermined jitter value jitter($i_b$f), the jitter-value detecting process is omitted without detecting each of the jitter values every time the detrack value is changed stepwise within the predetermined range of numeric values including the reference value 0 of the detrack value; and the reference value 0 of the detrack value is set as the optimum detrack value immediately after the detecting process of the jitter value jitter($i_b$o) based on the reference value 0 of the detrack value and the comparing and determining process between the predetermined jitter value jitter($i_b$f) and the jitter value jitter($i_b$o) based on the reference value 0 of the detrack value.

When the detrack value is ±0, if the jitter value jitter($i_b$o) is a small value equal to or smaller than the predetermined jitter value jitter($i_b$f), the optimum detrack value is set to ±0. If the optical disc M with good jitter characteristics is used, the stability of the tracking servo is prioritized.

By performing the detrack-value adjusting method of the optical disc apparatus 1 (FIG. 1) as above, when the optical disc M with good jitter characteristics is used, the detrack value is swiftly set and the OPU 2 making up the optical disc apparatus 1 performs the stable tracking servo operation for the optical disc M. When the detrack adjustment of the OBL 4 is performed for the optical disc M and the optimum detrack value is set in the optical disc apparatus 1, the jitter value jitter($i_b$o) based on the reference value 0 of the detrack value is first detected (FIG. 13A: S220). As shown in FIG. 18, the optical disc M (FIG. 1): if it is determined that the jitter value jitter($i_b$o) therefor based on the reference value 0 of the detrack value is a small value equal to or smaller than the predetermined jitter value jitter($i_b$f); is considered as the optical disc M with good jitter characteristics.

When reading the signal from the optical disc M with good jitter characteristics: the jitter-value detecting/comparing and determining processes (FIG. 13A: S240, FIG. 13B: S241 to S246, FIG. 13A: S250, S260) are omitted without detecting each of the jitter values every time the detrack value is changed stepwise within the predetermined range of numeric values including the reference value 0 of the detrack value; and the reference value 0 of the detrack value is set as the optimum detrack value in the optical disc apparatus 1 (FIG. 13A: S280) immediately after the detecting process (FIG. 13A: S220) of the jitter value jitter($i_b$o) based on the reference value 0 of the detrack value and the comparing and determining process (FIG. 13A: S230) between the predetermined jitter value jitter($i_b$f) and the jitter value jitter($i_b$o) based on the reference value 0 of the detrack value. Therefore, the setting time of the detrack value is reduced in the optical disc apparatus 1. When reading the signal from the optical disc M with good jitter characteristics, since the reference value 0 of the detrack value is set as the optimum detrack value in the optical disc apparatus 1, the stable tracking servo operation is performed in the OPU 2 without malfunction occurring in the tracking servo operation of the OPU 2.

When the detrack adjustment of the OBL 4 is performed for the optical disc M (FIG. 1) and the optimum detrack value is set in the optical disc apparatus 1, the jitter value is first detected based on the reference value 0 (FIG. 19) of the detrack value: and if it is determined that the detected jitter value jitter($i_b$o) based on the reference value 0 of the detrack value is a small value equal to or smaller than the predetermined jitter value jitter($i_b$f), the jitter-value detecting process is omitted without detecting each of the jitter values every time the detrack value is changed stepwise within the predetermined range of numeric values including the reference value 0 of the detrack value; and the reference value 0 of the detrack value is set as the optimum detrack value immediately after the detecting process of the jitter value jitter($i_b$o) based on the reference value 0 of the detrack value and the comparing and determining process between the predetermined jitter value jitter($i_b$f) and the jitter value jitter($i_b$o) based on the reference value 0 of the detrack value.

When the detrack value is ±0, if the jitter value jitter($i_b$o) is a small value equal to or smaller than the predetermined jitter value jitter($i_b$f), the optimum detrack value is set to ±0. If the optical disc M with good jitter characteristics is used, the stability of the tracking servo is prioritized.

By performing the detrack-value adjusting method of the optical disc apparatus 1 (FIG. 1) as above, when the optical disc M with good jitter characteristics is used, the detrack value is swiftly set and the OPU 2 making up the optical disc apparatus 1 performs the stable tracking servo operation for the optical disc M. When the detrack adjustment of the OBL 4 is performed for the optical disc M and the optimum detrack value is set in the optical disc apparatus 1, the jitter value jitter($i_b$o) based on the reference value 0 of the detrack value is first detected (FIG. 13A: S220). As shown in FIG. 19, the optical disc M (FIG. 1): if it is determined that the jitter value jitter($i_b$o) therefor based on the reference value 0 of the detrack value is a small value equal to or smaller than the predetermined jitter value jitter($i_b$f); is considered as the optical disc M with good jitter characteristics. Alternatively, for example, as shown in FIG. 19, the optical disc M (FIG. 1): if it is determined that all the jitter values between the maximum jitter value jitter($i_b$max) therefor and the minimum jitter value jitter($i_b$min) therefor are small values equal to or smaller than the predetermined jitter value jitter($i_b$f); is considered as the optical disc M with good jitter characteristics.

When reading the signal from the optical disc M with good jitter characteristics: the jitter-value detecting/comparing and determining processes (FIG. 13A: S240, FIG. 13B: S241 to S246, FIG. 13A: S250, S260) are omitted without detecting each of the jitter values every time the detrack value is changed stepwise within the predetermined range of numeric values including the reference value 0 of the detrack value; and the reference value 0 of the detrack value is set as the optimum detrack value in the optical disc apparatus 1 (FIG. 13A: S280) immediately after the detecting process (FIG. 13A: S220) of the jitter value jitter($i_b$o) based on the reference value 0 of the detrack value and the comparing and determining process (FIG. 13A: S230) between the predetermined jitter value jitter($i_b$f) and the jitter value jitter($i_b$o) based on the reference value 0 of the detrack value. Therefore, the setting time of the detrack value is reduced in the optical disc apparatus 1. When reading the signal from the optical disc M with good jitter characteristics, since the reference value 0 of the detrack value is set as the optimum detrack value in the optical disc apparatus 1, the stable tracking servo operation is performed in the OPU 2 without malfunction occurring in the tracking servo operation of the OPU 2.

Since the detrack value ±0 is first measured and set, the measurement time for detecting the jitter value can be reduced. It is possible to allow the optical disc apparatus 1 including the OPU 2 to perform the detrack adjustment only for the optical disc (M) for which the jitter value is presumed/determined as not good and the detection/check of each of the jitter values is required. Since the detrack adjustment is performed only for the optical disc (M) for which the jitter value is presumed/determined as not good and the detection/check of each of the jitter values is required, the initial measurement time of the optical disc M with good jitter characteristics can be reduced in the OPU 2. Since the detrack value is set to ±0 for the optical disc M with good jitter, the stable tracking servo can be performed for the optical disc M with good jitter. Since the detrack value is set to ±0 for the tracking servo circuit 32 when the optical disc apparatus 1 is disposed with the optical disc M for which the jitter value therefor is not substantially changed, no track skip occurs and the stable tracking servo can be performed.

As described above, in the detrack-value adjusting method of the optical disc apparatus 1, the jitter value is detected every time the detrack value is changed by the predetermined % within the predetermined range centering the reference value 0 of the detrack value, to perform the operation of setting the optimum detrack value. Before such an operation is performed, the operation of detecting the jitter value is performed in the state where the detrack value is set to the reference detrack value defined as zero. If it is determined that the detected jitter value jitter($i_b$o) is a small value equal to or smaller than the predetermined value jitter($i_b$f), i.e., if it is determined that the optical disc M has good reproduction characteristics, there is performed the operation of setting the reference detrack value 0, as it is, as the optimum detrack value in the optical disc apparatus 1.

If the jitter value jitter($i_b$o) to be detected/set for the determining operation is detected as a small jitter value equal to or smaller than, for example, a predetermined jitter value jitter ($i_b$f), the optical disc M is determined as a good disc, and the reproduction operation can be performed without trouble even if the selecting operation of the detrack value is not performed.

After the optical disc M with good jitter characteristics is completely disposed in the optical disc apparatus 1, when performing the detrack adjustment of the OBL 4 in the optical disc apparatus 1 for the optical disc M with good jitter characteristics, the detrack adjustment is performed within a time period from more than 0 second to substantially 3 seconds, preferably, a time period from more than 0 second to substantially 1 second.

After the optical disc M with good jitter characteristics is completely disposed in the optical disc apparatus 1, when performing the detrack adjustment of the OBL 4 for the optical disc M, the detrack adjustment is performed within a time period from more than 0 second to substantially 3 seconds, preferably, a time period from more than 0 second to substantially 1 second. Therefore, a situation is avoided where one must wait for a long time due to the detrack adjustment automatically performed by the optical disc apparatus 1 from the time when the optical disc M is disposed in the optical disc apparatus 1 to the time when the main data/information/signals of the optical disc M are started to be read. When the optical disc M with good jitter characteristics is disposed in the optical disc apparatus 1, the detrack adjustment in the optical disc apparatus 1 is swiftly completed in a short time.

Description will then be made of a state when the track jump of the OPU 2 is performed if the detrack value other than the reference value 0 is set.

First, the detrack adjustment of the optical disc apparatus 1 (FIG. 1) is performed. The detrack value is set to a numeric value other than the reference value 0 in this case. Before starting the track jump, the detrack value is set to the reference value 0. The track jump operation is performed. After the track jump is completed, the detrack value is set back to the original numeric value other than the reference value 0.

Specifically describing the operation of the optical disc apparatus 1 from the start to the end of the track jump process, if the optimum detrack value is set to any one of biased numeric values other than the reference value 0 among the detrack values within the predetermined range (FIG. 13A: S270, FIG. 14, S291: NO, FIG. 15), when the OPU 2 is driven to perform the track jump on the optical disc (M) (FIG. 1), the detrack value is temporarily set to the reference value 0. After the detrack value is temporarily set to the reference value 0 (FIG. 14: S292), the OPU 2 (FIG. 1) is driven to perform the track jump (FIG. 14: S293).

By setting the detrack value in the optical disc apparatus 1 (FIG. 1) as shown in the steps of S291 and S292 of FIG. 14, even if the optimum detrack value is set to any one of biased numeric values (e.g., +6%) other than the reference value 0 of the detrack value among the detrack values within the predetermined range, the track jump of the OPU 2 on the optical disc (M) is favorably performed. When the detrack adjustment of the OPU 2 is performed for the optical disc (M), if the optimum detrack value is set to a biased numeric value (+6%) other than the reference value 0, a track of the optical disc (M) may not be caught when the track jump is performed by the OPU 2 on the optical disc (M). However, since the detrack value is temporarily set to the reference value 0 when the track jump is performed by the OPU 2, even if the detrack value is set to a biased numeric value other than the reference value 0, the track jump becomes easily performed by the OPU 2 on the optical disc (M) in a normal manner.

After the track jump of the OPU 2 is performed on the optical disc (M) (FIG. 1) (FIG. 14: S293) and the track jump operation is completed, the detrack value is returned to the original biased numeric value (e.g., +6%) other than the reference value 0 (FIG. 14: S295, FIG. 15). Since the optimum detrack value of the initial setting was set to the biased numeric value other than the reference value 0 (FIG. 14, S294: NO, FIG. 15), the detrack value is returned to the original biased numeric value (e.g., +6%) other than the reference value 0 after the track jump is completed (FIG. 14: S295).

Therefore, the optimum detrack value is again set in the optical disc apparatus 1. When the track jump of the OPU 2 is not performed on the optical disc (M), a biased numeric value other than the reference value 0 of the detrack value is again set as the optimum detrack value in the optical disc apparatus 1 and, therefore, the tracking adjustment of the OBL 2 of the OPU 2 is favorably performed for the optical disc (M). Since the detrack value other than the reference value 0 stored earlier in the second memory circuit 12 is again set as the optimum detrack value in the optical disc apparatus 1, the optimum detrack value is swiftly set again.

Description will then be made of a state when the track jump of the OPU 2 is performed if the optimum detrack value is set to the reference value 0. Specifically describing the operation of the optical disc apparatus 1 from the start to the end of the track jump process when the optimum detrack value is set to the reference value 0, if the optimum detrack value is set to the reference value 0 (FIG. 14, S291: YES, FIGS. 16, 17, 18, and 19), the OPU 2 (FIG. 1) is driven to perform the track jump without changing the detrack value (FIG. 14: S293). Since the optimum detrack value continues to be set to the reference value 0, the track jump continues to be performed by the OPU 2 on the optical disc M/(M) (FIG. 1) in a normal manner. Since the optimum detrack value of the initial setting was set to the reference value 0 (FIG. 14, S294: YES, FIGS. 16, 17, 18, and 19), the detrack value is not changed after the track jump is completed and the optimum detrack value is maintained at the reference value 0.

The tilt-value adjusting method of the disc apparatus 1 will then be described.

Figure 20A:
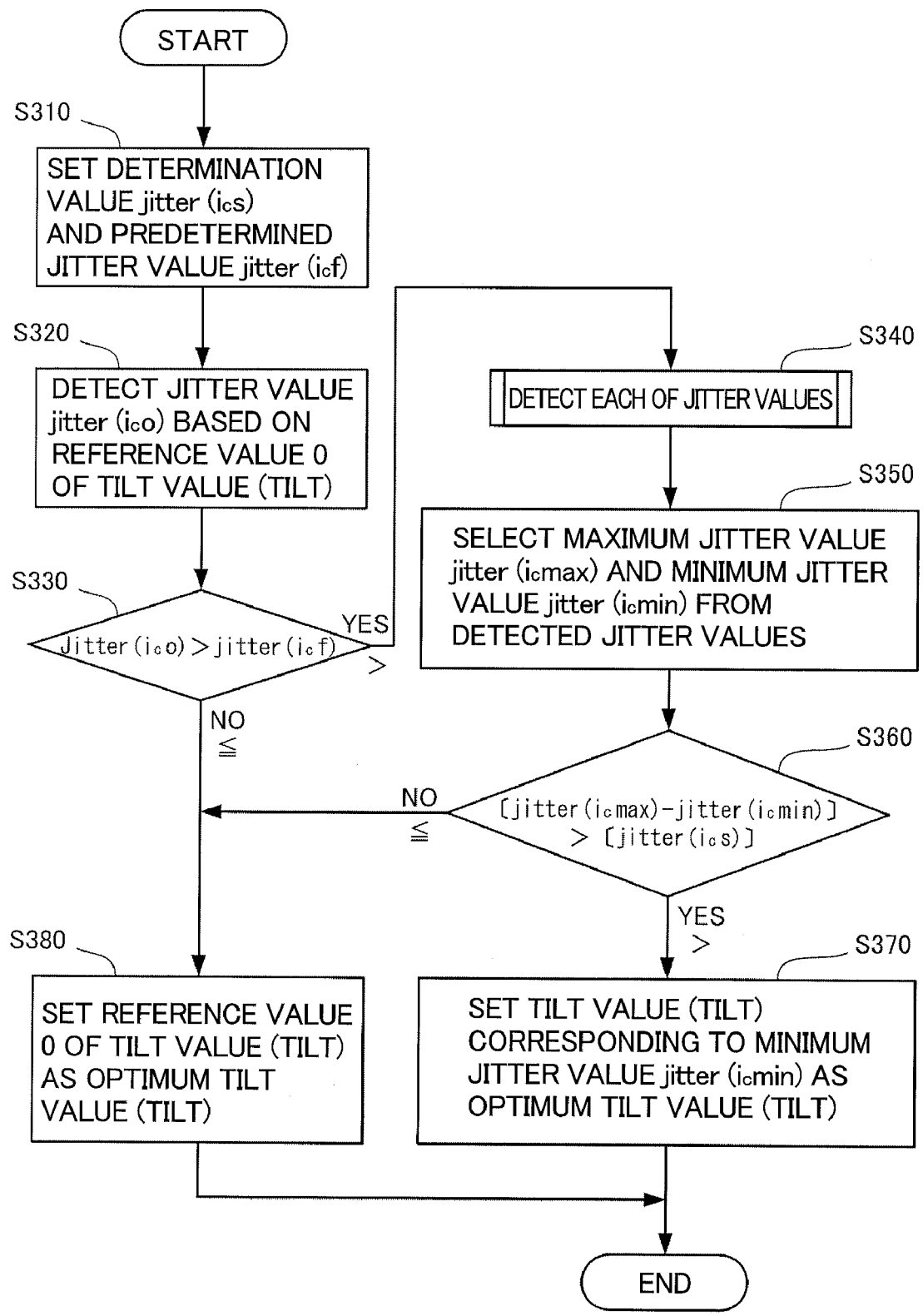
FIG. 20A is a flowchart of an embodiment of a tilt-value adjusting method of a disc apparatus.
Figure 20B:
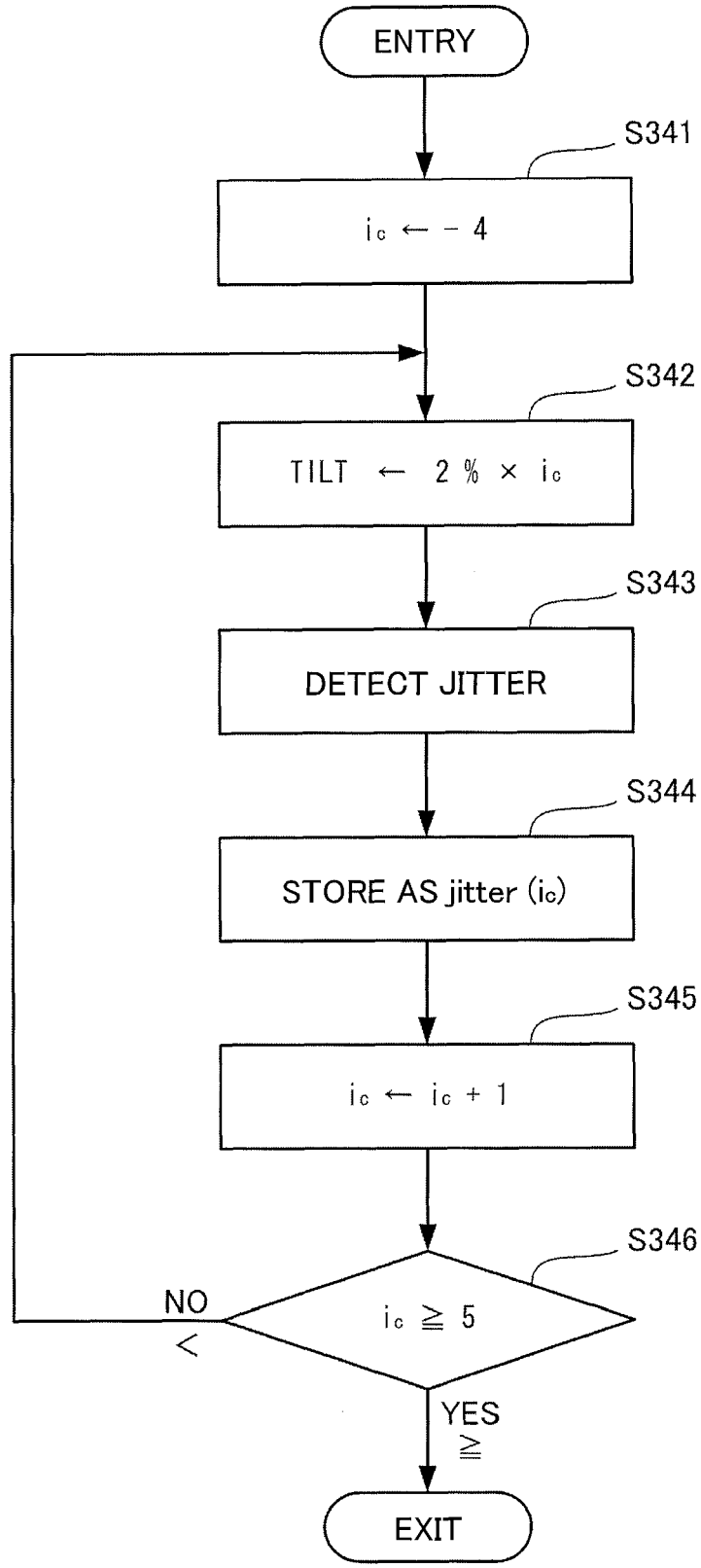
FIG. 20B is a flowchart of a jitter-value detecting process of the tilt-value adjusting method of a disc apparatus.
Figure 21:
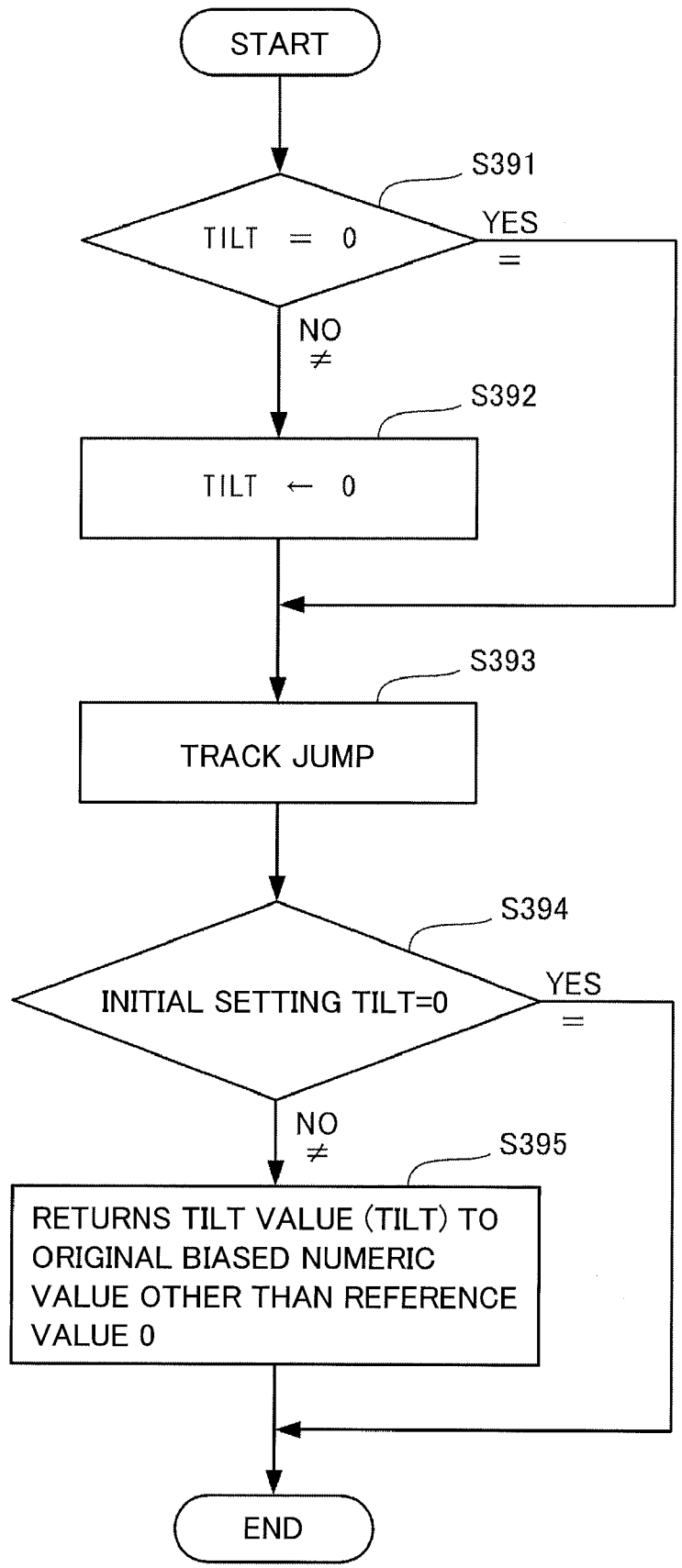
FIG. 21 is a flowchart of a track jump process when performing a tilt-value adjusting method of a disc apparatus.
Figure 22:
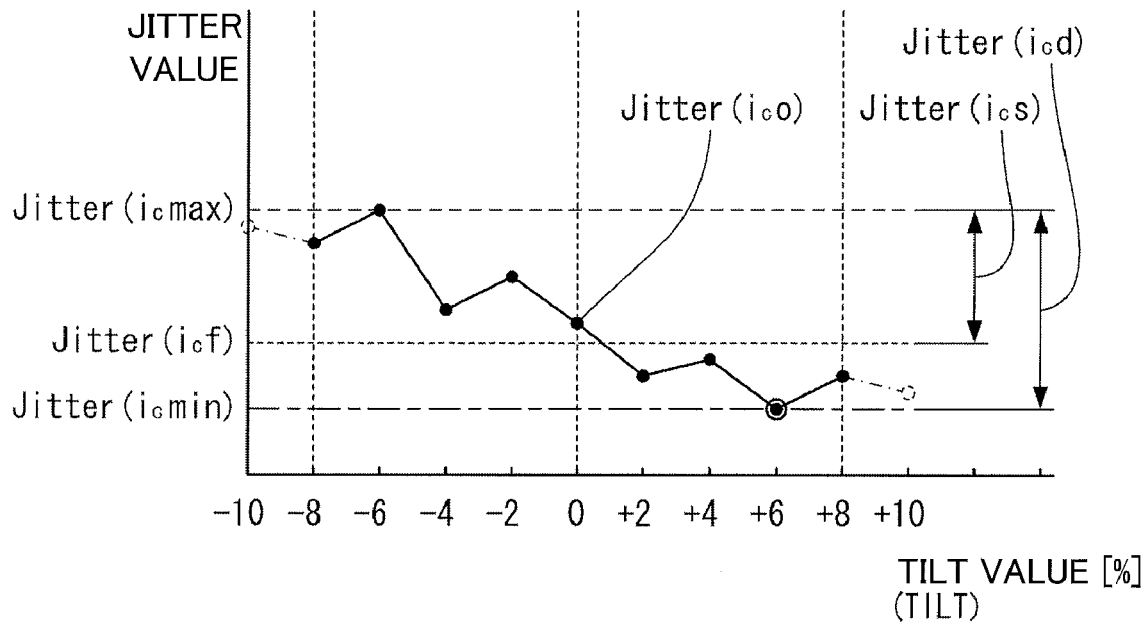
FIG. 22 is a graphic representation of a relationship between a tilt value and a jitter value.
Figure 23:
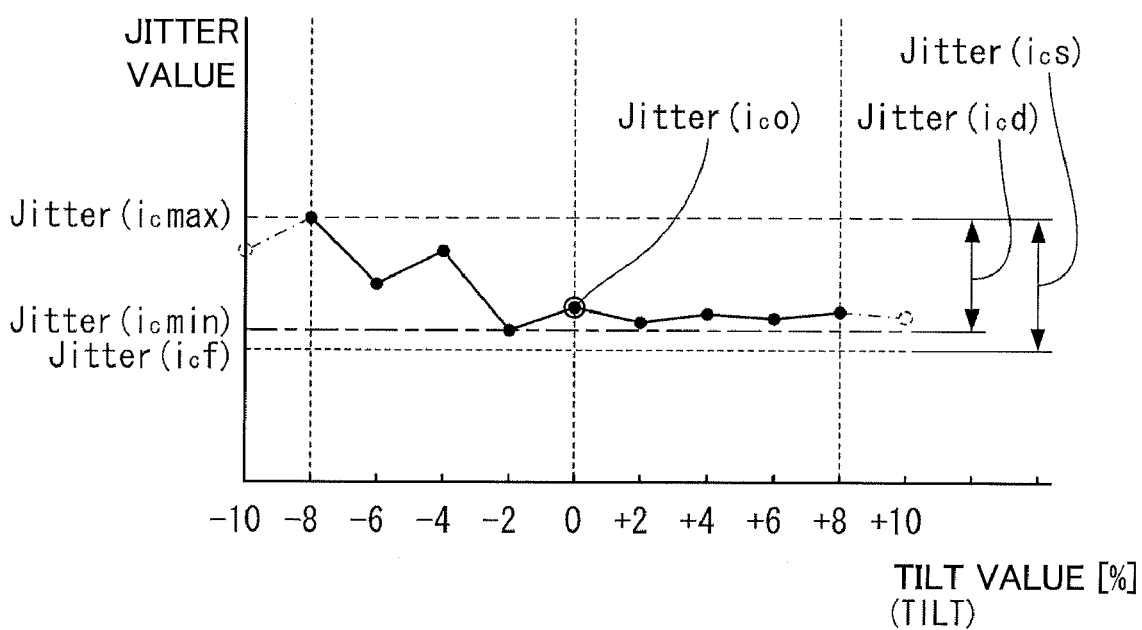
FIG. 23 is also a graphic representation of a relationship between a tilt value and a jitter value.
Figure 24:
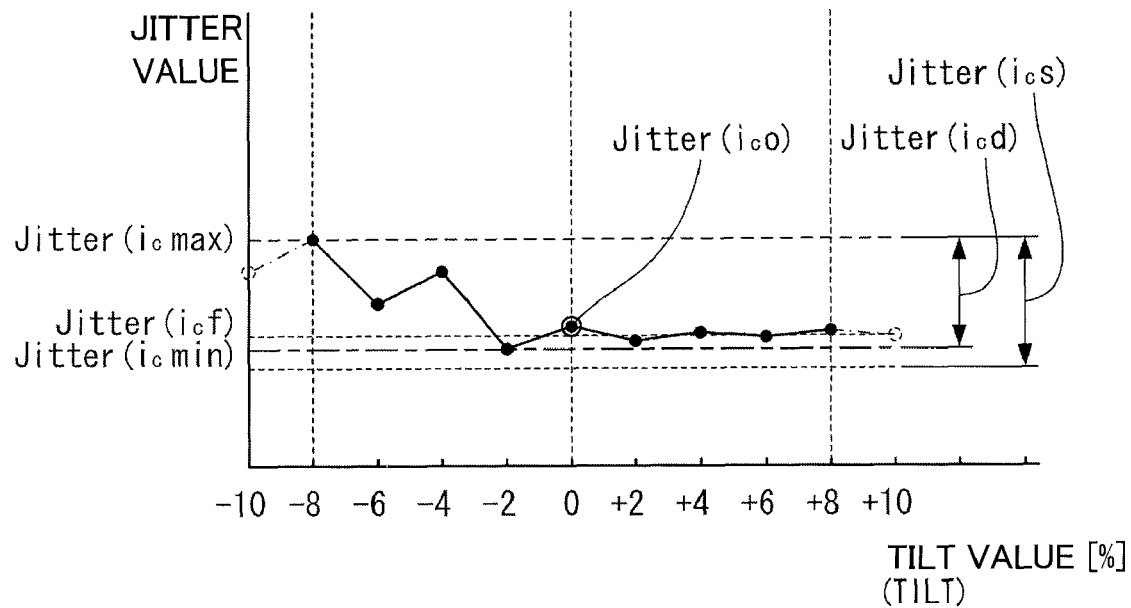
FIG. 24 is also a graphic representation of a relationship between a tilt value and a jitter value.
Figure 25:
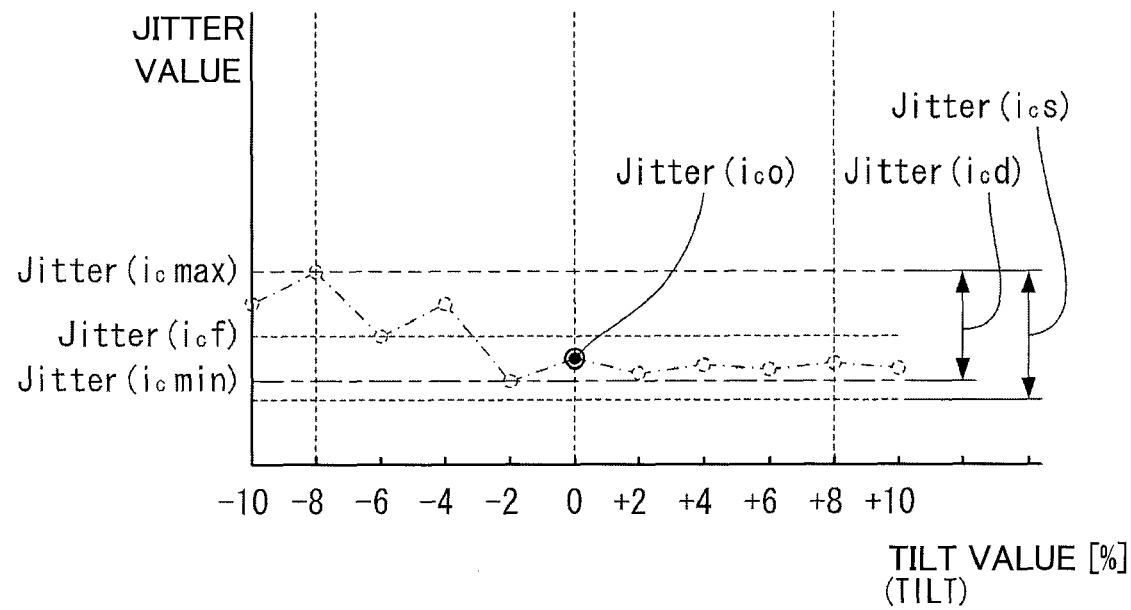
FIG. 25 is also a graphic representation of a relationship between a tilt value and a jitter value.
Figure 26:
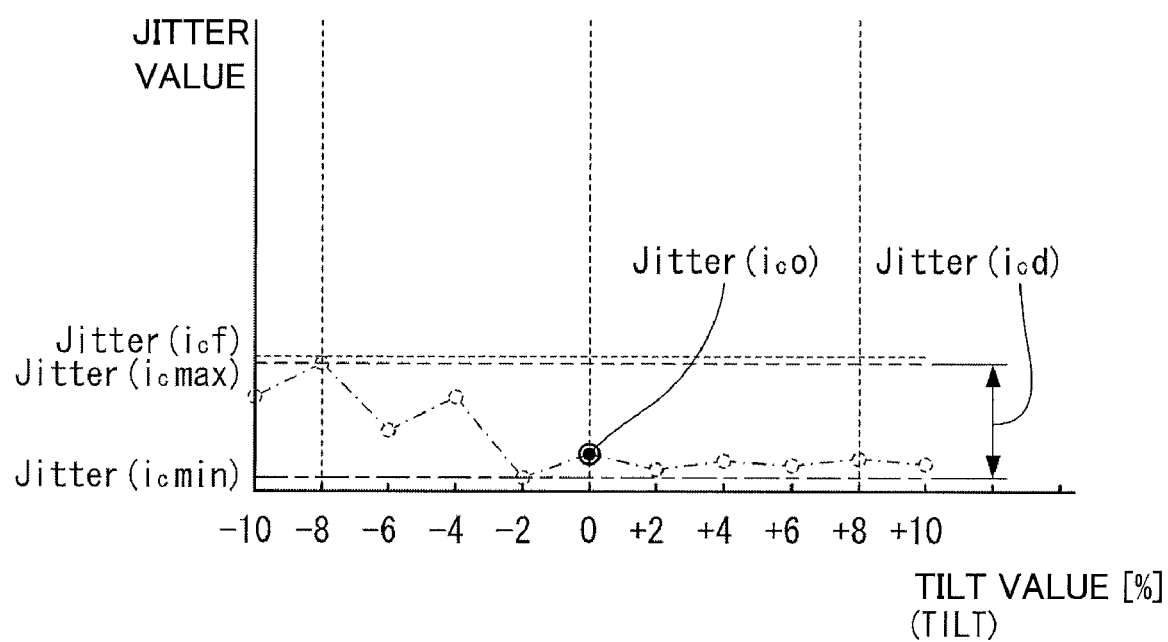
FIG. 26 is also a graphic representation of a relationship between a tilt value and a jitter value.

FIG. 20A is a flowchart of an embodiment of the tilt-value adjusting method of the disc apparatus; FIG. 20B is a flowchart of a jitter-value detecting process of the tilt-value adjusting method of the disc apparatus; FIG. 21 is a flowchart of a track jump process when performing the tilt-value adjusting method of the disc apparatus; FIG. 22 is a graphic representation of a relationship between the tilt value and the jitter value; FIG. 23 is also a graphic representation of a relationship between the tilt value and the jitter value; FIG. 24 is also a graphic representation of a relationship between the tilt value and the jitter value; FIG. 25 is also a graphic representation of a relationship between the tilt value and the jitter value; and FIG. 26 is also a graphic representation of a relationship between the tilt value and the jitter value.

The tilt-value adjusting method of the optical disc apparatus 1 will be described with reference to the figures in conjunction with flowcharts shown in FIGS. 20A, 20B, and 21.

The tilt adjusting method of the optical disc apparatus 1 based on the jitter value is performed as follows. For example, at the time of reproduction of the reproduction/recording optical disc M (FIG. 1), there has already been completed the servo adjustment for the data reading, etc. In this case, for example, the offset adjustment of the focus has already been performed. For example, the offset adjustment of the track has also already been performed. For example, in the optical disc apparatus 1, there is read a signal having the shape of S-curve substantially laid sideways with −50% to +50% of the tilt values centering a reference value 0. When the tilt adjusting method of the optical disc apparatus 1 is performed, for example, a tilt adjusting method of the optical disc apparatus 1 including mechanical tilt adjustment is performed.

The optical disc apparatus 1 is used to perform the tilt adjustment of the OBL 4 for the signal face portion Ms of the optical disc M. The optical disc apparatus 1 is used to perform the tilt-value adjusting method in the optical disc apparatus 1.

For example, when the optical disc apparatus 1 is turned on, preparations are started for performing the tilt-value adjusting method of the optical disc apparatus 1. When the optical disc apparatus 1 is turned on and the optical disc apparatus 1 is rendered in the power-on state, for example, data such as various pieces of information are sent from the memory circuit 11 such as the ROM 11 to the system control circuit 10. At this point, various data, for example, a predetermined jitter value jitter($i_c$f) and a determination value jitter ($i_c$s) are sent to the system control circuit 10 and set in the system control circuit 10 (FIG. 20A: S310).

The tilt-value adjusting method of this optical disc apparatus 1 (FIG. 1) is a tilt-value adjusting method of the optical disc apparatus 1 that performs the tilt adjustment of the OBL 4 for the optical disc M with the use of the optical disc apparatus 1 including the OPU 2 having the OBL 4 by detecting the jitter value of the signal read from the optical disc M and by adjusting the tilt value used for correcting the angular displacement of the OBL 4 relative to the signal face portion Ms of the optical disc M when the OBL 4 of the OPU 2 is focused on the signal face portion Ms of the optical disc M based on the detected jitter value. The tilt-value setting process is performed as follows.

By disposing the optical disc M on the optical disc apparatus 1, the operation is substantially started for setting the suitable tilt value in the optical disc apparatus 1. First, a tilt voltage is applied to the tilt coil (TILT COIL) 73 to measure the jitter with the use of the optical disc apparatus 1. When causing the optical disc apparatus 1 to perform the tilt-value adjusting method, the jitter is first detected/measured at the tilt value of ±0 (FIG. 20A: S320). At this point, for example, as shown in FIG. 25 or FIG. 26, if it is determined that a jitter value jitter($i_c$o) at the tilt value of ±0 is a small value equal to or smaller than a specified value jitter($i_c$f) and the program in the CPU 10 determines that the optical disc M (FIG. 1) has good jitter characteristics (FIG. 20A, S330: NO), the tilt value is set to zero (FIG. 20A: S380) and the tilt adjustment is completed.

This optical disc apparatus 1 performs a different tilt-value adjusting method for each of the optical disc M with good jitter characteristics and the optical disc (M) determined to have the jitter characteristics that are not good.

When the tilt-value adjusting method in the optical disc apparatus 1 is performed with the use of the optical disc apparatus 1, for example, as shown in FIGS. 22, 23, and 24, jitter values are detected/measured as needed. Specifically, in the case of the optical disc (M) for which: it is determined that the jitter value jitter($i_c$o) at the tilt value of ±0 is a value greater than the specified value jitter($i_c$f); the program in the CPU 10 (FIG. 1) presumes/determines that the jitter characteristics are not good; and it is also determined that each of the jitter values requires the detection/check, the following measurement is performed. First, when reading the signal from the optical disc (M) to detect the jitter value, the tilt value within a predetermined range is changed. Specifically, when reading the signal from the optical disc (M) to detect the jitter value, the tilt value is changed stepwise within a predetermined range of numeric values including the reference value 0 of the tilt value (FIGS. 22, 23, and 24) being centered (FIG. 20A: S340, FIG. 20B: S341 to S346). Every time the tilt value is changed stepwise, the jitter value is detected.

The operation of setting the tilt value is performed by the tilt-value setting circuit 23 in the state of performing the reproduction operation for the signal recorded in the optical disc (M) (FIG. 1). In the tilt-value setting circuit 23, a value of the tilt value to be set is changed in a stepwise of 2% from −8% to +8% relative to the reference value 0 (FIGS. 22, 23, and 24). At the same time, the jitter value of the reproduction signal is detected correspondingly to the tilt values by the jitter measurement circuit 9 to set the tilt value.

Specifically, while the tilt value is set in the tilt-value setting circuit 23 to a value lower than the reference value 0 by substantially −8%, the reproduction operation is performed for the signal recorded in the optical disc (M) to detect the jitter value included in the reproduction signal with the jitter measurement circuit 9. The jitter value detected in this way is stored in the memory circuit 12 such as the RAM 12 along with the tilt value.

As the tilt value is changed in a stepwise of 2% from −8% to +8% relative to the reference value 0, the jitter value corresponding to the tilt value is detected and the jitter value is stored in the memory circuit 12 along with the tilt value. The operation is repeatedly performed.

When the operation is started for setting the tilt value in the optical disc apparatus 1, in the case of the optical disc (M) for which it is determined that the jitter values require detection/check during the process of the tilt adjusting method of the optical disc apparatus 1, the operation of detecting the jitter value is first performed each time the tilt value is changed within a predetermined range (FIG. 20A: S340, FIG. 20B: S341 to S346). The predetermined range is defined, for example, if the tilt value 0 is defined as a reference value, as the tilt values from −10% to +10% to be set in the tilt-value setting circuit 23 relative to the reference value (FIGS. 22, 23, and 24). The preferable predetermined range of tilt values is defined, for example, if the tilt value 0 is defined as a reference value, as a range from −8% to +8% to be set in the tilt-value setting circuit 23 relative to the reference value.

For example, if the tilt value is set to a value smaller than the −10% value, the tilt function may not work normally. Alternatively, for example, if the tilt value is set to a value greater than the +10% value, the tilt function may not work normally. Therefore, the tilt values from −10% to +10% centering the reference value 0 of the tilt value may be set in the tilt-value setting circuit 23. Preferably, the tilt function works normally by setting the tilt values from −8% to +8% centering the reference value 0 of the tilt value in the tilt-value setting circuit 23.

For example, in the case of the optical disc (M) (FIG. 1) for which: it is determined that the jitter value jitter($i_c$o) at the reference value 0 of the tilt value (FIGS. 22, 23, and 24) is a value greater than the specified value jitter($i_c$f); it is presumed/determined that the jitter value is not good; and it is also determined that each of the jitter values requires detection/check, the following process is performed under the control of the program in the CPU 10. The following process is performed by the CPU 10 and the second memory circuit 12.

First, an initial value is set by the program in the CPU 10 to set $i_c$=−4 (FIG. 20B: S341). For example, a value of "TILT=2%×$i_c$" is set (SET) (S342). The jitter value is measured by the OPU 2 (S343) and the result is stored in the second memory circuit 12 as "jitter($i_c$)" (S344).

The "$i_c$" is incremented by the program in the CPU 10 (S341, S342 to S346).

In the case of "$i_c$<5" (S346: NO), a value of "TILT=2%×$i_c$" is set (S342) and the jitter is measured again by the OPU 2 (S343) to store the result in the second memory circuit 12 as "jitter($i_c$)" (S344). In the case of "$i_c$≧5" (S346: YES), a minimum value is obtained from "jitter($i_c$)", and "$i_c$" at this point is defined as "$i_c$min" (FIG. 20A: S350). In the case of "$i_c \geq 5$" (FIG. 20B, S346: YES), a maximum value is obtained from "jitter($i_c$)", and "$i_c$" at this point is defined as "$i_c$max" (FIG. 20A: S350).

The optimum tilt value is then set based on a difference value jitter($i_c$d) between the maximum jitter value jitter($i_c$max) and the minimum jitter value jitter($i_c$min) of the detected jitter values (S360).

The tilt value is changed within the predetermined range: the detection operation of each of the jitter values is performed (FIG. 20A: S340, FIG. 20B: S341 to S346); and the maximum jitter value jitter($i_c$max) and the minimum jitter value jitter($i_c$min) are selected from the detected jitter values (FIG. 20A: S350).

After the selection setting operation at the step of S350 is performed, there is performed a determination operation which determines whether [jitter($i_c$max)–jitter($i_c$min)>jitter ($i_c$s)] is satisfied (S360: YES) or [jitter($i_c$max)–jitter($i_c$min) >jitter($i_c$s)] is not satisfied (S360: NO). If it is determined that [jitter($i_c$max)–jitter($i_c$min)>jitter($i_c$s)] is satisfied at the step of S360 (S360: YES), the tilt value corresponding to the minimum jitter value jitter($i_c$min) is set as the optimum tilt value (S370). Alternatively, if it is determined that [jitter ($i_c$max)–jitter($i_c$min)>jitter($i_c$s)] is not satisfied at the step of S360 (S360: NO), the reference value 0 of the tilt value is set as the optimum tilt value (S380).

The optimum tilt value is set in the optical disc apparatus 1 by performing the tilt-value adjusting method of the optical disc apparatus 1 as above. The jitter value is detected as needed every time the tilt value is changed stepwise within the predetermined range of numeric values including the reference value 0 of the tilt value and being centered so that the optimum tilt value is set based on the difference value jitter ($i_c$d) between the maximum jitter value jitter($i_c$max) and the minimum jitter value jitter($i_c$min) of the detected jitter values. Therefore, the optimum tilt value is set in the optical disc apparatus 1. Since the optimum tilt value is set in the optical disc apparatus 1, the OPU 2 performs the stable tilt operation for the optical disc M. The tilt value setting operation can easily be performed in the optical disc apparatus 1.

After the optical disc (M) is completely disposed in the optical disc apparatus 1, when reading each of the signals from the optical disc (M) and detecting each of the jitter values to perform the tilt adjustment of the OBL 4 for the optical disc (M), the tilt adjustment is performed within a time period from more than 0 second to substantially 20 seconds. More specifically, after the optical disc (M) is completely disposed in the optical disc apparatus 1, when the tilt value is changed stepwise within the predetermined range of numeric values including the reference value 0 (FIGS. 22, 23, and 24) of the tilt value and being centered (FIG. 20A: S340, FIG. 20B: S341 to S346) to read each of the signals from the optical disc (M) (FIG. 1) and detect each of the jitter values, so that the optimum tilt-value adjustment of the OBL 4 for the optical disc (M) (FIG. 1) is performed based on the difference value jitter($i_c$d) between the maximum jitter value jitter($i_c$max) (FIGS. 22, 23, and 24) and the minimum jitter value jitter($i_c$min) of the detected jitter values (FIG. 20A: S360). The tilt adjustment is preferably completed within a time period from more than 0 second to substantially 15 seconds.

Since the time spent for the tilt-value adjusting method of the optical disc apparatus 1 is set to a short time, there is swiftly completed the setting process when the tilt adjustment is performed in the optical disc apparatus 1 without waiting for a long time due to the tilt adjustment. After the optical disc (M) is completely disposed in the optical disc apparatus 1, when the tilt value is changed stepwise within the predetermined range of numeric values including the reference value 0 of the tilt value being centered, to read each of the signals from the optical disc (M) and detect each of the jitter values to perform the tilt adjustment of the OBL 4 for the optical disc (M) based on the difference value jitter($i_c$d) between the maximum jitter value jitter($i_c$max) and the minimum jitter value jitter($i_c$min) of the detected jitter values, the tilt adjustment is performed within a time period from more than 0 second to substantially 20 seconds, preferably, within a time period from more than 0 second to substantially 15 seconds. Therefore, a situation is avoided where one must wait for a very long time due to the tilt adjustment automatically performed by the optical disc apparatus 1 from the time when the optical disc (M) is disposed in the optical disc apparatus 1 to the time when the main data/information/signals of the optical disc (M) are started to be read.

FIG. 22 is a characteristic view of a relationship between the jitter value and the tilt value when it is determined in the CPU 10 (FIG. 1) that [jitter($i_c$max)–jitter($i_c$min)>jitter($i_c$s)] is satisfied (FIG. 20A, S360: YES).

When performing the tilt adjustment of the OBL 4 for the optical disc (M) (FIG. 1), if it is determined that the difference value jitter($i_c$d) between the maximum jitter value jitter($i_c$max) and the minimum jitter value jitter($i_c$min) is a value greater than the predetermined value jitter($i_c$s) as shown in FIG. 22, the tilt value corresponding to the minimum jitter value jitter($i_c$min) is set as the optimum tilt value.

The minimum jitter value jitter($i_c$min) is smaller than the jitter value jitter($i_c$f) that is smaller than the maximum jitter value jitter($i_c$max) by the determination value jitter($i_c$s), for example. In such a case, in the optical disc apparatus 1, there is performed the operation of setting the tilt value corresponding to the minimum jitter value jitter($i_c$min), i.e., the tilt value greater than the reference value 0 by +6% as the optimum tilt value with the tilt-value setting circuit 23.

The program in the CPU 10 (FIG. 1) performs the next setting based on the value of [jitter($i_c$max)–jitter($i_c$min)]. If the value of [jitter($i_c$max)–jitter($i_c$min)] exceeds a certain value jitter($i_c$s), "TILT" is set to "2%×$i_c$min", for example. The tilt adjustment is completed in this way.

When the tilt-value setting operation is performed as above, the tilt value greater than the reference tilt value 0 by +6% is set in the tilt-value setting circuit 23, and the tilt operation of the tilt-value setting circuit 23 is performed centering the set tilt value.

By performing the tilt-value adjusting method of the optical disc apparatus 1 as above, the OPU 2 making up the optical disc apparatus 1 performs the stable tilt operation for the optical disc (M). The optical disc (M): when it is determined that the difference value jitter($i_c$d) between the maximum jitter value jitter($i_c$max) therefor and the minimum jitter value jitter($i_c$min) therefor is a value greater than the predetermined value jitter($i_c$s); is considered as the optical disc (M) with poor jitter characteristics. Since the tilt value corresponding to the minimum jitter value jitter($i_c$min) is set as the optimum tilt value when reading a signal from the optical disc (M) with the poor jitter characteristics, the stable tilt operation is performed in the OPU 2.

If it is determined that [jitter($i_c$max)–jitter($i_c$min)>jitter ($i_c$s)] is not satisfied at the step of S360 shown in FIG. 20A (S360: NO), the reference tilt value 0 is set as the optimum tilt value (S380).

FIG. 23 is a characteristic view of a relationship between the jitter value and the tilt value when it is determined in the CPU 10 (FIG. 1) that [jitter($i_c$max)–jitter($i_c$min)>jitter($i_c$s)] is not satisfied (FIG. 20A, S360: NO).

When performing the tilt adjustment of the OBL 4 for the optical disc (M) (FIG. 1), if it is determined that the difference value jitter($i_c$d) between the maximum jitter value jitter($i_c$max) and the minimum jitter value jitter($i_c$min) is a small value equal to or smaller than the predetermined value jitter ($i_c$s) as shown in FIG. 23, the reference value 0 of the tilt value is set as the optimum tilt value. If the maximum value–minimum value (MAX–MIN) of the jitter values is equal to or smaller than a certain value, the tilt value is set to ±0. For example, when the jitter values with a wave shape shown in FIG. 23 are detected, if it is determined that the jitter value jitter($i_c$o) at the reference value 0 of the tilt value is a value greater than the predetermined jitter value jitter($i_c$f) and that the difference value jitter($i_c$d) between the maximum jitter value jitter($i_c$max) and the minimum jitter value jitter($i_c$min) is a small value equal to or smaller than the predetermined value jitter($i_c$s), the tilt value is set to ±0. Alternatively, for example, when the jitter values with a wave shape shown in FIG. 23 are detected, if it is determined that all the jitter values are values greater than the predetermined jitter value jitter($i_c$f) and that the difference value jitter($i_c$d) between the maximum jitter value jitter($i_c$max) and the minimum jitter value jitter ($i_c$min) is a small value equal to or smaller than the predetermined value jitter($i_c$s), the tilt value is set to ±0.

The minimum jitter value jitter($i_c$min) is greater than the jitter value jitter($i_c$f) that is smaller than the maximum jitter value jitter($i_c$max) by the determination value jitter($i_c$s), for example. In such a case, since the changes in the jitter values are small, there is performed the operation of setting the reference tilt value as the optimum tilt value for the tilt-value setting circuit 23 in the optical disc apparatus 1.

In the program in the CPU 10 (FIG. 1), the next setting is performed based on the value of [jitter($i_c$max)–jitter($i_c$min)]. If the value of [jitter($i_c$max)–jitter($i_c$min)] is equal to or smaller than a certain value jitter($i_c$s), "TILT" is set to 0. The tilt adjustment is completed in this way.

When the tilt-value setting operation is performed as above, the tilt operation of the tilt-value setting circuit 23 is performed centering the reference tilt value 0. Since the tilt setting/operation is performed centering the reference tilt value 0, the tilt control can stably be performed in the OPU 2.

By performing the tilt-value adjusting method of the optical disc apparatus 1 as above, the OPU 2 making up the optical disc apparatus 1 performs the stable tilt operation for the optical disc M. The optical disc M: when it is determined that the difference value jitter($i_c$d) between the maximum jitter value jitter($i_c$max) therefor and the minimum jitter value jitter($i_c$min) therefor is a small value equal to or smaller than the predetermined value jitter($i_c$s); is considered as the optical disc M with relatively good jitter characteristics. Since the reference value 0 of the tilt value is set as the optimum tilt value in the optical disc apparatus 1 when reading a signal from the optical disc M with the relatively good jitter characteristics, the stable tilt operation is performed in the OPU 2 without malfunction occurring in the tilt operation of the OPU 2. The setting of the tilt value can easily be performed in the optical disc apparatus 1.

When performing the tilt adjustment of the OBL 4 for the optical disc (M) (FIG. 1), if it is determined that the difference value jitter($i_c$d) between the maximum jitter value jitter($i_c$max) and the minimum jitter value jitter($i_c$min) is a small value equal to or smaller than the predetermined value jitter ($i_c$s) as shown in FIG. 24, the reference value 0 of the tilt value is set as the optimum tilt value. If the value of maximum value–minimum value (MAX–MIN) of the jitter values is equal to or smaller than a certain value, the tilt value is set to ±0. For example, when the jitter values with a wave shape shown in FIG. 24 are detected, if it is determined that the jitter value jitter($i_c$o) at the reference value 0 of the tilt value is a value greater than the predetermined jitter value jitter($i_c$f) and that the difference value jitter($i_c$d) between the maximum jitter value jitter($i_c$max) and the minimum jitter value jitter ($i_c$min) is a small value equal to or smaller than the predetermined value jitter($i_c$s), the tilt value is set to ±0. In such a case, since the changes in the jitter values are small, the optical disc apparatus 1 performs the operation of setting the reference tilt value as the optimum tilt value in the tilt-value setting circuit 23.

In the program in the CPU 10 (FIG. 1), the next setting is performed based on the value of [jitter($i_c$max)–jitter($i_c$min)]. If the value of [jitter($i_c$max)–jitter($i_c$min)] is equal to or smaller than a certain value jitter($i_c$s), "TILT" is set to 0. The tilt adjustment is completed in this way.

When the tilt-value setting operation is performed as above, the tilt operation of the tilt-value setting circuit 23 is performed with the reference tilt value 0 being centered. Since the tilt setting/operation is performed with the reference tilt value 0 being centered, the tilt control can stably be performed in the OPU 2.

By performing the tilt-value adjusting method of the optical disc apparatus 1 as above, the OPU 2 making up the optical disc apparatus 1 performs the stable tilt operation for the optical disc M. The optical disc M: when it is determined that the difference value jitter($i_c$d) between the maximum jitter value jitter($i_c$max) therefor and the minimum jitter value jitter($i_c$min) therefor is a small value equal to or smaller than the predetermined value jitter($i_c$s); is considered as the optical disc M with relatively good jitter characteristics. Since the reference value 0 of the tilt value is set as the optimum tilt value in the optical disc apparatus 1 when reading a signal from the optical disc M with the relatively good jitter characteristics, the stable tilt operation is performed in the OPU 2 without malfunction occurring in the tilt operation of the OPU 2. The setting of the tilt value can easily be performed in the optical disc apparatus 1.

After the optical disc (M) is completely disposed in the optical disc apparatus 1, each of the signals is read from the optical disc (M) and each of the jitter values is detected, to perform the tilt adjustment of the OBL 4 for the optical disc (M). The tilt adjustment is performed within a time period from more than 0 second to substantially 15 seconds. More specifically, after the optical disc (M) is completely disposed in the optical disc apparatus 1, when the tilt value is changed stepwise within the predetermined range of numeric values including the reference value 0 (FIGS. 22, 23, and 24) of the tilt value being centered (FIG. 20A: S340, FIG. 20B: S341 to S346) to read each of the signals from the optical disc (M) (FIG. 1) and detect each of the jitter values, so that the optimum tilt-value adjustment of the OBL 4 for the optical disc (M) (FIG. 1) is performed based on the difference value jitter($i_c$d) between the maximum jitter value jitter($i_c$max) (FIGS. 22, 23, and 24) and the minimum jitter value jitter ($i_c$min) of the detected jitter values (FIG. 20A: S360). The above tilt adjustment is preferably completed within a time period from more than 0 second to substantially 10 seconds.

Since the time spent for the tilt-value adjusting method of the optical disc apparatus 1 is set to a short time as above, there is swiftly completed the setting process when the tilt adjustment is performed in the optical disc apparatus 1 without waiting for a long time due to the tilt adjustment. After the optical disc (M) is completely disposed in the optical disc apparatus 1, when the tilt value is changed stepwise within the predetermined range of numeric values including the reference value 0 of the tilt value being centered, to read each of the signals from the optical disc (M) and detect each of the jitter values so that the tilt adjustment of the OBL 4 for the optical disc (M) is performed based on the difference value jitter($i_c$d) between the maximum jitter value jitter($i_c$max) and the minimum jitter value jitter($i_c$min) of the detected jitter values, the tilt adjustment is performed within a time period from more than 0 second to substantially 15 seconds, preferably, within a time period from more than 0 second to substantially 10 seconds. Therefore, a situation is avoided where one must wait for a very long time due to the tilt adjustment automatically performed by the optical disc apparatus 1 from the time when the optical disc (M) is disposed in the optical disc apparatus 1 to the time when the main data/information/signals of the optical disc (M) are started to be read.

As described above, when the tilt adjustment of the OBL 4 is performed for the optical disc (M) (FIG. 1) and the optimum tilt value is set in the optical disc apparatus 1, the jitter value is first detected based on the reference value 0 (FIGS. 22, 23, and 24) of the tilt value, and if it is determined that the detected jitter value jitter($i_c$o) based on the reference value 0 of the tilt value is a value greater than the predetermined jitter value jitter($i_c$f), a jitter-value detecting process is then executed to detect the jitter value every time the tilt value is changed stepwise within the predetermined range (e.g., −8% to +8%/−10% to +10%) of numeric values including the reference value 0 of the tilt value.

The optimum tilt value is set in the optical disc apparatus 1 by performing the tilt-value adjusting method of the optical disc apparatus 1 (FIG. 1) as above. When the tilt adjustment of the OBL 4 is performed for the optical disc (M) and the optimum tilt value is set in the optical disc apparatus 1, the jitter value jitter($i_c$o) based on the reference value 0 of the tilt value is first detected (FIG. 20A: S320). As shown in FIGS. 22, 23, and 24, the optical disc (M) (FIG. 1): if it is determined that the jitter value jitter($i_c$o) therefor based on the reference value 0 of the tilt value is a value greater than the predetermined jitter value jitter($i_c$f); is considered as the optical disc (M) in need of detecting/checking each of the jitter values corresponding to each of the tilt values. As shown in FIG. 20A, if it is determined that the jitter value jitter($i_c$o) based on the reference value 0 of the tilt value is a value greater than the predetermined jitter value jitter($i_c$f) (S330: YES), there are then performed the jitter-value detecting/comparing and determining/optimum value setting processes in which: each of the jitter values is detected every time the tilt value is changed stepwise within the predetermined range (e.g., −8% to +8%/−10% to +10%) of numeric values including the reference value 0 of the tilt value (FIG. 20A: S340, FIG. 20B: S341 to S346); and the optimum tilt value is set based on the difference value jitter($i_c$d) between the maximum jitter value jitter($i_c$max) and the minimum jitter value jitter($i_c$min) of the detected jitter values (FIG. 20A: S340, FIG. 20B: S341 to S346, FIG. 20A: S350, S360, S370/S380).

When the tilt value is changed stepwise within the predetermined range (e.g., −10% to +10%/−8% to +8%) of numeric values including the reference value 0 (FIGS. 22, 23, and 24) of the tilt value, a divided width of the tilt value is set to, for example, a value within a range from 0.5% to 5%, specifically, a value within a range from 1% to 4% of whole the tilt values. If the divided width of the tilt value is a small divided width, for example, less than 0.5% of the whole tilt values, since a large amount of data is to be acquired it is feared that the time spent for the tilt adjustment may be prolonged. If the divided width of the tilt value is a great divided width, for example, greater than 5% of the whole tilt values, the accurate tilt adjustment may not be performed since the number of acquired data is insufficient. By setting the divided width of the tilt value to a value within a range from 1% to 4% of the whole tilt values, preferably, by setting the divided width of the tilt value to 2% of the whole tilt values, the time spent for the tilt adjustment is not so prolonged and the relatively accurate tilt adjustment is performed.

As shown in FIGS. 25 and 26, before there is performed the operation for detecting the jitter value every time the tilt value is changed stepwise within the predetermined range of numeric values including the reference value 0 of the tilt value being centered, the jitter value is detected based on the reference value 0 of the tilt value, and if it is determined that the detected jitter value jitter($i_c$o) based on the reference value 0 of the tilt value is a small value equal to or smaller than the predetermined jitter value jitter($i_c$f), the reference value 0 of the tilt value is set as the optimum tilt value.

Specifically, when the tilt adjustment of the OBL 4 is performed for the optical disc (M) (FIG. 1) and the optimum tilt value is set in the optical disc apparatus 1, the jitter value is first detected based on the reference value 0 (FIG. 25) of the tilt value: and if it is determined that the detected jitter value jitter($i_c$o) based on the reference value 0 of the tilt value is a small value equal to or smaller than the predetermined jitter value jitter($i_c$f), the jitter-value detecting process is omitted without detecting each of the jitter values every time the tilt value is changed stepwise within the predetermined range of numeric values including the reference value 0 of the tilt value; and the reference value 0 of the tilt value is set as the optimum tilt value immediately after the detecting process of the jitter value jitter($i_c$o) based on the reference value 0 of the tilt value and the comparing and determining process between the predetermined jitter value jitter($i_c$f) and the jitter value jitter($i_c$o) based on the reference value 0 of the tilt value.

When the tilt value is ±0, if the jitter value jitter($i_c$o) is a small value equal to or smaller than the predetermined jitter value jitter($i_c$f), the optimum tilt value is set to ±0. If the optical disc M with good jitter characteristics is used, the stability of the tilt operation is prioritized.

By performing the tilt-value adjusting method of the optical disc apparatus 1 (FIG. 1) as above, when the optical disc M with good jitter characteristics is used, the tilt value is swiftly set and the OPU 2 making up the optical disc apparatus 1 performs the stable tilt operation for the optical disc M. When the tilt adjustment of the OBL 4 is performed for the optical disc M and the optimum tilt value is set in the optical disc apparatus 1, the jitter value jitter($i_c$o) based on the reference value 0 of the tilt value is first detected (FIG. 20A: S320). As shown in FIG. 25, the optical disc M (FIG. 1): if it is determined that the jitter value jitter($i_c$o) therefor based on the reference value 0 of the tilt value is a small value equal to or smaller than the predetermined jitter value jitter($i_c$f); is considered as the optical disc M with good jitter characteristics.

When reading the signal from the optical disc M with good jitter characteristics: the jitter-value detecting/comparing and determining processes (FIG. 20A: S340, FIG. 20B: S341 to S346, FIG. 20A: S350, S360) are omitted without detecting each of the jitter values every time the tilt value is changed stepwise within the predetermined range of numeric values including the reference value 0 of the tilt value; and the reference value 0 of the tilt value is set as the optimum tilt value in the optical disc apparatus 1 (FIG. 20A: S380) immediately after the detecting process (FIG. 20A: S320) of the jitter value jitter($i_c$o) based on the reference value 0 of the tilt value and the comparing and determining process (FIG. 20A: S330) between the predetermined jitter value jitter($i_c$f) and the jitter value jitter($i_c$o) based on the reference value 0 of the tilt value. Therefore, the setting time of the tilt value is reduced in the optical disc apparatus 1. When reading the signal from the optical disc M with good jitter characteristics, since the reference value 0 of the tilt value is set as the optimum tilt value in the optical disc apparatus 1, the stable tilt operation is performed in the OPU 2 without malfunction occurring in the tilt operation of the OPU 2.

When the tilt adjustment of the OBL 4 is performed for the optical disc M (FIG. 1) and the optimum tilt value is set in the optical disc apparatus 1, the jitter value is first detected based on the reference value 0 (FIG. 26) of the tilt value: and if it is determined that the detected jitter value jitter($i_co$) based on the reference value 0 of the tilt value is a small value equal to or smaller than the predetermined jitter value jitter($i_cf$), the jitter-value detecting process is omitted without detecting each of the jitter values every time the tilt value is changed stepwise within the predetermined range of numeric values including the reference value 0 of the tilt value; and the reference value 0 of the tilt value is set as the optimum tilt value immediately after the detecting process of the jitter value jitter($i_co$) based on the reference value 0 of the tilt value and the comparing and determining process between the predetermined jitter value jitter($i_cf$) and the jitter value jitter($i_co$) based on the reference value 0 of the tilt value.

When the tilt value is ±0, if the jitter value jitter($i_co$) is a small value equal to or smaller than the predetermined jitter value jitter($i_cf$), the optimum tilt value is set to ±0. If the optical disc M with good jitter characteristics is used, the stability of the tilt operation is prioritized.

By performing the tilt-value adjusting method of the optical disc apparatus 1 (FIG. 1) as above, when the optical disc M with good jitter characteristics is used, the tilt value is swiftly set and the OPU 2 making up the optical disc apparatus 1 performs the stable tilt operation for the optical disc M. When the tilt adjustment of the OBL 4 is performed for the optical disc M and the optimum tilt value is set in the optical disc apparatus 1, the jitter value jitter($i_co$) is first detected based on the reference value 0 of the tilt value (FIG. 20A: S320). As shown in FIG. 26, the optical disc M (FIG. 1): if it is determined that the jitter value jitter($i_co$) therefor based on the reference value 0 of the tilt value is a small value equal to or smaller than the predetermined jitter value jitter($i_cf$); is considered as the optical disc M with good jitter characteristics. Alternatively, for example, as shown in FIG. 26, the optical disc M (FIG. 1): if it is determined that all the jitter values between the maximum jitter value jitter($i_c$max) and the minimum jitter value jitter($i_c$min) are small values equal to or smaller than the predetermined jitter value jitter($i_cf$); is considered as the optical disc M with good jitter characteristics.

When reading the signal from the optical disc M with good jitter characteristics: the jitter-value detecting/comparing and determining processes (FIG. 20A: S340, FIG. 20B: S341 to S346, FIG. 20A: S350, S360) are omitted without detecting each of the jitter values every time the tilt value is changed stepwise within the predetermined range of numeric values including the reference value 0 of the tilt value; and the reference value 0 of the tilt value is set as the optimum tilt value in the optical disc apparatus 1 (FIG. 20A: S380) immediately after the detecting process (FIG. 20A: S320) of the jitter value jitter($i_co$) based on the reference value 0 of the tilt value and the comparing and determining process (FIG. 20A: S330) between the predetermined jitter value jitter($i_cf$) and the jitter value jitter($i_co$) based on the reference value 0 of the tilt value. Therefore, the setting time of the tilt value is reduced in the optical disc apparatus 1. When reading the signal from the optical disc M with good jitter characteristics, since the reference value 0 of the tilt value is set as the optimum tilt value in the optical disc apparatus 1, the stable tilt operation is performed in the OPU 2 without malfunction occurring in the tilt operation of the OPU 2.

Since the tilt value ±0 is first measured and set, the measurement time for detecting the jitter value can be reduced. It is possible to allow the optical disc apparatus 1 including the OPU 2 to perform the tilt adjustment only for the optical disc (M) for which the jitter value is presumed/determined as not good and the detection/check of each of the jitter values is required. Since the tilt adjustment is performed only for the optical disc (M) for which the jitter value is presumed/determined as not good and the detection/check of each of the jitter values is required, the initial measurement time of the optical disc M with good jitter characteristics can be reduced in the OPU 2. Since the tilt value is set to ±0 for the optical disc M with good jitter, the stable tilt setting can be performed for the optical disc M with good jitter. Since the tilt value is set to ±0 in the tilt-value setting circuit 23 when the optical disc apparatus 1 is disposed with the optical disc M for which the jitter value therefor is not substantially changed, no servo failure occurs and the stable tilt operation can be performed.

As described above, in the tilt-value adjusting method of the optical disc apparatus 1, the jitter value is detected every time the tilt value is changed by the predetermined % within the predetermined range centering the reference value 0 of the tilt value, to perform the operation of setting the optimum tilt value. Before such an operation is performed, the operation of detecting the jitter value is performed in the state where the tilt value is set to the reference tilt value defined as zero. If it is determined that the detected jitter value jitter($i_co$) is a small value equal to or smaller than the predetermined value jitter ($i_cf$), i.e., if it is determined that the optical disc M has good reproduction characteristics, there is performed the operation of setting the reference tilt value 0, as it is, as the optimum tilt value in the optical disc apparatus 1.

If the jitter value jitter($i_co$) to be detected/set for the determining operation is detected as a small jitter value equal to or smaller than, for example, a predetermined jitter value jitter ($i_cf$), the optical disc M is determined as a good disc, and the reproduction operation can be performed without trouble even if the selecting operation of the tilt value is not performed.

After the optical disc M with good jitter characteristics is completely disposed in the optical disc apparatus 1, when performing the tilt adjustment of the OBL 4 in the optical disc apparatus 1 for the optical disc M with good jitter characteristics, the tilt adjustment is performed within a time period from more than 0 second to substantially 3 seconds, preferably, a time period from more than 0 second to substantially 1 second.

After the optical disc M with good jitter characteristics is completely disposed in the optical disc apparatus 1, when performing the tilt adjustment of the OBL 4 for the optical disc M, the tilt adjustment is performed within a time period from more than 0 second to substantially 3 seconds, preferably, a time period from more than 0 second to substantially 1 second. Therefore, a situation is avoided where one must wait for a long waiting time is not generated due to the tilt adjustment automatically performed by the optical disc apparatus 1 from the time when the optical disc M is disposed in the optical disc apparatus 1 to the time when the main data/information/signals of the optical disc M are started to be read. When the optical disc M with good jitter characteristics is disposed in the optical disc apparatus 1, the tilt adjustment in the optical disc apparatus 1 is swiftly completed in a short time.

Description will then be made of a state when the track jump of the OPU 2 is performed if the tilt value other than the reference value 0 is set.

First, the tilt adjustment of the optical disc apparatus 1 (FIG. 1) is performed. The tilt value is set to a numeric value other than the reference value 0 in this case. Before starting the track jump, the tilt value is set to the reference value 0. The track jump operation is performed. After the track jump is completed, the tilt value is set to the original numeric value other than the reference value 0.

Specifically describing the operation of the optical disc apparatus 1 from the start to the end of the track jump process, if the optimum tilt value is set to any one of biased numeric values other than the reference value 0 among the tilt values within the predetermined range (FIG. 20A: S370, FIG. 21, S391: NO, FIG. 22), when the OPU 2 is driven to perform the track jump on the optical disc (M) (FIG. 1), the tilt value is temporarily set to the reference value 0. After the tilt value is temporarily set to the reference value 0 (FIG. 21: S392), the OPU 2 (FIG. 1) is driven to perform the track jump (FIG. 21: S393).

By setting the tilt value in the optical disc apparatus 1 (FIG. 1) as shown in the steps of S391 and S392 of FIG. 21, even if the optimum tilt value is set to any one of biased numeric values (e.g., +6%) other than the reference value 0 of the tilt value among the tilt values within the predetermined range, the track jump of the OPU 2 on the optical disc (M) is favorably performed. When the tilt adjustment of the OPU 2 is performed for the optical disc (M), if the optimum tilt value is set to a biased numeric value (+6%) other than the reference value 0, the servo failure tends to occur in the OPU 2 when the track jump is performed by the OPU 2 on the optical disc (M). However, since the tilt value is temporarily set to the reference value 0 when the track jump is performed by the OPU 2, even if the tilt value is set to a biased numeric value other than the reference value 0, the track jump becomes more easily performed by the OPU 2 on the optical disc (M) in a normal manner.

After the track jump of the OPU 2 is performed on the optical disc (M) (FIG. 1) (FIG. 21: S393) and the track jump operation is completed, the tilt value is returned to the original biased numeric value (e.g., +6%) other than the reference value 0 (FIG. 21: S395, FIG. 22). Since the optimum tilt value of the initial setting was set to the biased numeric value other than the reference value 0 (FIG. 21, S394: NO, FIG. 22), the tilt value is returned to the original biased numeric value (e.g., +6%) other than the reference value 0 after the track jump is completed (FIG. 21: S395).

Therefore, the optimum tilt value is again set in the optical disc apparatus 1. When the track jump of the OPU 2 is not performed on the optical disc (M), a biased numeric value other than the reference value 0 of the tilt value is again set as the optimum tilt value in the optical disc apparatus 1 and, therefore, the tilt adjustment of the OBL 2 of the OPU 2 is favorably performed for the optical disc (M). Since the tilt value other than the reference value 0 stored earlier in the second memory circuit 12 is again set as the optimum tilt value in the optical disc apparatus 1, the optimum tilt value is swiftly set again.

Description will then be made of a state when the track jump of the OPU 2 is performed if the optimum tilt value is set to the reference value 0. Specifically describing the operation of the optical disc apparatus 1 from the start to the end of the track jump process when the optimum tilt value is set to the reference value 0, if the optimum tilt value is set to the reference value 0 (FIG. 21, S391: YES, FIGS. 23, 24, 25, and 26), the OPU 2 (FIG. 1) is driven to perform the track jump without changing the tilt value (FIG. 21: S393). Since the optimum tilt value is continues to be set to the reference value 0, the track jump continues to be performed by the OPU 2 on the optical disc M/(M) (FIG. 1) in a normal manner. Since the optimum tilt value of the initial setting was set to the reference value 0 (FIG. 21, S394: YES, FIGS. 23, 24, 25, and 26), the tilt value is not changed after the track jump is completed and the optimum tilt value is maintained at the reference value 0.

The optical disc apparatus 1 shown in FIG. 1 is configured to be capable of executing at least one or more process among the processes selected from a group consisting of the defocus-value setting process, the detrack-value setting process, and the tilt-value setting process. Therefore, at least one or more optimum values are set in the optical disc apparatus 1 among the optimum defocus value, the optimum detrack value, and the optimum tilt value.

Specifically, the optical disc apparatus 1 shown in FIG. 1 is the optical disc apparatus 1 capable of performing the defocus-value adjusting method of the optical disc apparatus 1. Therefore, the optical disc apparatus 1 capable of setting the optimum defocus value can be provided. The F-drop is prevented and the stable focusing servo is performed in the optical disc apparatus 1 including the OPU 2.

The optical disc apparatus 1 shown in FIG. 1 is the optical disc apparatus 1 capable of performing the detrack-value adjusting method of the optical disc apparatus 1. Therefore, the optical disc apparatus 1 capable of setting the optimum detrack value can be provided. The track skip is prevented and the stable tracking servo is performed in the optical disc apparatus 1 including the OPU 2.

The optical disc apparatus 1 shown in FIG. 1 is the optical disc apparatus 1 capable of performing the tilt-value adjusting method of the optical disc apparatus 1. Therefore, the optical disc apparatus 1 capable of setting the optimum tilt value can be provided. The servo failure is prevented and the stable tilt operation is performed in the optical disc apparatus 1 including the OPU 2.

When a tilt adjustment circuit of the optical disc apparatus 1 is made up, even if the optical disc (M) disposed in the optical disc apparatus 1 is a wobbling disc MA (FIG. 2), the light axis La of the laser beam L emitted from the LD 3 of the OPU 2 (FIG. 1) is easily maintained orthogonal to the signal layer Ms of the optical disc MA.

If the wobbling motion occurs in the optical disc (M), the focusing adjustment of the OBL 4 and the focusing tilt adjustment of the OBL 4 are performed at the same time. If the wobbling motion occurs in the optical disc (M), the position of the OBL 4 is adjusted automatically in the vertical direction Da. Concurrently, the posture of the OBL 4 is automatically adjusted such that the light axis La of the laser beam having passed through the OBL 4 is tilted to the extent of an angle of −Af to +Af. Therefore, the light axis La of the laser beam is always maintained orthogonal to the signal layer Ms of the optical disc MA, and the spot Ls formed by condensing the laser beam with the OBL 4 avoids the deviation thereof from the pits Mt in a state of being tracked. Therefore, when reading data from the optical disc MA with the use of the OPU 2 (FIG. 1), there is easily prevented the occurrence of the focus drop and the resultant read error of the data of the optical disc MA.

The focus drop occurs due to the wobbling of the optical disc (M), the eccentricity of the optical disc (M), the vibration of the optical disc (M), and the impact on the optical disc (M). When reproducing data recorded in the optical disc (M) or recording data in the optical disc (M) with the use of the optical disc apparatus 1, it is considered that the wobbling of the optical disc (M) and the eccentricity of the optical disc (M) steadily occurs in the optical disc apparatus 1. On the other hand, it is considered that the vibration of the optical disc (M) and the impact on the optical disc (M) suddenly occurs.

When the tilt adjustment circuit of the optical disc apparatus 1 is made up, even if the optical disc (M) disposed in the optical disc apparatus 1 is an eccentric disc MB (FIGS. 4A and 4B), the light axis La of the laser beam L emitted from the LD 3 of the OPU 2 (FIG. 1) is easily maintained orthogonal to the signal layer Ms of the optical disc MB.

If the eccentric motion occurs in the optical disc (M) (FIGS. 4A and 4B), the tracking adjustment of the OBL 4 and the tracking tilt adjustment of the OBL 4 are performed at the same time. If the eccentric motion occurs in the optical disc (M), the position of the OBL 4 is automatically adjusted in the disc inward/outward direction Db. Concurrently, the posture of the OBL 4 is automatically adjusted even if the light axis La of the laser beam having passed through the OBL 4 is tilted to the extent of an angle −At to +At. The light axis La of the laser beam is always maintained orthogonal to the signal layer Ms of the optical disc MA, and the spot Ls formed by condensing the laser beam with the OBL 4 avoids the deviation thereof from the pits Mt in a state of being tracked. Therefore, when reading data from the optical disc MB with the use of the OPU 2 (FIG. 1), there is easily prevented the occurrence of the focus drop causing the read error of the data on the optical disc MB.

If the optical disc (M) disposed in the optical disc apparatus 1 is the wobbling disc MA (FIG. 2) or if the optical disc (M) disposed in the optical disc apparatus 1 is the eccentric disc MB (FIGS. 4A and 4B), the track jump of the OPU 2 becomes easily performed on the optical disc MA or the optical disc MB in a normal manner.

Although the optical disc apparatus 1 shown in FIG. 1 is configured to be capable of executing the three processes that are the defocus-value setting process, the detrack-value setting process, and the tilt-value setting process, in accordance with the design/specification, etc. of the optical disc apparatus 1, for example, there may be configured the optical disc apparatus 1 capable of executing the two processes that are the defocus-value setting process and the detrack-value setting process. In accordance with the design/specification, etc. of the optical disc apparatus 1, for example, there may be configured the optical disc apparatus 1 capable of executing the two processes that are the detrack-value setting process and the tilt-value setting process. In accordance with the design/specification, etc. of the optical disc apparatus 1, for example, there may be configured the optical disc apparatus 1 capable of executing the two processes that are the tilt-value setting process and the defocus-value setting process.

In accordance with the design/specification, etc. of the optical disc apparatus 1, for example, there may be configured the optical disc apparatus 1 capable of executing a plurality of processes among the defocus-value setting process, the detrack-value setting process, and the tilt-value setting process. There are individually or concurrently executed the plurality of processes to be required among the defocus-value setting process, the detrack-value setting process, and the tilt-value setting process.

For example, the optical disc apparatus 1 is configured as the one optical disc apparatus 1 (FIG. 1) where the adjusting method of the optical disc apparatus 1 capable of setting the optimum defocus value (FIGS. 6A to 12) is combined or used concurrently with the adjusting method of the optical disc apparatus 1 capable of setting the optimum detrack value (FIGS. 13A to 19) and/or the adjusting method of the optical disc apparatus 1 capable of setting the optimum tilt value (FIGS. 20A to 26).

For example, with making up the optical disc apparatus 1 as above, there can be provided the optical disc apparatus 1 capable of setting the optimum detrack value and/or the optimum tilt value in addition to the optimum defocus value within a relatively short time.

After the optical disc (M): for which the jitter value is presumed/determined as not good and the detection/check of each of the jitter values is required; is completely disposed in the optical disc apparatus 1, the above setting processes are executed. The setting processes are executed, for example, within a total time of more than 0 second to substantially 60 seconds, preferably, within a total time of more than 0 second to substantially 45 seconds, more preferably, within a total time of more than 0 second to substantially 30 seconds.

Therefore, a situation is avoided where one must wait for a long time due to the setting processes automatically performed by the optical disc apparatus 1 from the time when the optical disc (M): for which the jitter value is presumed/determined as not good and the detection/check of each of the jitter values is required; is completely disposed in the optical disc apparatus 1 to the time when the main data/information/signals of the optical disc (M) are started to be read. The setting processes are ideally executed in a short time closer to substantially zero seconds as much as possible. Since the total time of the setting processes is, for example, within substantially 60 seconds, preferably, within substantially 45 seconds, more preferably, within substantially 30 seconds, a waiting time for the setting processes automatically executed by the optical disc apparatus 1 is considered to be within the permissible range of a user/designer, etc. of the optical disc apparatus 1.

After the optical disc (M) with good jitter characteristics is completely disposed in the optical disc apparatus 1, when the setting processes are executed, the setting processes are executed, for example, within a total time of more than 0 second to substantially 15 seconds, preferably, within a total time of more than 0 second to substantially 10 seconds, more preferably, within a total time of more than 0 second to substantially 5 seconds.

Therefore, a situation is avoided where one must wait for a very long time due to the setting processes automatically performed by the optical disc apparatus 1 from the time when the optical disc (M) with good characteristics is completely disposed in the optical disc apparatus 1 to the time when the main data/information/signals of the optical disc (M) are started to be read, and the setting processes are swiftly completed in a short time. The setting processes are ideally executed within a short time closer to substantially zero seconds as much as possible. Since the total time of the setting processes is, for example, within substantially 15 seconds, preferably, within substantially 10 seconds, more preferably, within substantially 5 seconds after the optical disc M with good characteristics is completely disposed in the optical disc apparatus 1, for example, a user/designer, etc. of the optical disc apparatus 1 will not put under stress due to the waiting time for the setting processes automatically executed by the optical disc apparatus 1.

The optical disc apparatus 1 including the OPU 2 can be used for a recording/reproducing apparatus that records data/information/signals, etc. in the various optical discs M and that reproduces data/information/signals, etc. in the various optical discs M. The optical disc apparatus 1 including the OPU 2 can be used for a reproduction-only apparatus that reproduces data/information/signals, etc. in the various optical discs.

The OPU 2 is included in the optical disc apparatus 1 incorporated into computers, audio/video devices, game machines, and in-vehicle equipments (all not shown), for example. The optical disc apparatus 1 having the OPU 2 can be included in, for example, computers such as notebook-sized personal computers (PC: personal computer), laptop PCs, desktop PCs, and in-vehicle computers, game machines such as computer game machines, and audio and/or video devices such as CD players/CD recorders and DVD players/DVD recorders (all not shown). The optical disc apparatus 1 including the OPU 2 can support a plurality of the media M such as CD-series optical discs, DVD-series optical discs, and "Blu-ray"-series optical discs, for example. The optical disc apparatus 1 having the OPU 2 can be included in computers, audio and/or video devices, game machines, in-vehicle equipments (all not shown), etc. supporting the various optical discs M such as "CD", "DVD", "HD-DVD", and "Blu-ray Disc".

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A disc apparatus comprising:
a jitter-value detection unit configured to detect a jitter value based on a signal to be read from a medium;
a detrack-value setting unit configured to set a detrack value for focusing an objective lens in the medium based on the jitter value; and
a detrack-value adjusting unit configured to detect the jitter value every time the detrack value is changed stepwise within a predetermined range of the detrack value including a reference value of the detrack value, to obtain an optimum detrack value to be set in the detrack-value setting unit, based on a maximum jitter value and a minimum jitter value of the detected jitter values.

2. The disc apparatus of claim 1, comprising
a tracking controlling unit configured to move the objective lens in the radial direction of the medium based on the detrack value.

3. The disc apparatus of claim 1, wherein
if a difference value between the maximum jitter value and the minimum jitter value is greater than a predetermined difference value, the detrack-value adjusting unit defines the detrack value corresponding to the minimum jitter value as the optimum detrack value to be set in the detrack-value setting unit.

4. The disc apparatus of claim 3, wherein
if the difference value between the maximum jitter value and the minimum jitter value is smaller than the predetermined difference value, the detrack-value adjusting unit defines the reference value of the detrack value as the optimum detrack value to be set in the detrack-value setting unit.

5. The disc apparatus of claim 1, wherein
if the jitter value corresponding to the reference value of the detrack value is greater than a predetermined jitter value, the detrack-value adjusting unit detects the jitter value every time the detrack value is changed stepwise within the predetermined range of the detrack value including the reference value of the detrack value.

6. The disc apparatus of claim 5, wherein
if the jitter value corresponding to the reference value of the detrack value is smaller than the predetermined jitter value, the detrack-value adjusting unit defines the reference value of the detrack value as the optimum detrack value to be set in the detrack-value setting unit.

7. The disc apparatus of claim 1, wherein
if the optimum detrack value is a value other than the reference value, when a track jump of an optical pickup device including the objective lens is performed, the detrack-value adjusting unit defines the reference value as the detrack value to be set in the detrack-value setting unit.

8. The disc apparatus of claim 7, wherein
after the track jump of the optical pickup device including the objective lens is completed, the detrack-value adjusting unit returns the detrack value to be set in the detrack-value setting unit to a value other than the reference value.

9. The disc apparatus of claim 1, wherein the reference value is equal to zero.

10. A disc apparatus comprising:
a jitter value detection unit configured to detect a jitter value based on a signal to be read from a medium;
a tilt-value setting unit configured to set a tilt value for focusing an objective lens in the medium based on the jitter value; and
a tilt-value adjusting unit configured to detect the jitter value every time the tilt value is changed stepwise within a predetermined range of the tilt value including a reference value of the tilt value, to obtain an optimum tilt value to be set in the tilt-value setting unit based on a maximum jitter value and a minimum jitter value of the detected jitter values.

11. The disc apparatus of claim 10, comprising
a tilt controlling unit configured to correct angular displacement of the objective lens relative to a signal layer of the medium based on the tilt value.

12. The disc apparatus of claim 10, wherein
if a difference value between the maximum jitter value and the minimum jitter value is greater than a predetermined difference value, the tilt-value adjusting unit defines the tilt value corresponding to the minimum jitter value as the optimum tilt value to be set in the tilt-value setting unit.

13. The disc apparatus of claim 12, wherein
if the difference value between the maximum jitter value and the minimum jitter value is smaller than the predetermined difference value, the tilt-value adjusting unit defines the reference value of the tilt value as the optimum tilt value to be set in the tilt-value setting unit.

14. The disc apparatus of claim 10, wherein
if the jitter value corresponding to the reference value of the tilt value is greater than a predetermined jitter value, the tilt-value adjusting unit detects the jitter value every time the tilt value is changed stepwise within the predetermined range of the tilt value including the reference value of the tilt value.

15. The disc apparatus of claim 14, wherein
if the jitter value corresponding to the reference value of the tilt value is smaller than the predetermined jitter value, the tilt-value adjusting unit defines the reference value of the tilt value as the optimum tilt value to be set in the tilt-value setting unit.

16. The disc apparatus of claim 10, wherein
if the optimum tilt value is a value other than the reference value, when a track jump of an optical pickup device including the objective lens is performed, the tilt-value adjusting unit defines the reference value as the tilt value to be set in the tilt-value setting unit.

17. The disc apparatus of claim 16, wherein
after the track jump of the optical pickup device including the objective lens is completed, the tilt-value adjusting unit returns the tilt value to be set in the tilt-value setting unit to a value other than the reference value.

18. The disc apparatus of claim 10, wherein the reference value is equal to zero.

* * * * *